United States Patent
Montesalvo

(10) Patent No.: US 10,920,445 B2
(45) Date of Patent: Feb. 16, 2021

(54) DEPLOYABLE SHELTER STRUCTURE

(71) Applicant: PATRIOT CAMPERS PTY LTD., Molendinar (AU)

(72) Inventor: Justin Montesalvo, Molendinar (AU)

(73) Assignee: PATRIOT CAMPERS HOLDINGS PTY LTD., Molendinar (AU)

( * ) Notice: Subject to any disclaimer, the term of this patent is extended or adjusted under 35 U.S.C. 154(b) by 0 days.

(21) Appl. No.: 16/464,529

(22) PCT Filed: Dec. 16, 2016

(86) PCT No.: PCT/AU2016/051254
§ 371 (c)(1),
(2) Date: May 28, 2019

(87) PCT Pub. No.: WO2018/107196
PCT Pub. Date: Jun. 21, 2018

(65) Prior Publication Data
US 2019/0376309 A1    Dec. 12, 2019

(51) Int. Cl.
*E04H 15/06* (2006.01)
*B60P 3/34* (2006.01)
(Continued)

(52) U.S. Cl.
CPC .............. *E04H 15/06* (2013.01); *B60P 3/34* (2013.01); *B60P 3/39* (2013.01); *E04H 15/324* (2013.01); *E04H 15/48* (2013.01); *E04H 15/56* (2013.01)

(58) Field of Classification Search
CPC ......... E04H 15/06; E04H 15/008; B60P 3/34; B60P 3/36; B60P 3/39
See application file for complete search history.

(56) References Cited

U.S. PATENT DOCUMENTS

| 3,375,836 A | 4/1968 | Domeneghetti |
| 4,522,441 A | 6/1985 | Allison |

(Continued)

FOREIGN PATENT DOCUMENTS

| DE | 2420344 A1 | 11/1975 | |
| EP | 1842721 A2 * | 10/2007 | ............. A47C 19/20 |

(Continued)

OTHER PUBLICATIONS

PCT International Preliminary Report on Patentability from the International Application No. PCT/AU2016/051254, dated Oct. 30, 2017, 26 pages.

(Continued)

*Primary Examiner* — Noah Chandler Hawk
(74) *Attorney, Agent, or Firm* — Tucker Ellis LLP

(57) ABSTRACT

Provided is a deployable shelter structure that is vehicle mountable or mounted. The deployable shelter structure has a base defining a support surface and a fixed portion supported on a structure and a moveable portion pivotally mounted to the fixed portion. The moveable portion being displaceable from a folded position in which the fixed and moveable portions generally face each other and an unfolded position, in which said fixed and moveable portions are generally coplanar and define the support surface dimensioned to support at least one user. The deployable shelter structure is supported off of the ground. A collapsible hood including a cover and a plurality of support members support the cover. A stair or step ladder assembly is pivotally mounted on the moveable portion for movement between a stored position and a downwardly extending in-use position.

20 Claims, 33 Drawing Sheets

(51) Int. Cl.
*B60P 3/39* (2006.01)
*E04H 15/32* (2006.01)
*E04H 15/48* (2006.01)
*E04H 15/56* (2006.01)

(56) References Cited

U.S. PATENT DOCUMENTS 9,222,278 B2 * 12/2015 Park .................. E04H 15/06
2003/0094827 A1 5/2003 Faludy et al.

FOREIGN PATENT DOCUMENTS

GB 989081 A 4/1965
GB 1454692 A 11/1976

OTHER PUBLICATIONS

PCT International Search Report from the International Application No. PCT/AU2016/051254, dated Feb. 8, 2017, 3 pages.

* cited by examiner

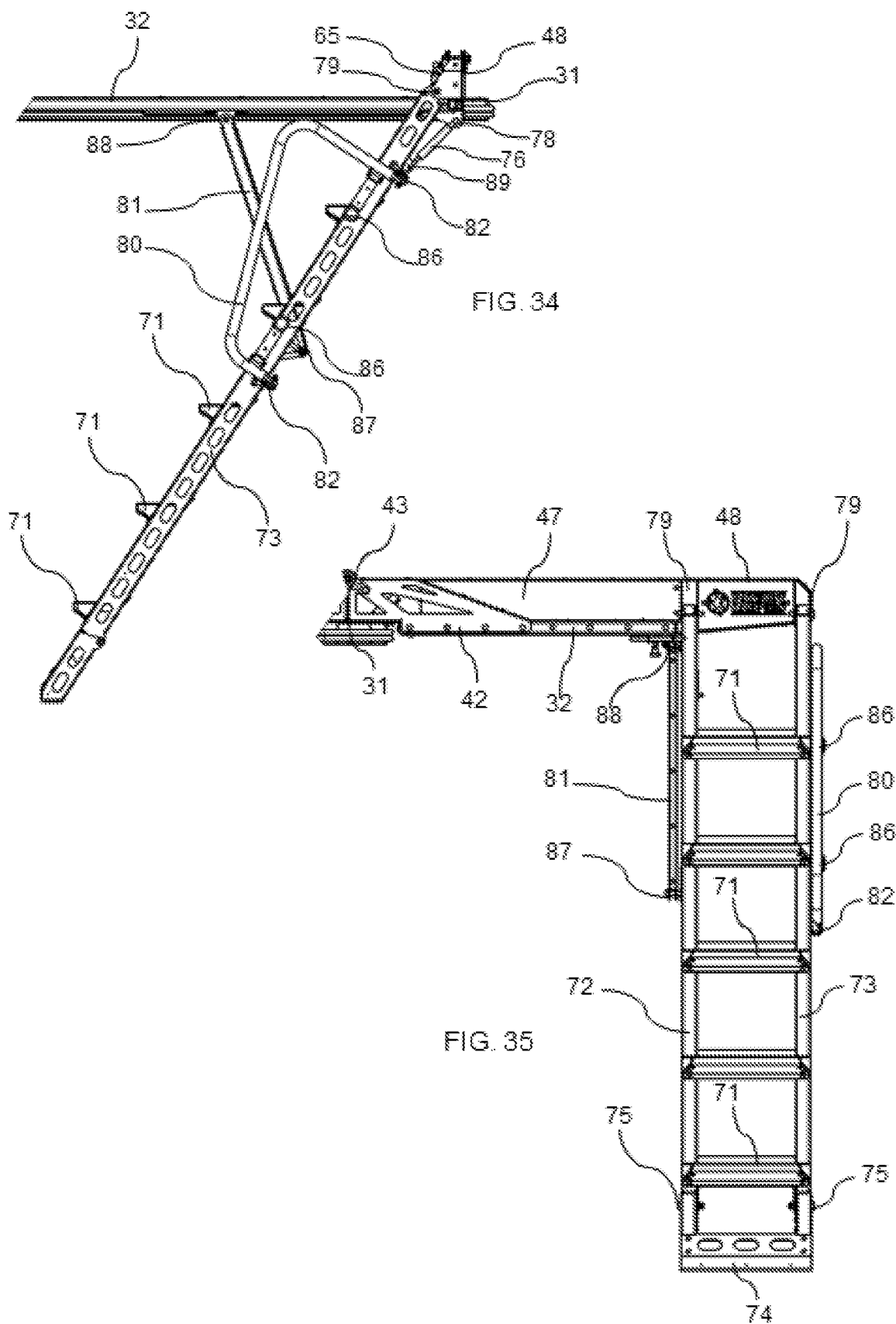

DEPLOYABLE SHELTER STRUCTURE

RELATED APPLICATION DATA

This application is a national phase application of International Application No. PCT/AU2016/051254 filed Dec. 16, 2016 and published in the English language, which is hereby incorporated herein by reference.

FIELD OF THE INVENTION

The invention relates in general to a deployable shelter structure, and particularly to such a structure which is vehicle mountable or mounted. The present invention in a particular but not exclusive aspect aims to provide a foldable tent shelter mounted on a vehicle and adapted to be erected to an open position without removing the shelter from the vehicle.

BACKGROUND OF THE INVENTION

It should be noted that reference to the prior art herein is not to be taken as an acknowledgement that such prior art constitutes common general knowledge in the art.

The desires to be free and be closer to nature and to travel to the remote ends of the earth have increased the demand for camping equipment which provides sleeping accommodation. An increasing number of outdoor enthusiasts enjoy going camping with their vehicle as this offers them a greater degree of freedom. This increasing demand has led to the development of a variety of campers, trailers, and car-top fixtures which pop up, fold out, or swing down to form many different structures which can be deployed to perform a number of different functions. Typically these fixtures form at least, a shelter or tent consisting of sheets of fabric or other material draped over and attached to a frame of poles.

These tents which have a built-in bed are elevated and can be mounted onto the vehicle roof (i.e. roof top tents) or mounted onto a support such as a trailer. These conventional self-contained tents have a baseboard which is firmly attached to the roof of a vehicle or atop a trailer. After it has been opened or deployed on the roof of the vehicle, the occupant may climb a ladder and enter the tent. These tents may be broadly divided into two classes, namely those tent structures which are directly elevated and supported on all four sides by suitable props, and vehicle top tents which are pivotally connected at one end of the vehicle top.

The current offerings of vehicle-mounted tents have many undesirable features such as weight, bulkiness, slow and/or complicated set-up, and lack of aesthetic or convenient features. Due to the outdoor nature and conditions experienced while camping the vehicle-top tent needs be waterproof and able to dissipate any water which will seep into the tent. In these conventional systems the built-in bed or mattress sitting atop the floor has an affinity to absorb any water or moisture.

The conventional framework structure supporting the tent atop the vehicle leaves much to be desired in the way of strength. When the unit is deployed one side of the weight of the tent is supported on the roof or structure and the other side needs to be supported or rests upon a flimsy ladder which may or may not have a firm footing on the ground. It should also be noted that the ladder and hinges of the support frame are also required to support one half of the weight of any persons reclining on the platform. More importantly, given the ladder supports the weight of the platform, the placement of the foot of the ladder need to be placed on solid ground. It is common to incorrectly set up the ladder and confront structural problems as a result.

Access to and from the conventional vehicle top tents is by a ladder. Therefore climbing in and out of the vehicle top tent is not suitable for people of all ages and requires a certain level of agility on behalf of the user. Given that the individual rungs or treads are quite shallow, when measured from front to back they do not inspire confidence when ascending and descending; only a very limited amount of the user's foot is in contact with each tread. Furthermore, due to the ladder rungs being relatively small in size they can be very uncomfortable on bare feet. Also when the ladder is positioned in the open weather they can get very slippery in the rain. This is further exacerbated when in the middle of the night the user is required to get up and down the ladder to use the toilet. Also, when a user climbs a conventional type step ladder used to access the vehicle top tent the user's body weight is positioned rearward and this increases the risk of the user falling backwards from the ladder.

Clearly it would be advantageous if a deployable shelter structure could be devised that helped to at least ameliorate some of the shortcomings described above. In particular, it would be beneficial to provide a foldable tent shelter mounted on a vehicle which is adapted to be easily accessed and easily erected to a self-supporting open position without removing the shelter from the vehicle.

SUMMARY OF THE INVENTION

In accordance with a first aspect, the present invention provides a deployable shelter structure comprising: a base defining a support surface and having a fixed portion supported on a structure and a moveable portion pivotally mounted to the fixed portion, the moveable portion being displaceable from a folded position in which the fixed and moveable portions generally face each other and an unfolded position, in which the fixed and moveable portions are generally coplanar and define the support surface dimensioned to support at least one user, wherein the deployable shelter structure is supported off of the ground; a collapsible hood including a cover and a plurality of support members supporting the cover, the support members being pivotally connected to the base such that, by pivotal movement of the support members, the hood can be moved between a collapsed state and a deployed state in which the hood covers the support surface to form the shelter; and a stair or step ladder assembly pivotally mounted on the moveable portion for movement between a stored position in which the stair or step ladder assembly is aligned with an edge or side of the moveable portion and a downwardly extending in-use position.

Preferably, the fixed and moveable portions may be manufactured from aluminium with at least one reinforcing u-channel located on an underside of each portion. The fixed and moveable portions may be laser cut from an aluminium sheet to provide rigidity to the base portions. The fixed and moveable base portions may be perforated to allow for air flow through the fixed and/or moveable base portions. The perforations may be flute shaped in order to direct the flow of air through the support surface. Preferably, the perforations may extend substantially over the length of each base portion. Alternatively, the perforations may extend over approximately 50% of the support surface formed by the fixed and moveable base portions.

Preferably, the deployable shelter structure may further comprise a mattress located on the support surface, the mattress may be foldable when the moveable base portion is displaced towards the fixed base portion such that the mattress resides within the confines of an enclosure formed by the fixed and moveable base portions and is extendable upon the moveable base portion being extended to be generally coplanar with the fixed base portion. Preferably, the structure to which the fixed base portion is supported on may be any one of: (a) a vehicle roof; (b) a trailer; or (c) a camping trailer. When the structure is the vehicle roof, the structure can be the vehicle roof itself or some other means which is attached to the vehicle roof.

Preferably, the structure is supported off of the ground at a height, the height may be variable and is dependent upon the type of structure. Preferably, the deployable shelter structure may further comprise a first hinge means attached adjacent one end of the fixed and moveable base portions and a second hinge means attached adjacent another end of the fixed and moveable base portions, the first and second hinge means allowing the moveable base portion to be displaceable from the fixed base portion such that when the moveable base portion is unfolded from the fixed base portion they form the generally coplanar support surface.

Preferably, the first and second hinge means may self-support the moveable base portion. Preferably, the first and second hinge means in a folded position may space apart the fixed and moveable base portions to provide a height to allow the folded mattress to be confined within an enclosure formed by the fixed and moveable base portions and the first and second hinge means. Preferably, the first and second hinge means may have a first hinge bracket attached to the fixed base portion and a second hinge bracket attached to the moveable base portion. The second hinge bracket of the first hinge means may extend along the length of one side of the moveable base portion. Preferably, the deployable shelter structure may further comprise at least one gas strut for assisting the folding and unfolding of the moveable base portion from the fixed base portion. The gas strut may be located adjacent the first hinge means or the second hinge means or both hinge means.

Preferably, the stair or step ladder assembly may be pivotally mounted to a fixed member extending from the first hinge means. The stair assembly may be pivotally mounted to a fixed member extending from the second hinge bracket of the first hinge means. Preferably the stair assembly or step ladder assembly extends from and is aligned with the edge or side of the moveable portion which forms an outermost edge or side of the moveable portion when the moveable portion is displaced to be generally coplanar with the fixed portion.

Preferably, the stair or step ladder assembly may comprise: a first support member and a second support member forming the stringers of the stair or step ladder assembly; a plurality of step treads separating the first and second support members; a handrail pivotally fitted to the second support member; and a stair support brace attached to the underside of the moveable base portion and the first support member, the stair support brace guides the stair or step ladder assembly from the stored position to the extended in-use position and locks the stair or step ladder assembly in the extended in use position.

Preferably, the stair or step ladder assembly may be retained in the stored positon aligned with a side of the moveable base portion by a retaining device, such that when the retaining device is released the stair or step ladder assembly will lower to the extended in-use position. The retaining device may be either mounted on the stair or step ladder assembly towards an end of the first support member and secures the stair or step ladder assembly in the stored position to the moveable base portion or may be mounted on the moveable base portion and secures the moveable base portion to the stair or step ladder assembly in the stored position.

Preferably, the handrail may be moveable from a stowed position in which the handrail is positioned on a back side of the stair or step ladder assembly to an erected position, the handrail in the erected position is at a non-included angle of approximately 270 degrees from the stowed position.

Preferably, the length of the stair or step ladder assembly may be dependent upon the height which the structure is supported off of the ground. The length of the stair or step ladder assembly may be extendable by a folded step section extending from the end of the stair or step ladder assembly.

Preferably, the stair or step ladder assembly may be assisted for movement by at least one gas strut attached between the underside of one or both support members and the fixed member extending from the second hinge bracket of the first hinge means. Preferably, the stair support brace may be extendable and lockable at different lengths to accommodate for un-level ground below the end of the stair or step ladder assembly. Preferably, the plurality of step treads may be perforated across their length to allow air flow through the step tread. Preferably, the plurality of step treads may be of sufficient depth to accommodate a substantial part of a foot of a user such that the user can easily climb or descend the stair or step ladder assembly with the assistance of the handrail. Preferably, the step tread depth may be approximately 135 mm.

Preferably, the collapsible hood may be foldable into a clam-shell configuration in the stowed position for transport. The plurality of support members may comprise three arcuate poles spaced apart and pivotally connected to the fixed base portion by way of a pair of brackets mounted adjacent each hinge means. Preferably, at least a portion of the support members may be attached to a portion of the cover so that the extension of the support members from the collapsed position automatically effects the erection of said cover to define an enclosed space above said support surface. The collapsible hood may further comprise a canopy portion attached to the cover to enclose the stair assembly with the fixed and moveable base portions to form an enclosed shelter, the canopy is attached to a further support arm which extends from at least one of the support members.

Preferably, the collapsible hood may further comprise at least one gas assisted strut attached to at least one of the support member and the fixed base portion to assist in moving the hood between a collapsed state and a deployed state in which said hood covers the support surface and stair or step ladder assembly to form the shelter. Preferably, the deployable shelter structure may further comprise a transit cover for enclosing the stored shelter structure including the collapsible hood, the folded base and mattress, and the stair or step ladder assembly. Preferably, the support surface may be dimensioned to support two users.

In accordance with a further aspect, the present invention provides a method of deploying a shelter structure mounted to a support structure located off of the ground, the method including the steps of: (a) removing a cover enclosing the deployable structure; (b) moving a collapsible hood from a collapsed state to a deployed state in which the hood covers a support surface to form the shelter; (c) unfolding a moveable base portion from a fixed base portion to form the support surface; (d) releasing a stair or step ladder assembly from the moveable base portion to allow access to the shelter from the ground; and (e) securing external ropes attached to the collapsible hood to secure the deployable shelter in the deployed position. Preferably, the method may comprise any one of the features of the deployable shelter structure of the first aspect.

In accordance with a still further aspect, the present invention provides a deployable tent structure for mounting on a vehicle comprising: a base defining a support surface and having a fixed base portion supported on a structure of the vehicle and a moveable base portion connected to the fixed base portion and arranged to pivot away from the vehicle, the moveable base portion being displaceable from a folded position in which the fixed and moveable base portions generally face each other and an unfolded position, in which the fixed and moveable base portions are generally coplanar and define the support surface dimensioned to support at least one user; a collapsible hood including a cover and a plurality of support members supporting the cover, the support members being pivotally connected to the base such that, by pivotal movement of the support members, the hood can be moved between a collapsed state and a deployed state in which the hood covers the support surface to form the shelter; and a stair or step ladder assembly pivotally mounted on the moveable base portion for movement between a stored position in which the stair or step ladder assembly is aligned with an edge or side of the moveable base portion and a downwardly extending in-use position.

Preferably, the deployable tent structure may further comprise a canopy attached to the collapsible hood cover to extend the shelter to cover the stair or step ladder assembly.

In accordance with a still further aspect, the present invention provides a deployable shelter structure for mounting on a surface of a vehicle, the deployable shelter structure comprising: a support surface formed from the surface of the vehicle and a moveable portion pivotally mounted to the surface of the vehicle, the moveable portion being displaceable from a folded position in which the moveable portion and the surface of the vehicle generally face each other and an unfolded position, in which the surface of the vehicle and the moveable portion are generally coplanar and define the support surface dimensioned to support at least one user, wherein the deployable shelter structure is supported off of the ground; a collapsible hood including a cover and a plurality of support members supporting the cover, the support members being pivotally connected to the surface of the vehicle such that, by pivotal movement of the support members, the hood can be moved between a collapsed state and a deployed state in which the hood covers the support surface to form the shelter; and a stair or step ladder assembly pivotally mounted on the moveable portion for movement between a stored position in which the stair or step ladder assembly is aligned with an edge or side of the moveable portion and a downwardly extending in-use position.

Preferably, the deployable shelter structure may further comprise a mattress positioned upon the support surface, the mattress is foldable when the moveable portion is displaced towards the surface of the vehicle such that the mattress resides within the confines of an enclosure formed by the surface of the vehicle and the moveable portion and is extendable upon the moveable portion being extended to be generally coplanar with the surface of the vehicle.

Preferably, the moveable portion may be perforated to allow for air flow through the moveable portion. Preferably, a dimpled mat or sheet may be placed on the surface of the vehicle to provide a path for air flow between an underside of the mattress and the surface of the vehicle. Alternatively, the surface of the vehicle may be perforated to provide a path for air flow through the surface of the vehicle. Preferably, the perforations may be flute shaped in order to direct the flow of air through the surface of the vehicle or the moveable portion. Preferably, the surface of the vehicle may be any one of: (a) a trailer; or (b) a camping trailer. Preferably, the deployable shelter structure may be supported off of the ground at a height, the height may be variable and is dependent upon the type of structure.

Preferably the deployable shelter structure may further comprise a first hinge means attached adjacent one end of the surface of the vehicle and the moveable portion and a second hinge means attached adjacent another end of the surface of the vehicle and the moveable portion, the first and second hinge means allowing the moveable portion to be displaceable from the surface of the vehicle such that when the moveable portion is unfolded from the surface of the vehicle they form the generally coplanar support surface. Preferably, the first and second hinge means may self-support the moveable portion.

Preferably, the first and second hinge means in a folded position may space apart the moveable portion from the surface of the vehicle to provide a height to allow the folded mattress to be confined within an enclosure formed by the surface of the vehicle and the moveable portion and the first and second hinge means. The first and second hinge means may have a first hinge bracket attached to the surface of the vehicle and a second hinge bracket attached to the moveable portion. Preferably, the second hinge bracket of the first hinge means may extend along the length of one side of the moveable portion. Preferably, the deployable shelter structure may further comprise at least one gas strut for assisting the folding and unfolding of the moveable portion from the surface of the vehicle. The gas strut may be located adjacent the first hinge means or the second hinge means or both hinge means.

Preferably, the stair or step ladder assembly may be pivotally mounted to a fixed member extending from the first hinge means. The stair or step ladder assembly may be pivotally mounted to a fixed member extending from the second hinge bracket of the first hinge means. Preferably, the collapsible hood may be foldable into a clam-shell configuration in the stowed position for transport. The plurality of support members may comprise three arcuate poles spaced apart and pivotally connected to the surface of the vehicle by way of a pair of brackets mounted adjacent each hinge means.

Preferably, at least a portion of the support members may be attached to a portion of the cover so that the extension of the support members from the collapsed position automatically effects the erection of said cover to define an enclosed space above said support surface and the stair or step ladder assembly. Preferably, the collapsible hood may further comprise at least one gas assisted strut attached to at least one of the support member and the surface of the vehicle to assist in moving the hood between a collapsed state and a deployed state in which said hood covers the support surface and stair or step ladder assembly to form the shelter.

Preferably, the deployable shelter structure may further comprise a transit cover for enclosing the stored shelter structure including the collapsible hood, the folded base and mattress, and the stair or step ladder assembly. The transit cover may be releasably attached to a sail track mounted on an edge strip located around the periphery of the support surface of the surface of the vehicle. Preferably, the collapsible hood cover may be attached to a further sail track mounted on the edge strip located around the periphery of the support surface of the surface of the vehicle. Preferably, the support surface may be dimensioned to support two users.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

FIG. 34 shows a first side view of the stair assembly of FIG. 32;

FIG. 35 shows a rear side view of the stair assembly of FIG. 32;

DETAILED DESCRIPTION OF THE INVENTION

Figure 1:
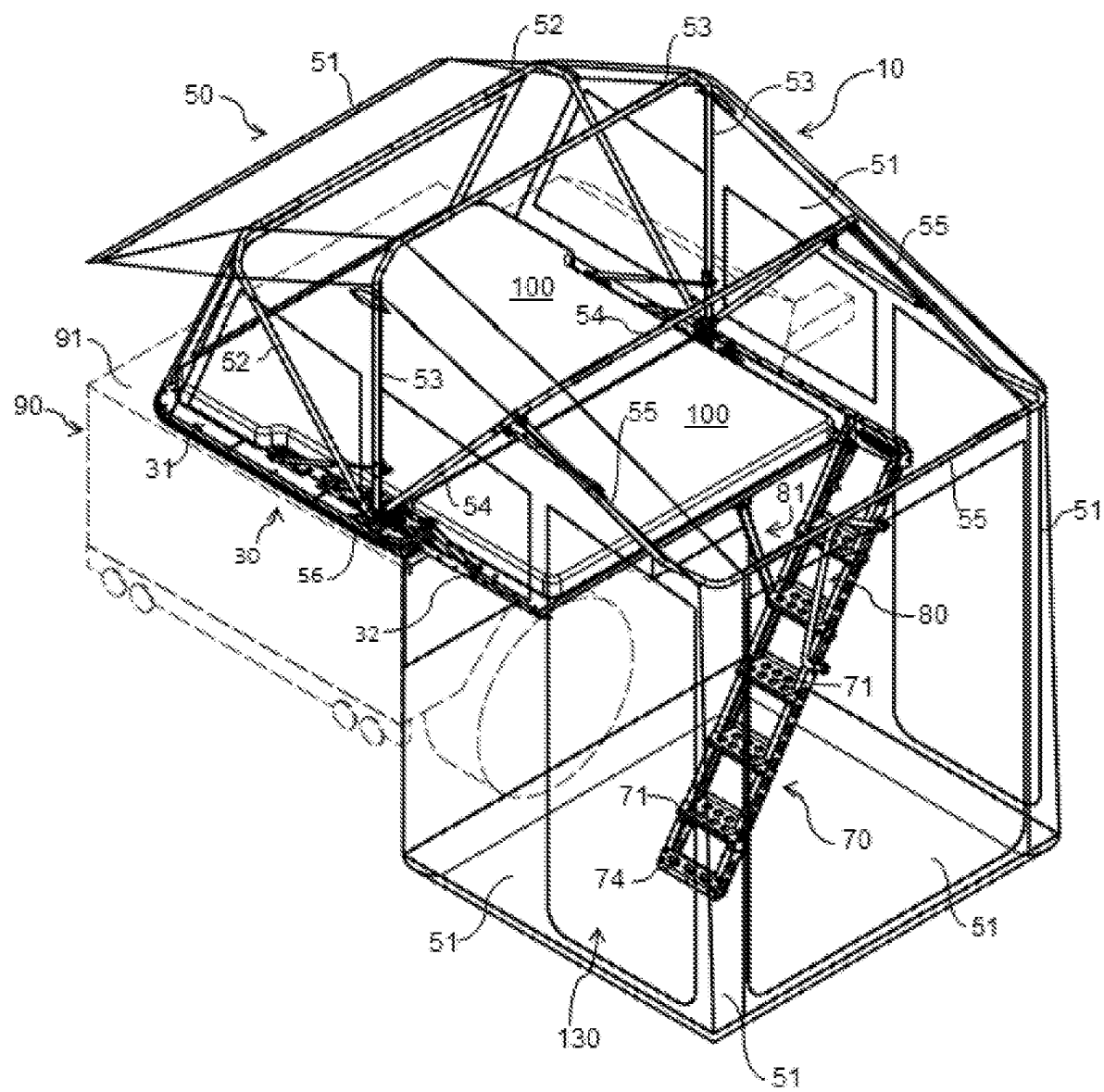
FIG. 1 illustrates a deployed tent on top of a vehicle in accordance with an embodiment of the present invention with the collapsible hood drawn as see-though to show the underlying components of the present invention.

The following description, given by way of example only, is described in order to provide a more precise understanding of the subject matter of a preferred embodiment or embodiments.

The invention will be described with reference to a deployable tent structure mounted on a camper trailer. However the present invention is equally relevant for any type of vehicle which has a support structure which will allow the deployable tent to be mountable or mounted thereon. For example, trailers, off-road camper trailers, and any variety of vehicles, such as sport utility vehicle (SUV), van, minivan, station wagon, crossover, sedan or other automobile, capable of supporting the weight of the deployable shelter structure 10. Therefore the scope of the invention should not be restricted to only camper trailers.

In the description the words tent, cover, canopy and hood have been used interchangeably throughout the description. The words are taken to mean the sheets of fabric, fabric straps or other material draped over, attached to a frame of poles or attached to a supporting rope.

The present invention provides a deployable tent structure 10 mounted or mountable on a support structure 91 of camper trailer 90. The deployable tent structure 10 comprising a collapsible hood assembly 50, a foldable base 30 and a stair assembly 70. The collapsible hood assembly 50 has a number of pivotable support members 52, 53, 54 to which the waterproof cover or hood 51 is supported or attached. The foldable base 30 consists of a fixed base portion 31 which is typically supported or attached to the support structure 91 of the camping trailer 90. The moveable base portion 32 is pivotally attached to the fixed base portion 31 such that in use the base 30 folds out to form a support surface upon which the folded mattress 100 is housed. The stair or step ladder assembly 70 is pivotally attached to the moveable base portion 32 and consists of a handrail assembly 80, a number of stairs or step treads 71, and a stair support brace 81. The stair or step ladder assembly 70 allows the user to easily enter and leave the deployable tent structure 10 which is mounted above the ground level. The stair or step ladder assembly 70 is aligned with an outer edge of the moveable base portion 32 such that when the moveable base portion 32 is unfolded from the fixed base portion 31 the portions 31, 32 form a flat coplanar platform and the stair or step ladder assembly 70 is aligned with the outermost edge of the moveable portion 32.

The dimensions of the deployable shelter structure 10 and the materials of construction may vary according to the shelter requirements, weight considerations and size and type of vehicle to which the structure 10 is to be mounted or mountable.

Referring to the drawings and firstly to FIG. 1, a preferred embodiment of the present invention is described with reference to a deployable tent structure 10 mounted on a camper trailer 90. In FIG. 1 the deployable tent structure 10 is shown in the fully erected or deployed condition ready for use. The collapsible hood 50 is fully extended with the pivotal support arms 52, 53 and 54 located above and spaced around the base 30 of the camper trailer deployable shelter structure 10. The support frames 52, 53, 54 are pivotally mounted to brackets 56 which are attached adjacent the first and second hinge means 40, 45 and close to the edge of the fixed base portion 31. An extension arm 55 is pivotally mounted to support arm 54 which allows the cover 51 to extend to a position which completely encapsulates the base support surface 30 and the stair assembly 70 to form the largely enclosed shelter. With the support arms 52, 53, 54 and extension arm 55 fully extended the cover 51 is held taut over the base structure 30 and the stair assembly 70.

The enclosed shelter provides a mattress 100 located on top of the unfolded base 30. The design of the base boards 31, 32 and the height of the unfolded first and second hinges 45, 40, spaces the moveable base portion 32 far enough away from the fixed base portion 31 to allow a folded mattress 100 to be enclosed by the fixed and moveable base boards 31, 32 and the first and second hinge means 40, 45. FIG. 1 shows the base 30 in the unfolded position with the fixed base board 31 attached to the top surface 91 of the camper trailer 90. In this extended position the two base boards 31, 32 are unfolded to lay side by side forming a generally coplanar support surface dimensioned to support at least one user and preferably two users.

The stair or step ladder assembly 70 is shown in the operating position with the stair base 74 resting on the floor of the first annex 130. The stair or step ladder assembly 70 has a number of stair treads 71, a handrail assembly 80 and stair support brace 81. The pictured cover 51 has windows located on either side of the shelter structure 10 and the annex 130 has entry doors on either side of the annex 130. The annex 130 can be removed as the annex 130 is simply attached by a zipper or the like around the periphery of the hood 50. Likewise further annexes 130, 140 may be added to extend the coverage of the deployable shelter structure 10.

Figure 2:
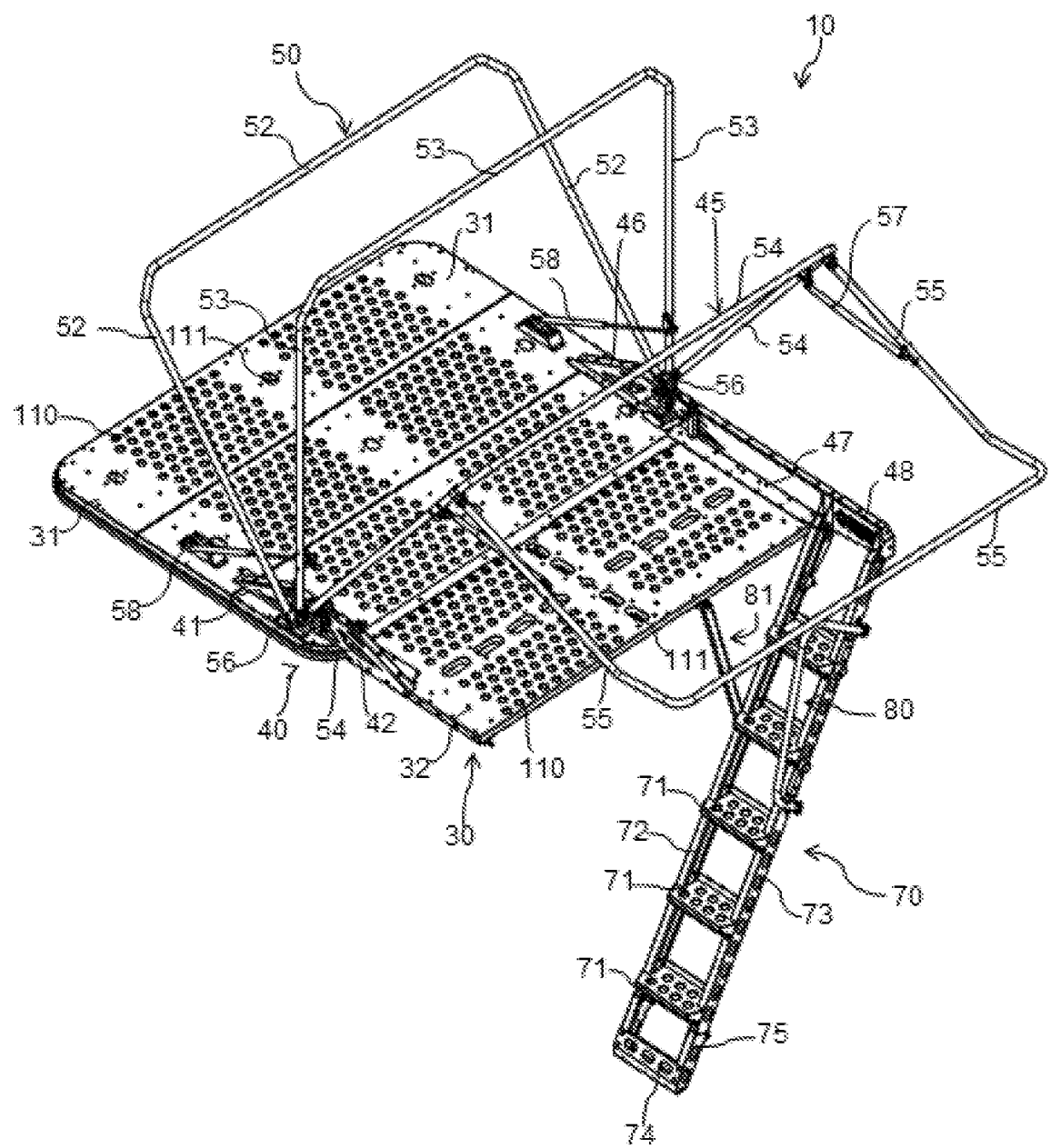
FIG. 2 shows a rear first side view of the deployed tent structure of FIG. 1 with some components removed for clarity.
Figure 3:
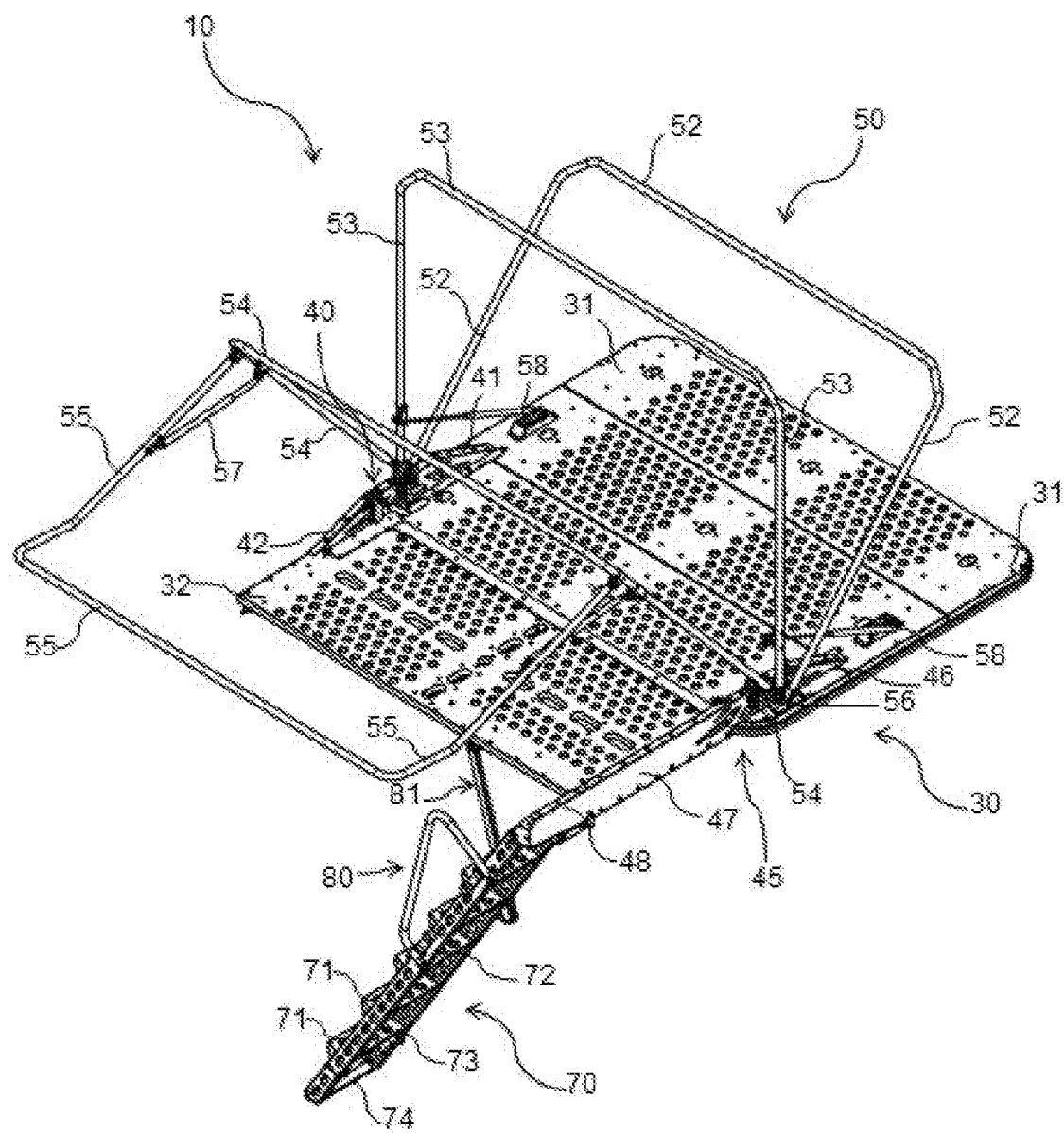
FIG. 3 shows a front first side view of the deployed tent structure of FIG. 1 with some components removed for clarity.
Figure 4:
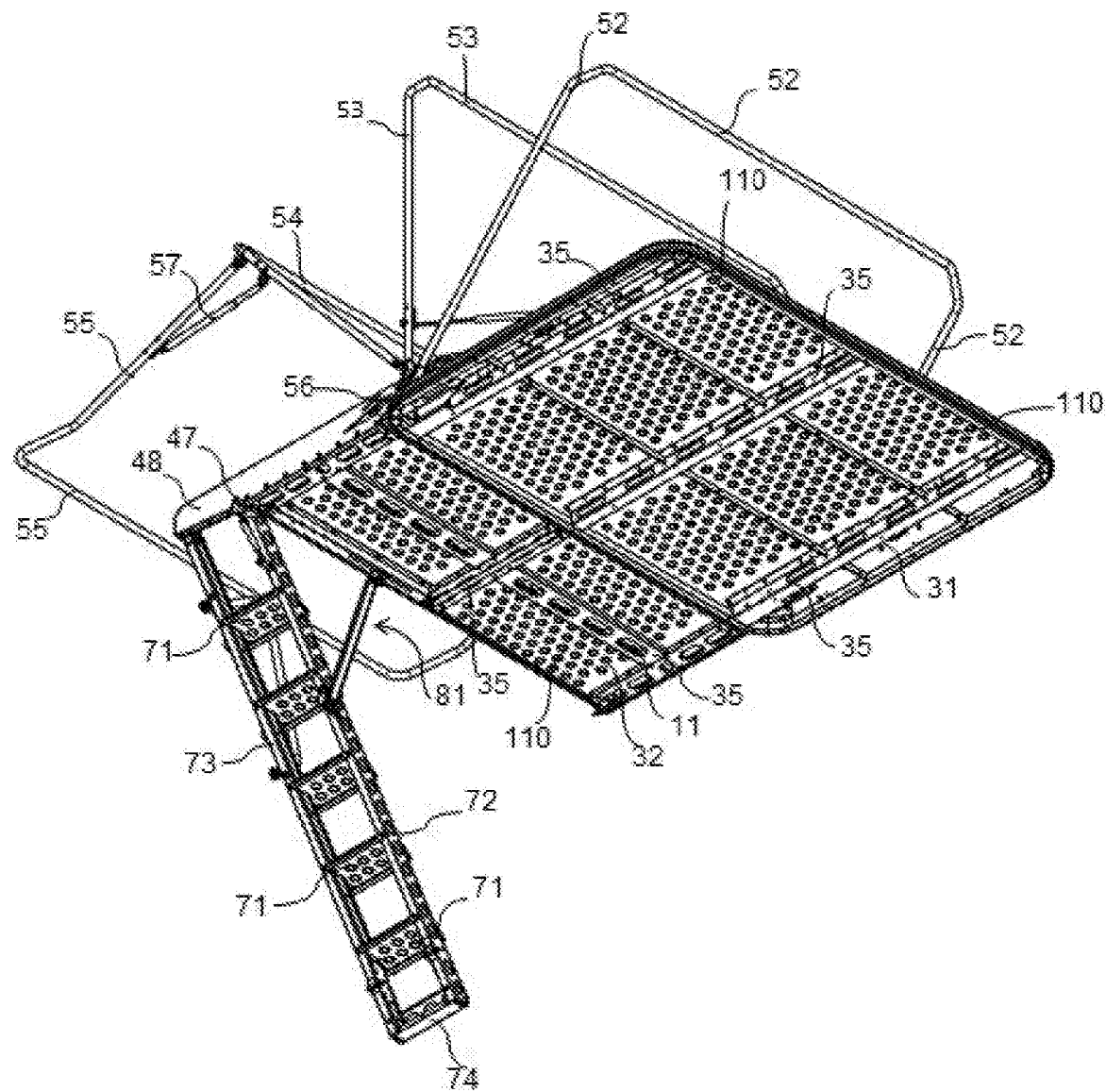
FIG. 4 shows a bottom view of the deployed tent structure of FIG. 1 with some components removed for clarity.

FIGS. 2 to 4 show the deployable shelter structure 10 with a number of the component parts removed to improve the clarity and to show the structural components of the invention. The deployable structure 10 is shown in the erected position as was illustrated in FIG. 1. The base 30 is unfolded with the fixed and moveable baseboards 31, 32 in the coplanar position. The fixed base board 31 is typically fixed or attached to a structure or as will be described below the fixed base board 31 may be removed and the surface 91 of the vehicle 90 may be utilised as the fixed base board 31. The moveable base board 32 is pivotally connected to the fixed base board 31 by hinges 40, 45. In a fashion the moveable base board 32 is cantilevered from the fixed base board 31 by the hinges 40, 45. This means the fixed base board 31 self supports the moveable base board 32 and the stairs or step ladder 70. Unlike the prior art where the ladder is used to support the moveable base board from the ground.

The base boards 31, 32 are perforated over a substantial surface area of the base boards 31, 32. The perforations 110, 111 are largely formed in two sizes and are flute or a fluted shape to allow air to pass through the support surface of the base boards 31, 32. The perforations 110, 111 allow air to circulate through and around the base boards 31, 32. While the perforations are illustrated in the fluted or slotted form it is understood that any shape and/or size combination of perforations could be utilised to allow the flow of air in and around the base boards 31, 32. In a preferred embodiment the base boards 31, 32 are perforated substantially over both base board portions 31, 32 with the exception of the areas running along each outer side of the base boards 31, 32 were the hinges 40, 45 and support member brackets 56 are mounted and a central passage through the middle of the base boards 31, 32. Alternatively, the perforations 110, 111 extend over approximately 50% of the support surface formed by the fixed and moveable base portions 31, 32. The perforations 110, 111 may be formed using any known process such as by a dimple die punch to form the perforations.

The hinge means 40, 45 are fitted between both base boards 31, 32. Each hinge 40, 45 consist of a first hinge bracket 41, 46 attached or fixed to the fixed base board 31 and a second hinge bracket 42, 47 attached or fixed to the moveable base board 32. Each first hinge bracket 41, 46 is attached to the fixed base board 31 at a position spaced from the edge and on opposing edges of the base board 31, this space allows the collapsible hood bracket 56 to be mounted at a position adjacent the edge of the base board 31. Each second hinge bracket 42, 47 is mounted adjacent opposing edges of the moveable base board 32.

As described above, it is the combined heights of the first and second hinge brackets 41, 46, 42, 47 which space the moveable base board 32 above the fixed base board 31 in the folded or stored position as illustrated in the following figures. This space allows the folded mattress 100 to be confined between the two base boards 31, 32 and the hinges 40, 45 in the stored position. The hinge brackets 41, 42 are pivoted to each other around the pivot pin 43 and in the open or unfolded position the backs 44 of each bracket 41, 42 form the hinge stops for the open position of the base boards 31, 32. Likewise, the hinge brackets 46, 47 are pivoted to each other around the pivot pin 49 and in the open or unfolded position the backs 60 of each bracket 46, 47 form the hinge stops for the open position of the base boards 31, 32.

As shown the collapsible hood 50 has three support frame members 52, 53, 54 which are pivotally connected to brackets 56 located on either side of the base 30. The three support frame members 52, 53, 54 are connected to the pair of brackets 56 on the fixed base board 31, so that they pivot as the tent 10 is assembled or stowed. The pivot points for the three support frame members or poles 52, 53, 54 are spaced apart on the brackets 56, so that they do not interfere with one another as the support members 52, 53, 54 move between the stored and erected positions. In order to assist with the opening and closing of the collapsible hood 50 a gas spring or strut 58 is pivotally fitted between the centre support bracket 53 and the fixed base board 31. A gas spring or strut 58 may be fitted to only one side of the support member 53 or to both sides as illustrated in FIGS. 2 and 3. Likewise the gas spring 58 could also be attached to either of the other two support members 52 or 54. Also, while the present invention has been illustrated showing three support members 52, 53, 54, more or less support members may be fitted dependent upon the size and shape of the deployable shelter structure required.

The extension arm 55 is pivotally mounted on the third support arm 54 this extends the cover 51 over the area surrounding the stairs 70 to largely form the annex 130. An extension support arm or member 57 is also fitted to either side of the extension arm 55 and between the extension arm 55 and the support member 54 to support the arm 55 against the support member 54.

As described above the hinge bracket 47 extends along the length of the moveable base board 32 and is located adjacent the outside edge of the moveable base board 32. The hinge bracket 47 is extended to include the mounting bracket 48 for the pivoting stair or step ladder assembly 70. As shown in FIGS. 2 to 4 the stair or step ladder assembly 70 is pivotally mounted to mounting bracket 48 in a downwardly extending in-use position. The stair or step ladder assembly 70 comprises two stringers 72, 73 extending parallel to each other and separated a distance by the stair treads 71. A base portion 74 is pivotally mounted to the bottom of the stair or step ladder assembly 70.

The stair or step ladder assembly 70 also includes a pivotally mounted handrail assembly 80 and a stair brace support 81. The handrail assembly 80 includes the tubular handrail 95 and is mounted for movement around the outer stringer 73 from a stored position in which the handrail is located at the rear of the stair or step ladder assembly 70 and movable through a non-included angle of approximately 270 degrees to the in-use position. The stair support brace 81 includes the stair guide channel 84 and stair support brace release pin 95 which allows the stair support brace 81 to be extendable to move in and out to accommodate for un-level ground beneath the end of the stair or step ladder assembly 70. The stair support brace 81 is also designed to ensure that the stair assembly 70 moves substantially in an arc from a stored position where the stair assembly 70 is aligned with an edge or side of the moveable base portion 32 and the downwardly extending in-use position.

FIG. 4 illustrates a view of the bottom of the deployable shelter structure 10 in the deployed or operational position. The base boards 31, 32 are manufactured from a lightweight aluminium material. The aluminium base material is laser cut from a sheet of aluminium. The base may also be further reinforced with u-shaped channels 35 attached to the bottom of the base boards 31, 32. The method of manufacture provides the base boards 31, 32 with the strength and rigidity required to form the base structure 30. Alternatively, the base boards 31, 32 may manufactured using any other known processes, such as they could be turret punched or turret pressed which are a type of punch press used for metal forming by punching.

FIGS. 5 to 13 illustrate the deployable shelter structure 10 in the folded or stored clam-shaped configuration, in this position the structure 10 is stored ready for transport on the vehicle 90. A transit cover or case 120 is placed over the structure 10 and attached to one side of a double sail track 66 on the base edge strip 34 located on the outer peripheral edge of the base board 31. The other side of the double sail track 66 is attached to the collapsible hood cover 51. The removable transit cover 120 protects the deployable shelter structure 10 from rain, bugs, road debris, etc.

As described the attachment of the transit case 120 to the base board 31 is by a rope or sail track 66 but could be fitted to the base board 31 by any other suitable means around the peripheral edge 34. Alternatively the transit case 120 may simply be placed over the deployable shelter structure 10 to substantially cover the structure 10 and secured by straps, ropes or cords placed around the complete structure.

The transit case 120 is manufactured from a similar material as the tent cover 51. When the transit case 120 is fitted permanently to the base board 31 some form of releasable fastener (not shown) is required to allow for easy removal and storage of the transit case 120. For example, the transit case fastener may be a simple zip fastener utilised for its air and water tightness. Other alternative fasteners may be snap fasteners or hook and loop fasteners such as Velcro.

Figure 5:
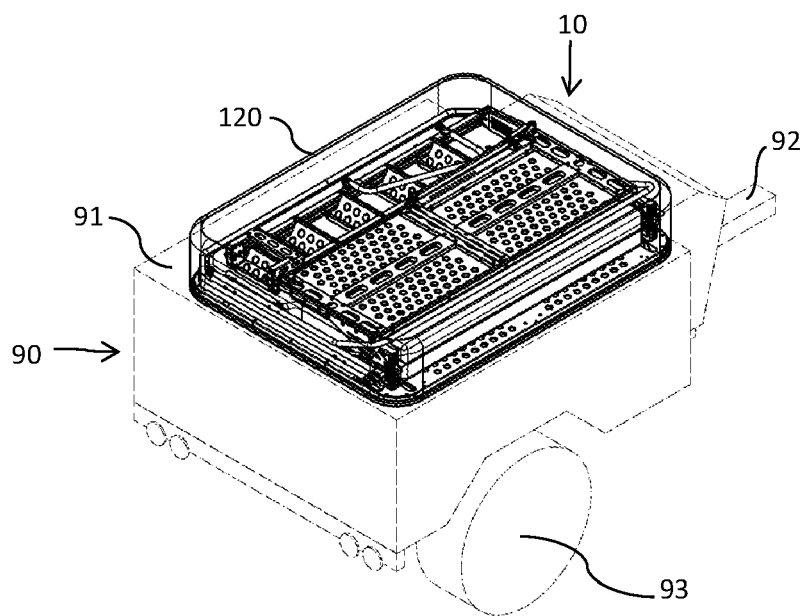
FIG. 5 illustrates a collapsed tent stored for transport on a vehicle with the tent transit cover drawn as see-through to illustrate the compact nature of the present invention.
Figure 6:
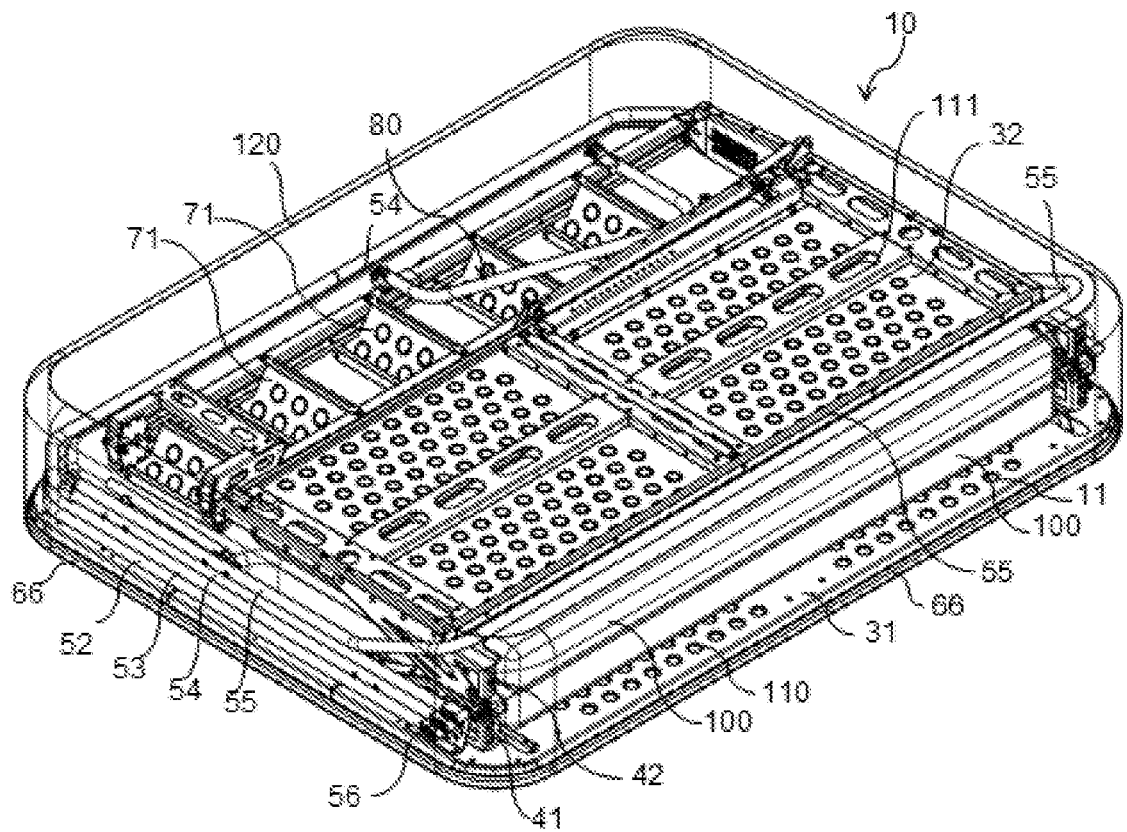
FIG. 6 shows a rear first side view of the tent structure of FIG. 5 removed from the vehicle with the tent transit cover drawn as see-through to illustrate the placement of the component parts of the present invention.
Figure 7:
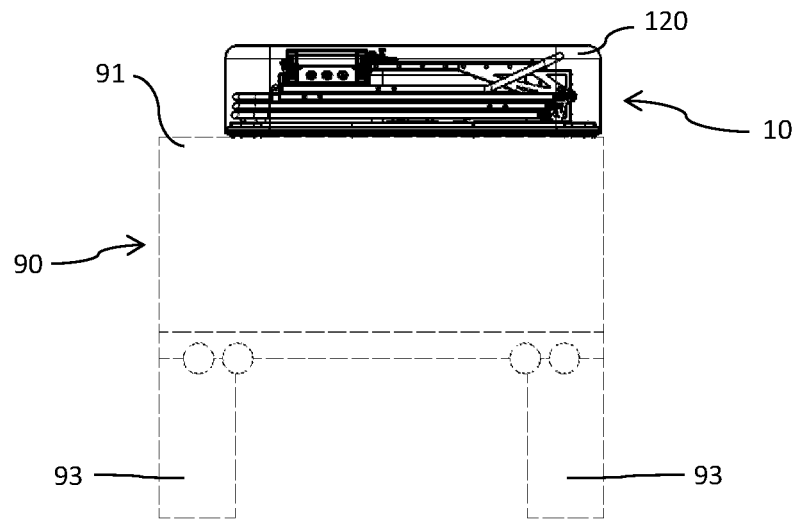
FIG. 7 shows a rear view of the collapsed tent structure of FIG. 5.
Figure 8:
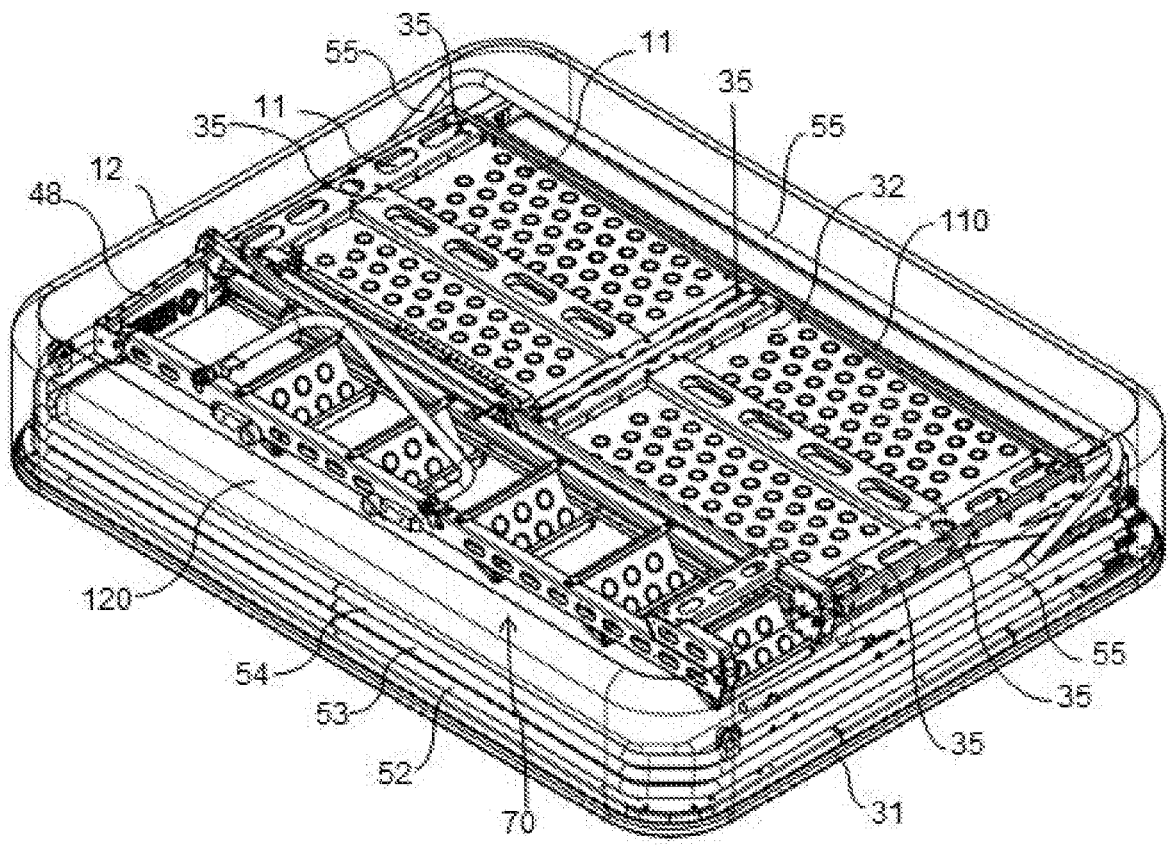
FIG. 8 shows a rear second side view of the tent structure of FIG. 5 removed from the vehicle with the tent transit cover drawn as see-through to illustrate the placement of the component parts of the present invention.
Figure 9:
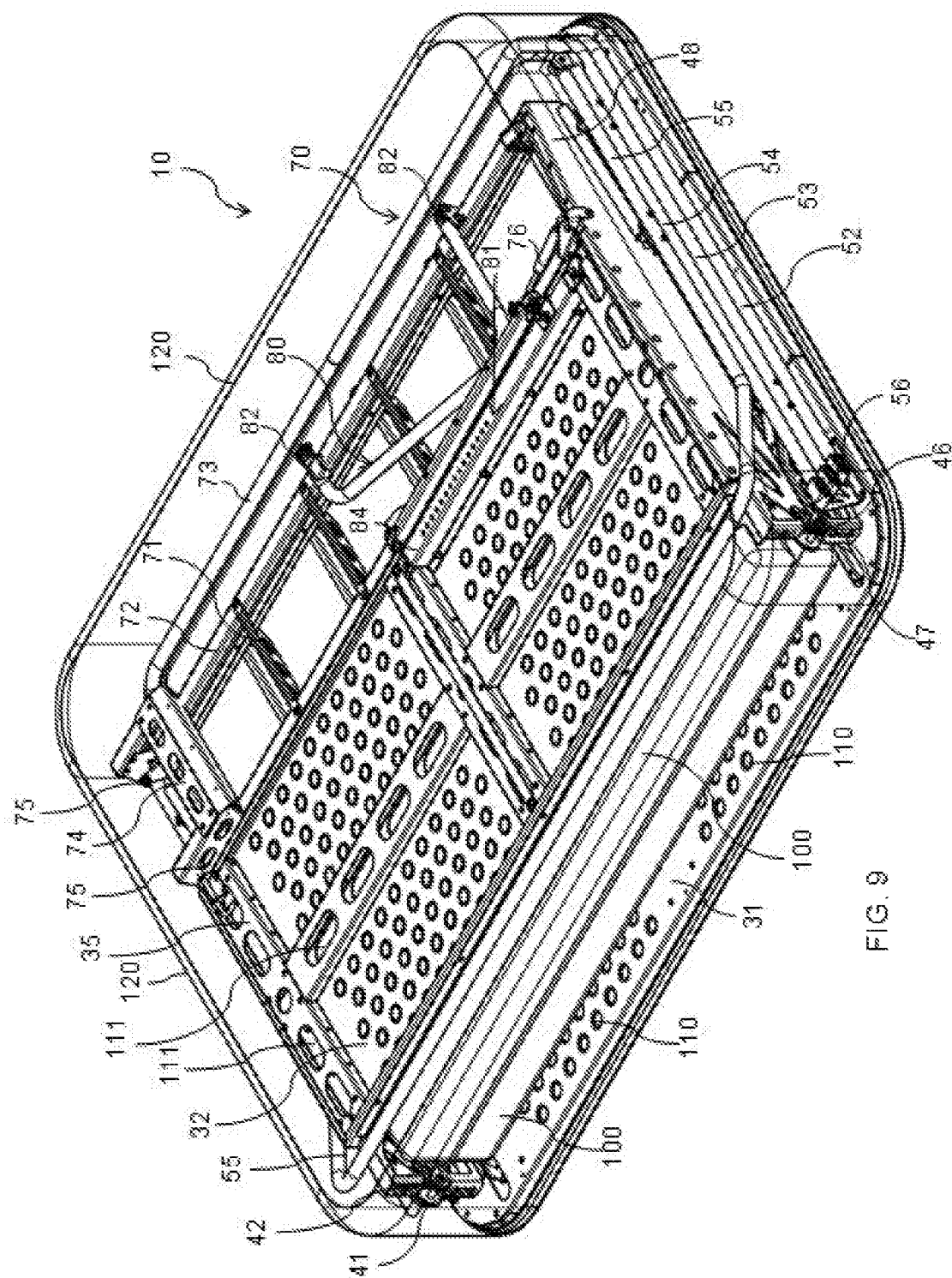
FIG. 9 shows the first side front view of tent structure of FIG. 5 removed from the vehicle with the tent transit cover drawn as see-through to illustrate the placement of the component parts of the present invention.
Figure 10:
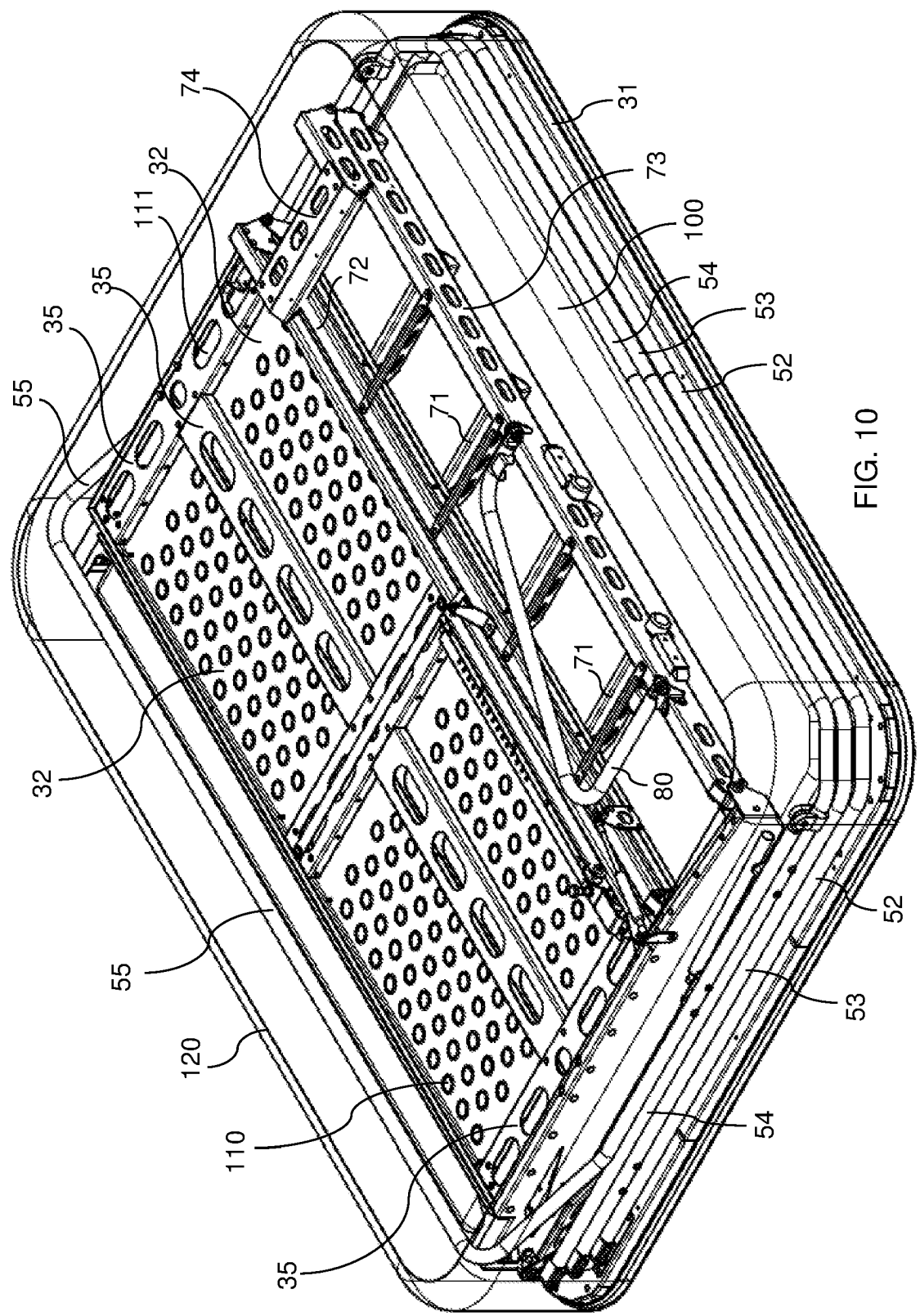
FIG. 10 shows the front second side view of the tent structure of FIG. 5 removed from the vehicle with the tent transit cover drawn as see-through to illustrate the placement of the component parts of the present invention.

FIG. 5 shows the compact stored deployable shelter structure 10 mounted to the top surface 91 of a trailer 90. The trailer 90 is generally an unpowered vehicle towed by a powered vehicle. The trailer 90 having wheels 93 and a towing hitch 92. The fixed base portion or base board 31 is fixed to the top structure or surface 91 of the trailer 90. The fixed base portion 31 is drilled and riveted to the top surface 91 with a suitable adhesive applied between surfaces to ensure a water tight seal. Alternatively a rubber or other type of gasket may be placed around the edge of the fixed base board 31 prior to the base board 31 being fixed to the surface 91 of the trailer 90 to provide the water tight seal.

When the deployable shelter structure 10 is being transported, the structure 10 including the base 30 and the collapsible hood 50 are placed in a collapsed clam-shell configuration enclosed within the transit case 120. This improves aerodynamics, protects the tent and structures from the elements and minimises space. Typically the tent and shelter structure 10 is folded into a suitcase or clamshell configuration, whereby the "footprint" of the base 30 of the shelter structure 10 is approximately doubled (increased by 100%) when the shelter structure is opened for use. Other configurations to reduce the footprint of the base 30 of the shelter structure 10 for transportation may be employed. For example, the shelter structure 10 may be folded into a configuration, whereby the footprint of the base 30 of the structure is increased by 50% or more, 80% or more, or even 150% or more, when the shelter structure 10 is opened for use. The materials of construction and design of collapsible tents are known to those skilled in the art. For example, ripstop nylon supported by aluminium poles may be used.

In other alternative embodiments the deployable structure 10 may be attached or fixed to the roof of a vehicle. By way of example only and by no way limiting the deployable structure 10 may be fitted to the roof of a vehicle in such a way that it may be quickly and easily removed. A pair of conventional lateral top carrier supports, preferably, being of the steel bar type which engage in the vehicle rain gutters, are first mounted to the car in properly spaced relation. For modern vehicles without roof rails a fitting kit, which attaches the system to the vehicle is required. For example, the fitting kit attaches with clamps around the upper edge of the front and back door jams to hold the roof rack onto the vehicle. The deployable structure 10 is then located and the base board 31 is attached to the lateral supports by an appropriate fixing means.

In the folded or stored clam shell position as illustrated in FIGS. 6 to 13 the fixed and moveable base portions 31, 32 generally face each other. The hinges 40, 45 space apart the fixed base portion 31 and the moveable base portion 32 a pre-determined distance which allows the mattress 100 to be stored and confined in an area defined between the fixed and moveable base boards 31, 32 and the hinges 40, 45. In this position the stair or step ladder assembly 70 is aligned with an end of the moveable base board 32 opposite to that of the hinged sides of the base boards 31, 32.

Also, in the stowed position the collapsible hood 50 and it component parts comprising the support members 52, 53, 54, the extension member 55 and the cover 51 are stored substantially adjacent three sides of the fixed base portion 31 and lying on top of one another. In this configuration the support members 52, 53, 54 are approximately the same size. The extension member 55 which is pivotally attached to support member 54 and is supported on top of extension member 54 but lying in the opposite direction to the other members 52, 53, 54. That is the extension member 55 has a side which lies along the other side of the fixed baseboard 31 opposite to that of the other members 52, 53, 54. Alternatively the support members 52, 53, 54 and extension member 55 may have slightly different sizes so that they nest together to further reduce the space required to store the collapsible hood 50.

Figure 11:
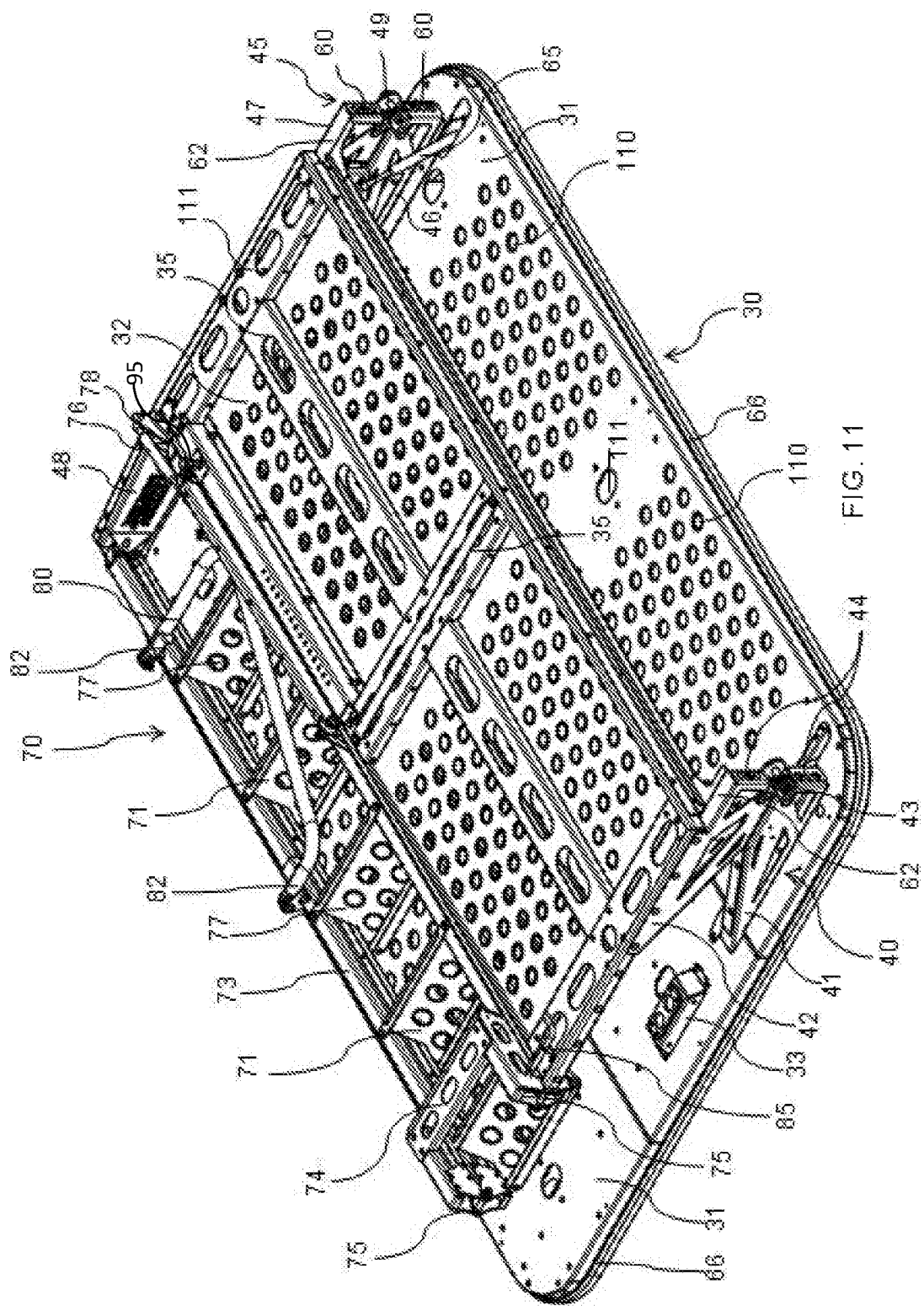
FIG. 11 shows a rear first side view of the stored tent structure of FIG. 5 with some components removed for clarity.

FIG. 11 shows the deployable shelter structure 10 with some components removed to improve clarity. The mattress 100, the collapsible hood 50 and the transit case 120 have all been removed in order to better show the main components of the present invention. In particular, the hinges 40, 45, with the first hinge brackets 41, 46 mounted to the fixed base portion 31 and the second hinge brackets 42, 47 mounted to the moveable base portion 32. This allows the moveable base portion 32 to be pivoted with respect to the fixed base portion 31 and spaced apart from the fixed base portion 31 to accommodate the mattress 100. Also illustrated in FIG. 11 the cut-outs 62, which when the moveable base portion 32 is unfolded the cut-out sections 62 rest upon the outside edge section of the fixed base portion 31. The hinges 40, 45 allow the moveable base portion 32 and the stair assembly 70 to be self-supported from the fixed base portion 31.

Also located on the fixed base portion 31 are the power input terminals 33. The power input blocks 33 are located on either side of the fixed base portion 31 and include AC, DC and USB inputs. The power input blocks 33 provide the users with their power needs when the deployable structure 10 is in use.

A gas assisted spring and strut 65 is used to assist in the deployment of the moveable base portion 32 from the folded position in which the fixed and moveable base portions 31, 32 generally face each other and an unfolded position, in which the fixed and moveable base portions 31, 32 are generally coplanar and define the support surface for the user. The gas assisted spring and strut 65 is attached at one end to the fixed base portion 31 and at the opposite end to the second hinge bracket 42, 47. While two struts 65 are normally used, one strut 65 could be utilised in order to perform the task of unfolding the moveable base portion 32 from the fixed base portion 31.

FIG. 11 also illustrates the stair base 74 in the stored position were the stair base pivots 75 allow the stair base 74 to be rotated through 180 degrees so that it sits at the back of the bottom of the stair or step ladder assembly 70 substantially aligned with the back of the lower tread 71 of the stair or step ladder assembly 70. The required length of the stair or step ladder assembly 70 is determined by the mounting or mounted height above the ground of the deployable shelter structure 10. This variation in height can be provided for in one of two ways. Firstly, by simply varying the length of the folded stair base 74 to accommodate different heights, or secondly by extending the length of the stair or step ladder assembly 70 located above the folded stair base 74.

When the stair or step ladder assembly 70 is extended further minor adjustments to the extension of the stair assembly 70 can be performed by varying the length of the stair brace support 81. The stair brace support 81 can be adjusted in length to overcome any variations in un-level ground upon which the bottom of the stair assembly may rest. A stair support brace release pin 95, releases the stair support brace 81 and allows it to extend in length. The stair brace support 81 is typically a strut with a locking mechanism which allows the strut to be easily held in a number of discrete extended positions. Preferably the stair support brace 81 can vary the length of the stair or step ladder assembly 70 over a range in length of up to 15 cm to accommodate for uneven or un-level ground.

A latch assembly 85 is used to keep the stair assembly 70 in the stored positon aligned with an end of the moveable base portion 32. The latch assembly 85 is positioned on the bottom side of the moveable base portion 32 and adjacent the edge to which the stair or step ladder assembly 70 is aligned. A spring loaded latching pin assembly 85 is shown however any latching assembly could be utilised provided it secures the stair assembly 70 to the end of the moveable base portion 32. Alternatively the spring loaded latch 85 could be mounted on the stair or step ladder assembly 70 and secured to the moveable base portion 32.

Figure 12:
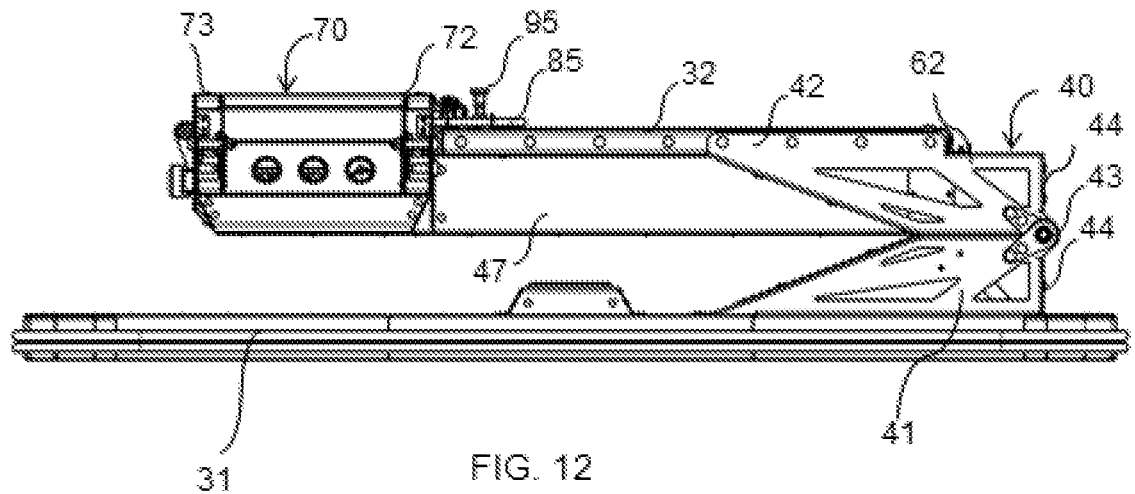
FIG. 12 shows the rear view of FIG. 11.
Figure 13:
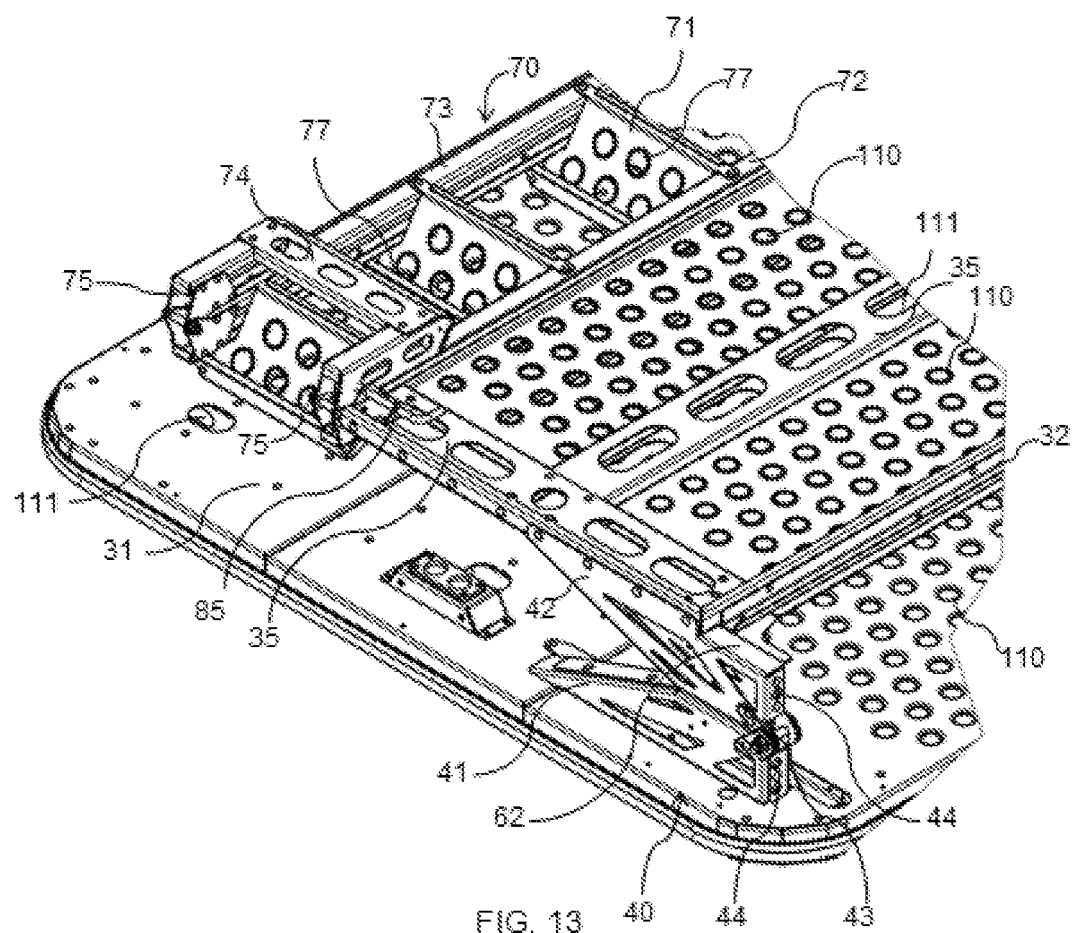
FIG. 13 illustrates a sectional rear and first side view of the deployable tent structure showing one side hinge in the stored position in accordance with an embodiment of the present invention.

FIGS. 12 and 13 show further detail of the second hinge means 40 when the deployable structure 10 is in the stored position. The second hinge 40 includes the first hinge bracket 41 attached to the fixed base portion 31 and the second hinge bracket 42 attached to the moveable base portion 32. The hinge brackets 41, 42 are connected by pivot pin 43 and as will be shown in later figures the hinge bracket backs 44 forms the stop for the hinge means 40. That is the backs 44 of the hinge brackets 41, 42 are abutted together when the base 30 is in the open or unfolded positon. Also shown here is the cut-out 62 located on the bottom edge of the second hinge bracket 42.

Figure 14:
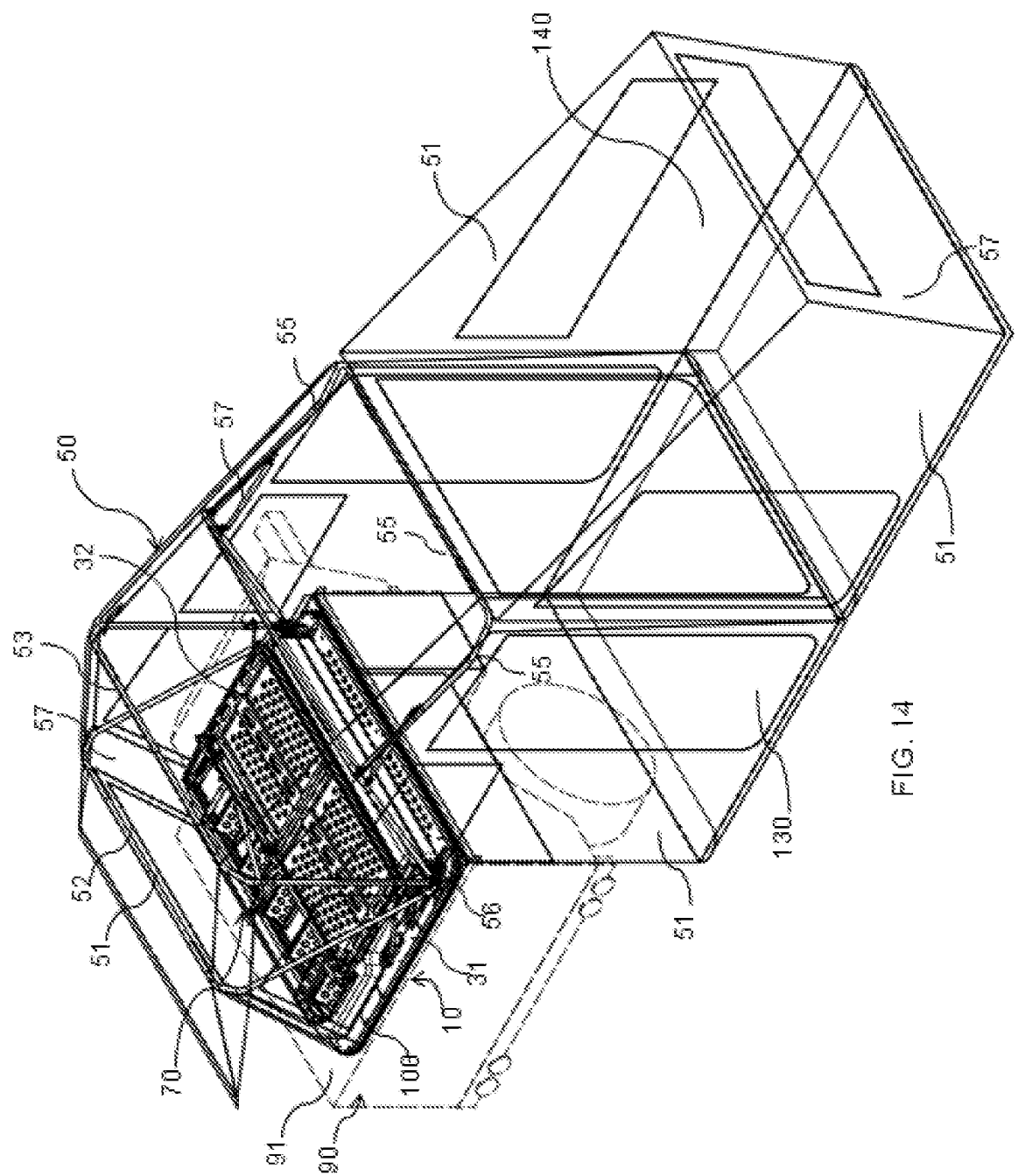
FIG. 14 illustrates a perspective rear first side view of the first stage of deployment of the deployable shelter structure with the tent support frame erected and showing the cover and annexes as see-through for clarity in accordance with an embodiment of the present invention.
Figure 15:
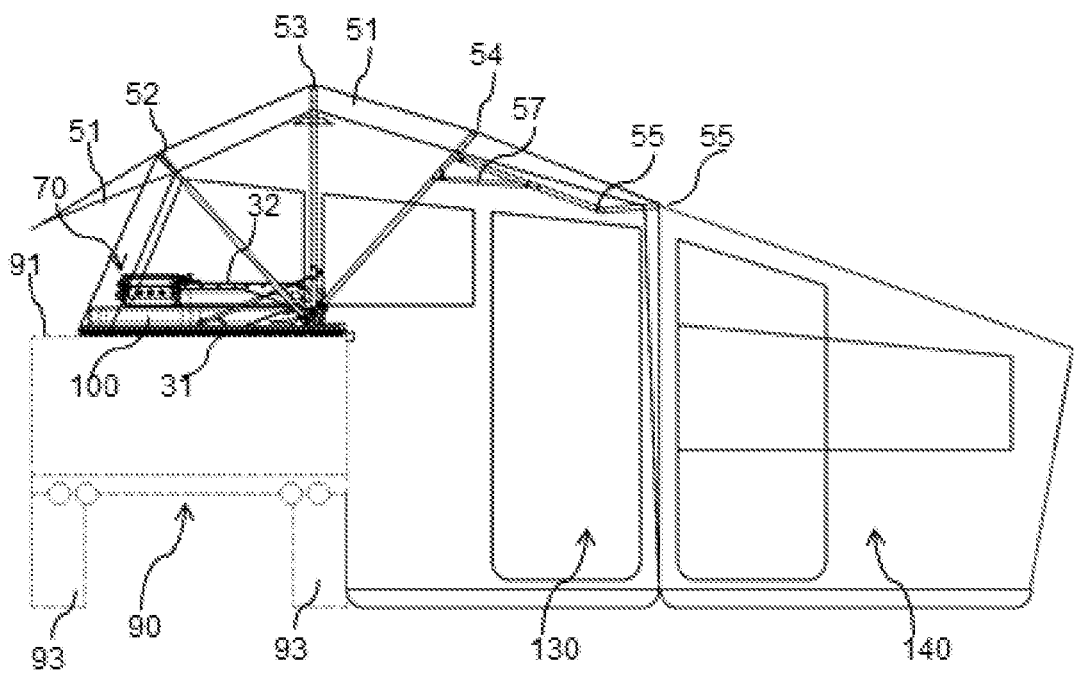
FIG. 15 shows the rear view of FIG. 14.
Figure 16:
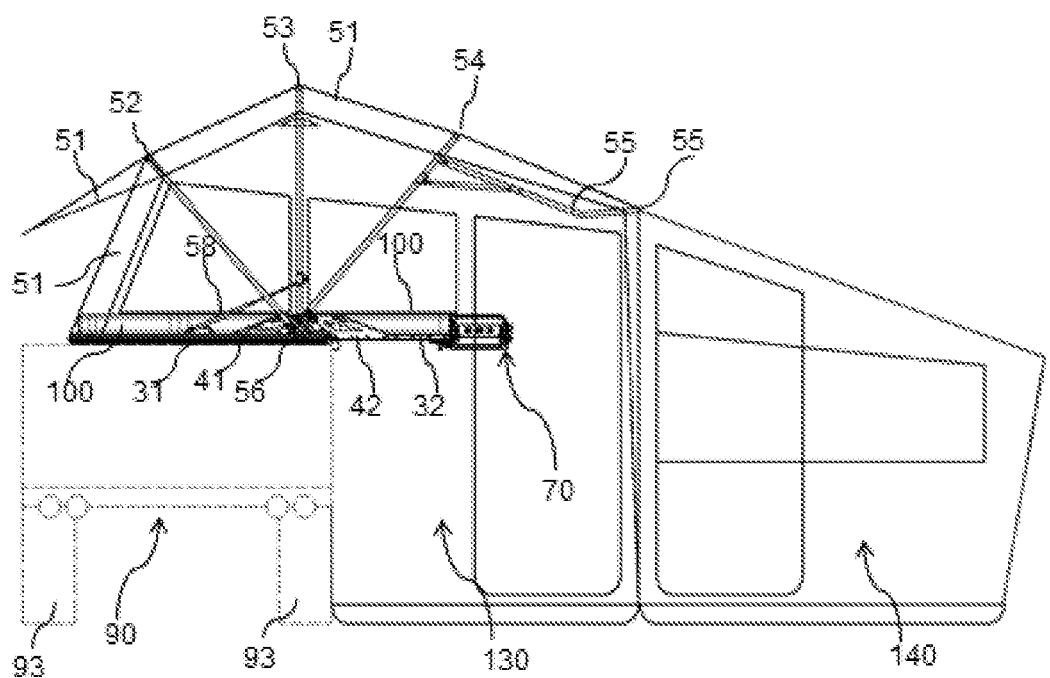
FIG. 16 shows the rear view of the second stage of deployment with the base platform unfolded in accordance with an embodiment of the present invention.

FIGS. 14 and 15 shows the first stage of deployment of the deployable shelter structure 10 with the collapsible tent support frame or hood 50 erected. The tent cover 51 and annexes 130, 140 have been drawn as see-through for clarity of the underlying structure. With the transit case 120 removed a user will begin to erect the deployable shelter structure 10. The first step is to erect the collapsible hood 50 by pulling forward on the extension arm 55 located just above the back edge of the moveable base portion 32. The extension arm 55 is pivotally connected to the third support arm 54, which along with the other support arms 52, 53 are pivotally mounted to brackets 56. As the extension arm 55 is pulled forward the remaining support arms 52, 53, 54 will also move towards the erected positions above the base 30. The extension arm 55 also includes an extension arm support 57 connected between either side of the extension arm 55 and the support arm 54. This extension arm support 57 simply provides support to the extension arm 55 due to the span which this arm is required to cover.

The system of three pivoting support arms or poles 52, 53, 54 is connected together by fabric straps forming part of the cover 51. At one end, the fabric strap 51 is attached to the outside edge of the fixed base fixed portion 31 of the base 30, while at the other end, the fabric 51 passes over the extension arm 55 to form the first annex 130. The fabric strap 51 is attached to the outside edge of the fixed base portion 31 by any of the devices known to those skilled in the art. For example, a sail or rope track 66 may be fitted to the outside edge of the fixed base portion 31 and the fabric strap 51 may have a material cord such as a keder track rope or tape fitted to a bottom edge for threading through or engaging with the sail or rope track 66. The attachment of the fabric strap or cover 51 to the base 30 effectively provides a weatherproof seal between the fabric cover 51 and the base 30 of the deployable shelter structure 10. The cover 51 or as shown as the tent walls 51 and annexes 130, 140 are constructed from breathable fabric that is UV resistant and 100 percent waterproof. The fabric straps 51 are also frictionally engaged at specific positions on the three pivoting support arms or poles 52, 53, 54 so that the deployable shelter structure 10 has the desired shape in the assembled state. Thus, when the extension arm 55 is pivoted into the deployed position, the fabric straps 51 will draw the three support arms 52, 53, 54 with them, pivoting them into spaced arrangement about the pair of brackets 56 on the fixed base portion 31 of the base 30.

Conversely, when the extension arm 55 is pivoted into the stowed position, the fabric straps 51 will relax and allow the three pivoting support arms 52, 53, 54 to pivot back into the stowed position. The fabric straps 51 are typically sewn into a loop at each point in which they cross the three pivoting support arms 52, 53, 54, so the fabric straps 51 are in frictional engagement with the three pivoting support arms 52, 53, 54. Also assisting with moving the support arms 52, 53, 54 to the erected position are the two gas spring struts 58 located on either side of the support arm 53 and connected to the fixed base portion 31. The gas struts 58 are attached to an outer edge of the power block terminal 33 on either side of the fixed base portion 31.

As shown in FIGS. 14 and 15 a second annex 140 can be attached to the first annex 130 to further enlarge the shelter. It should also be noted that the annexes 130, 140 can be of any size or shape and contain any number of windows or door openings as required. Likewise, further annexes may be attached to further enlarge or change the shape of the shelter.

FIGS. 16 to 23 illustrate the next stage of deployment of the deployable shelter structure 10. With the collapsible hood 50 erected the base 30 is unfolded in order to provide the support surface which is dimensioned to at least support one user. Preferably the support surface will be dimensioned to support two adult users. In the unfolded position, in which the fixed and moveable base portions 31, 32 are generally coplanar, they define the support surface. In this embodiment the support surface is supported off of the ground on the trailer 90. With the moveable base portion 32 unfolded away from the fixed base portion 31, the hinge means 40, 45 self-support the moveable base portion 32 from the fixed base portion 31. This gives the impression that the moveable base portion 32 is cantilevered from the fixed base portion 31 fixed to the trailer support surface 91.

Figure 17:
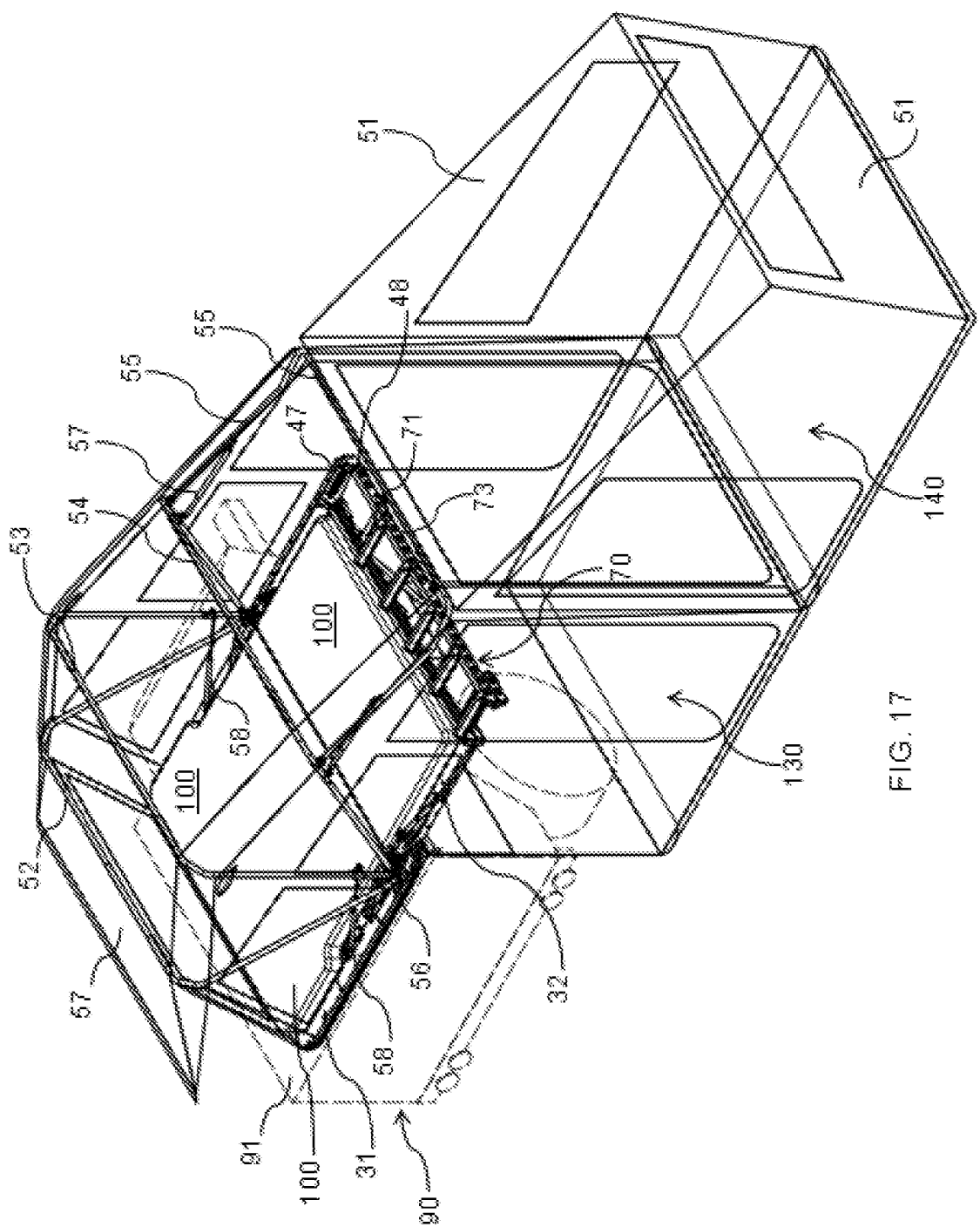
FIG. 17 illustrates a perspective rear first side view of the second stage of deployment with the tent support frame erected, the base platform unfolded and showing the cover and annexes as see-through for clarity in accordance with an embodiment of the present invention.

FIG. 17 shows the mattress 100 unfolded and supported upon the base 30. In this position the stair or step ladder assembly 70 is still aligned with the end of the moveable base portion 32. Typically the mattress 100 is a soft foam mattress with a thickness between 50 to 100 mm. Preferably, the mattress 100 is a 75 mm high-density foam mattress designed to comfortably sleep two adults. Alternatively should more comfort be required a 100 mm thick high density foam mattress is used. Alternatively other types of mattress 100 may be used as known in the camping industry. For example, modern memory foam mattresses, mattresses including different foam types, gel or latex mattresses or inner spring mattresses.

The soft foam mattress 100 terminates short of the sides of the fixed and moveable base portions 31, 32 so that pockets remain along edges of the mattress to provide elbow room to the users and also define spaces in which the collapsible hood 50, the cover or tent fabric 51 and the support arms 52, 53, 54 may seat when the deployable shelter structure 10 is in the stored position.

Figure 18:
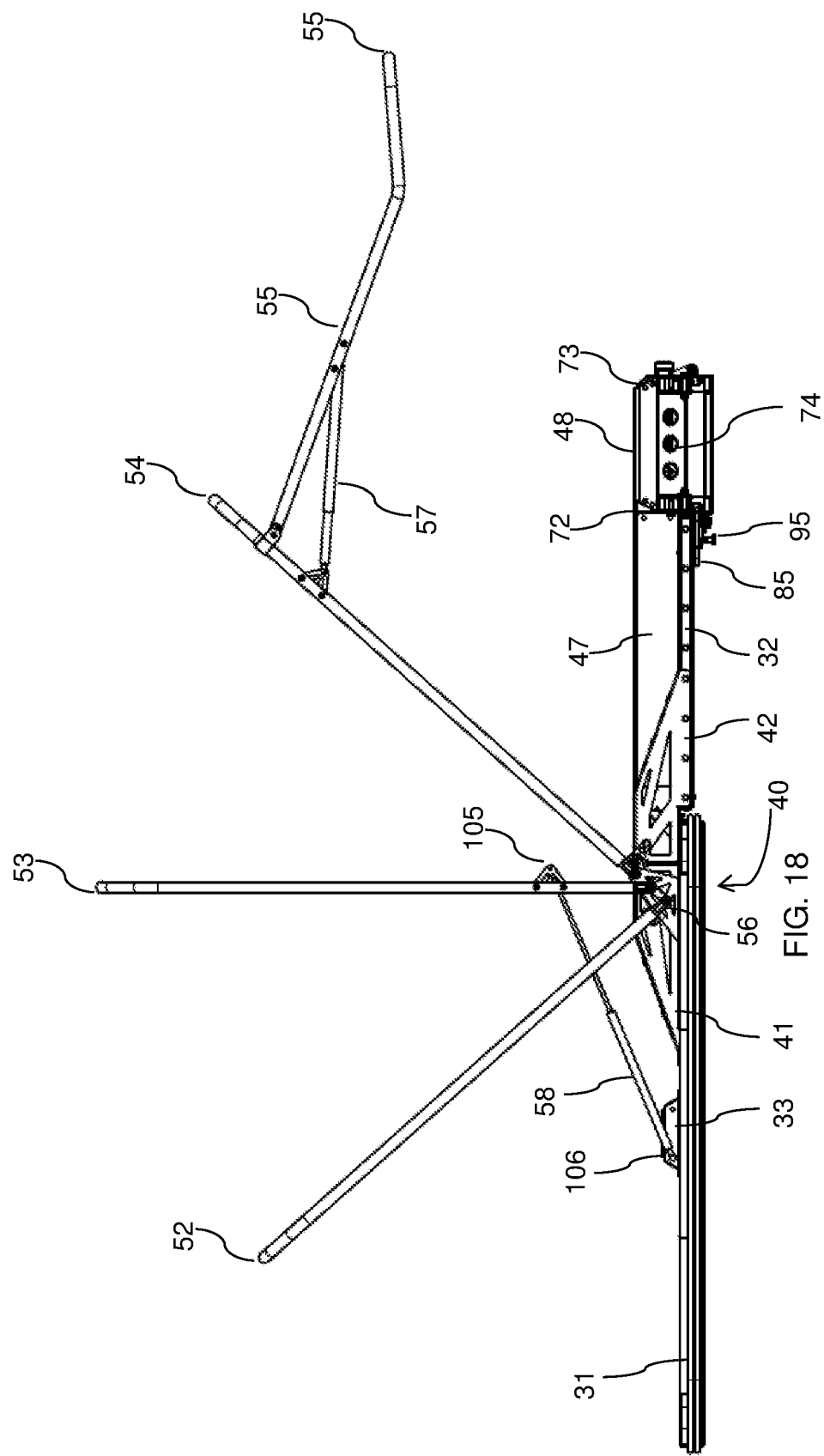
FIG. 18 shows a rear view of the deployable shelter structure in the second stage of deployment as shown in FIG. 17 with some components removed for clarity.
Figure 19:
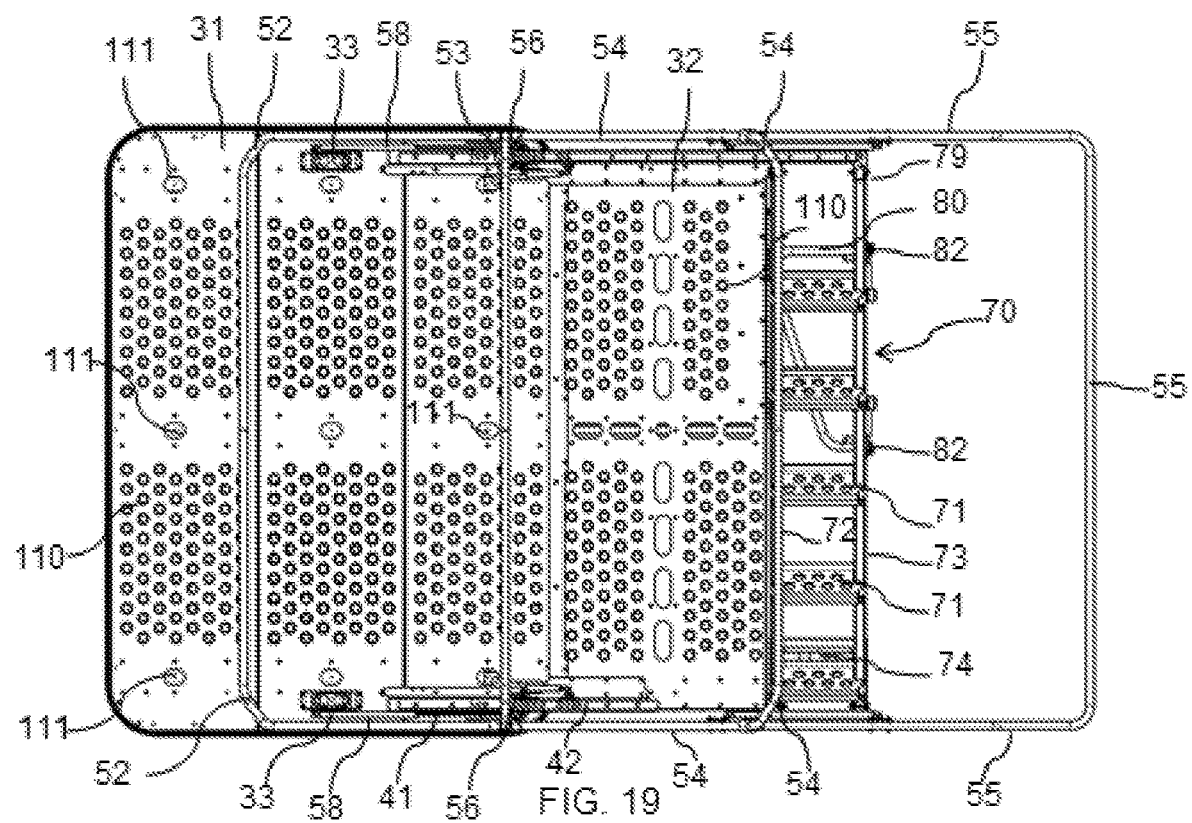
FIG. 19 shows a top view of the deployable shelter structure in the second stage of deployment as shown in FIG. 17.
Figure 20:
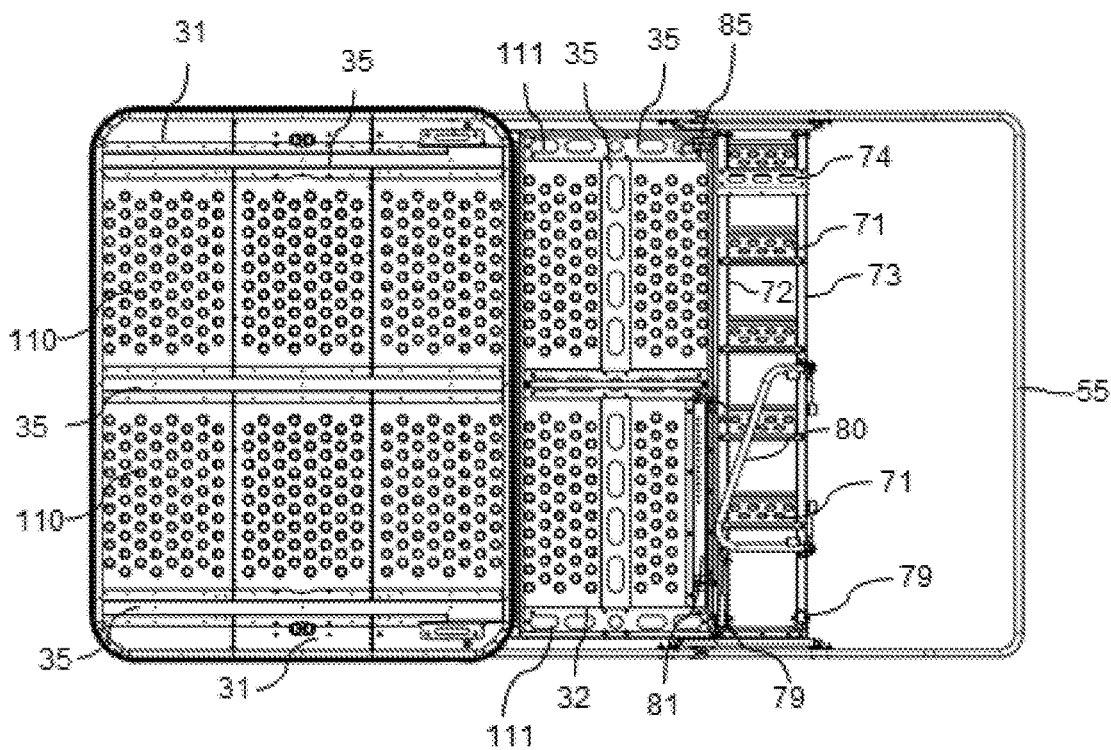
FIG. 20 shows a bottom view of the deployable shelter structure in the second stage of deployment as shown in FIG. 17.

FIG. 18 illustrates the deployable shelter structure 10 with the vehicle 90, cover 51 and the mattress 100 removed for clarity of the underlying structure. The support arm gas spring 58 is shown pivotally connected 106 at one end to the outside edge of the power terminal outlet 33 on the fixed base portion 31 and at the other end pivotally mounted on the second support arm 53 by the pivot member 105. FIG. 19 shows the top view of the unfolded base 30 with the stair or step ladder assembly 70 aligned with the end of the moveable base portion 32. In this position the handrail assembly 80 is located underneath the stair assembly 70 as is better illustrated in FIG. 20. Also shown in FIG. 20 is the stair support brace 81 which in the stowed or stair up position the guide arm 84 runs parallel along and adjacent the bottom outside edge of the moveable base portion 32.

Figure 21:
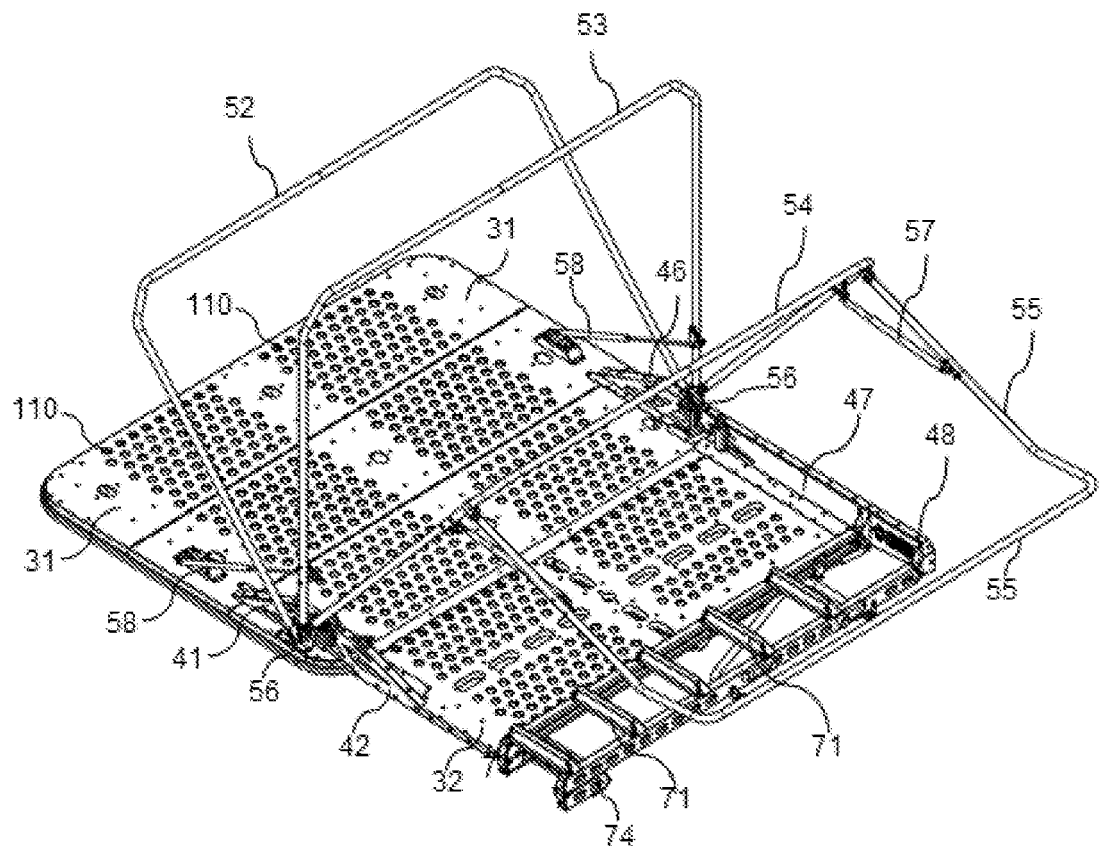
FIG. 21 shows a rear first side perspective view of the deployable shelter structure in the second stage of deployment as shown in FIG. 17.
Figure 22:
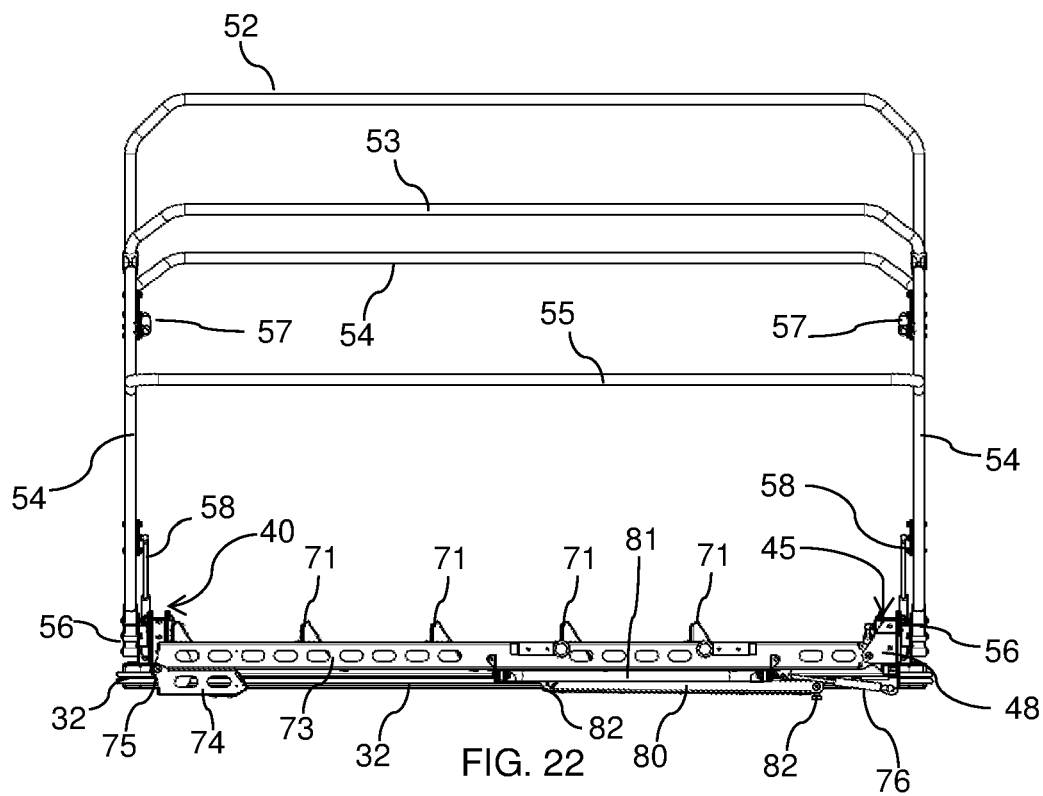
FIG. 22 shows a first side view of the deployable shelter structure in the second stage of deployment as shown in FIG. 17.
Figure 23:
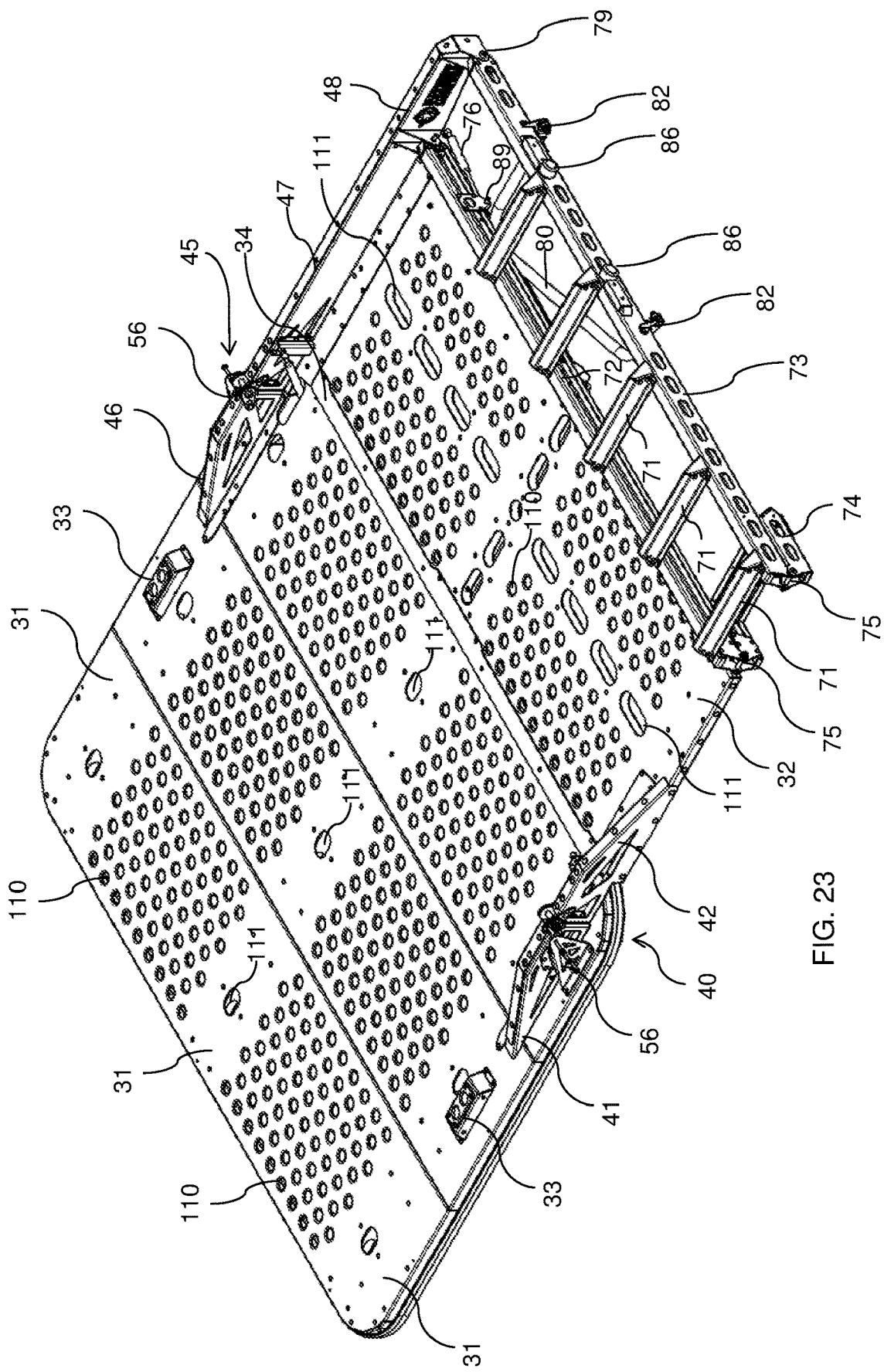
FIG. 23 illustrates a rear first side view of the deployable shelter structure in the second stage of deployment as shown in FIG. 17 with the tent support frame removed for further clarity.

FIGS. 21 and 22 show further views of the deployable shelter structure 10 in the second stage of deployment. In particular FIG. 22 illustrates the position of the support arms 52, 53, 54 and the extension arm 55 above the unfolded base 30. FIG. 23 has the collapsible hood support arms 52, 53, 54 removed to further improve the clarity of the underlying components. The first hinge means 45 is shown with the first hinge bracket 46 attached to the fixed base portion 31. The second hinge bracket 47 extends along the length one side of the moveable base portion 32 and connects with the stair mounting extension 48. Also illustrated here is the cover strip 34 which extends from the inside edge of the moveable base portion 32 and over the outside edge of the fixed base portion 31, to cover the join between the fixed and moveable base portions 31, 32.

Figure 24:
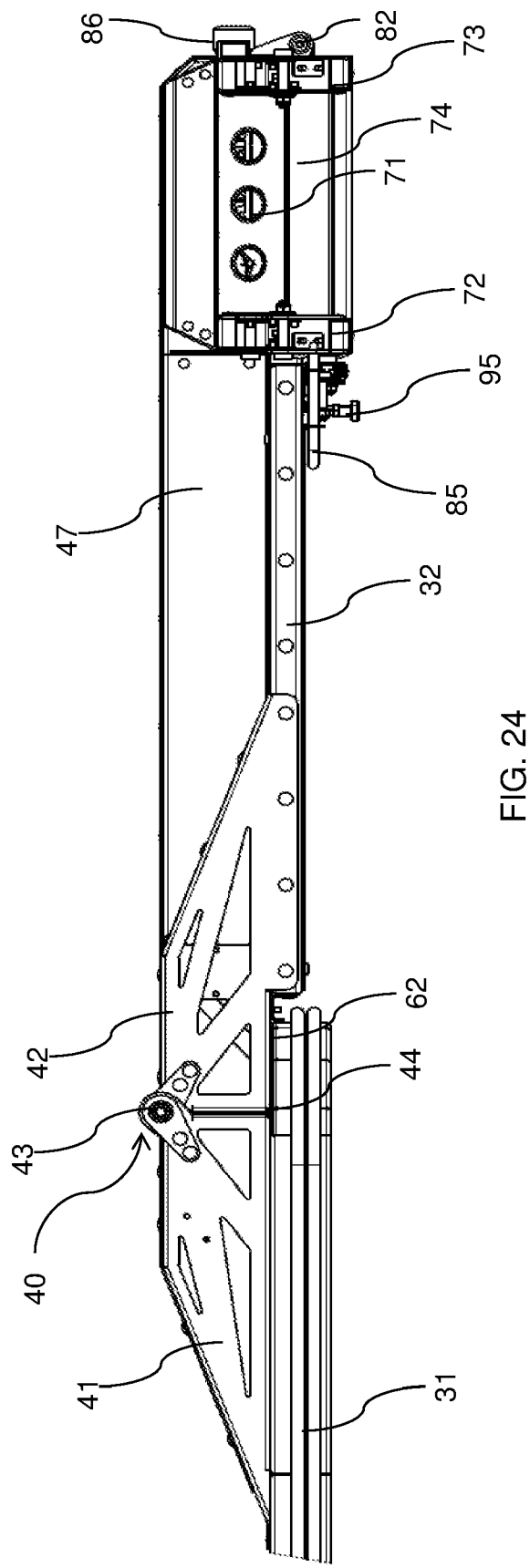
FIG. 24 shows a section view from the rear side of the shelter showing one side hinge and the stair assembly in the stored position in accordance with an embodiment of the present invention.

FIG. 24 in the foreground shows the second hinge means 40 with the first hinge bracket 41 attached to the fixed base portion 31 and the second hinge bracket 42 attached to the moveable base portion 32. In the background are the first hinge means 45 and the second hinge bracket 47. The first hinge bracket 41 is mounted to the fixed base portion 31 at a position spaced away from the front edge of the fixed base portion 31. This effectively moves the pivot axis and the pivot point 43 away from the edge of the fixed base board 31 to reinforce and strengthen the connection between the fixed and moveable base boards 31, 32. As is shown the weight of the moveable base board 32 is completely suspended and supported by the fixed base board 31. As shown this requires the bottom of the second hinge bracket 42 to have a cut-out section 62 which is supported upon the area adjacent the edge of the fixed base board 31. This also ensures that the unfolded moveable base board 32 forms a level support surface for the mattress 100. With the moveable base board 32 fully extended the second hinge brackets 42, 47 rest upon the area defined under the cut-out 62 on the fixed base board 31 and the back edges 44 of the first and second hinge brackets 41, 46, 42, 47 abut to form the stop for the hinge means 40, 45 and the moveable base board 32.

Figure 25:
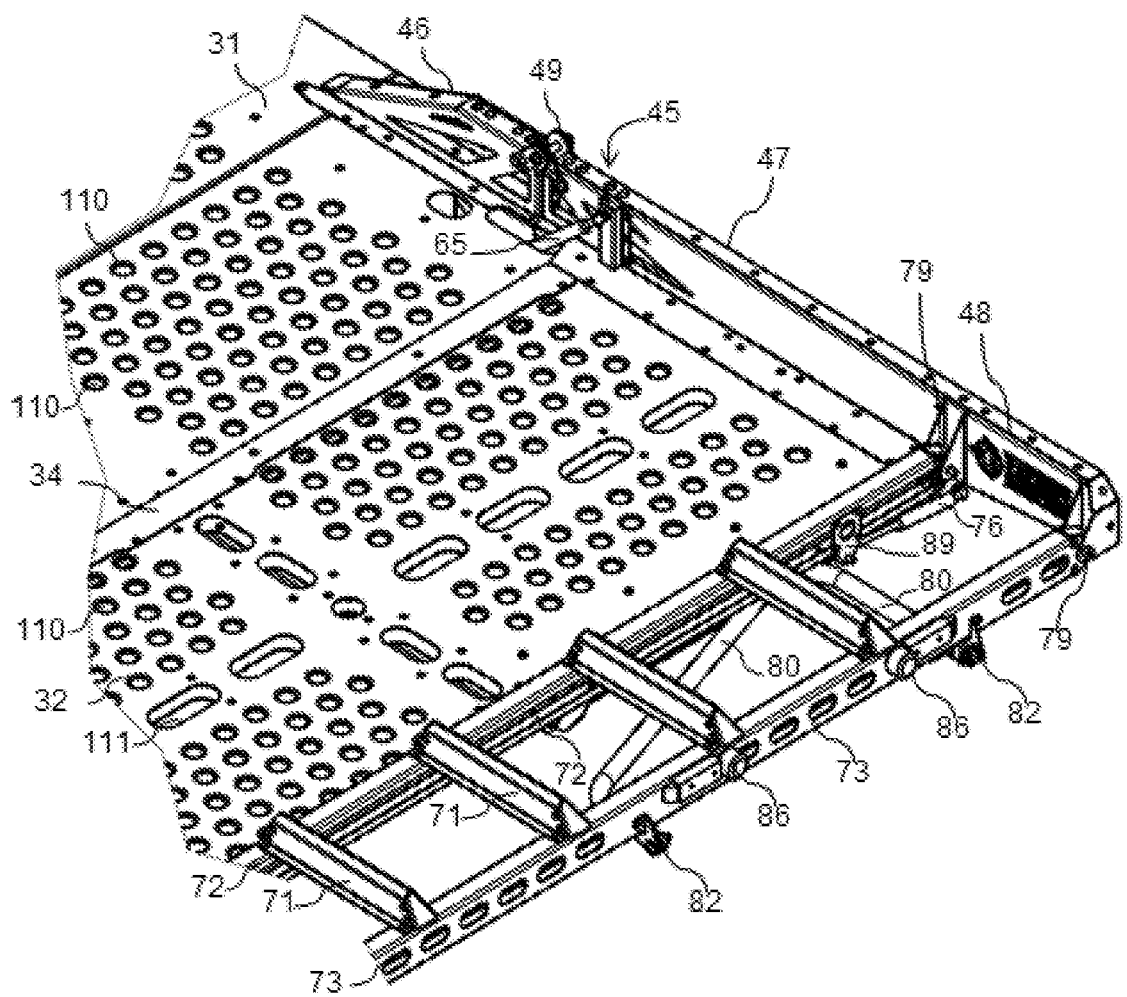
FIG. 25 shows a sectional first side view of the other hinge and the stair assembly in the stored position in accordance with an embodiment of the present invention.
Figure 26:
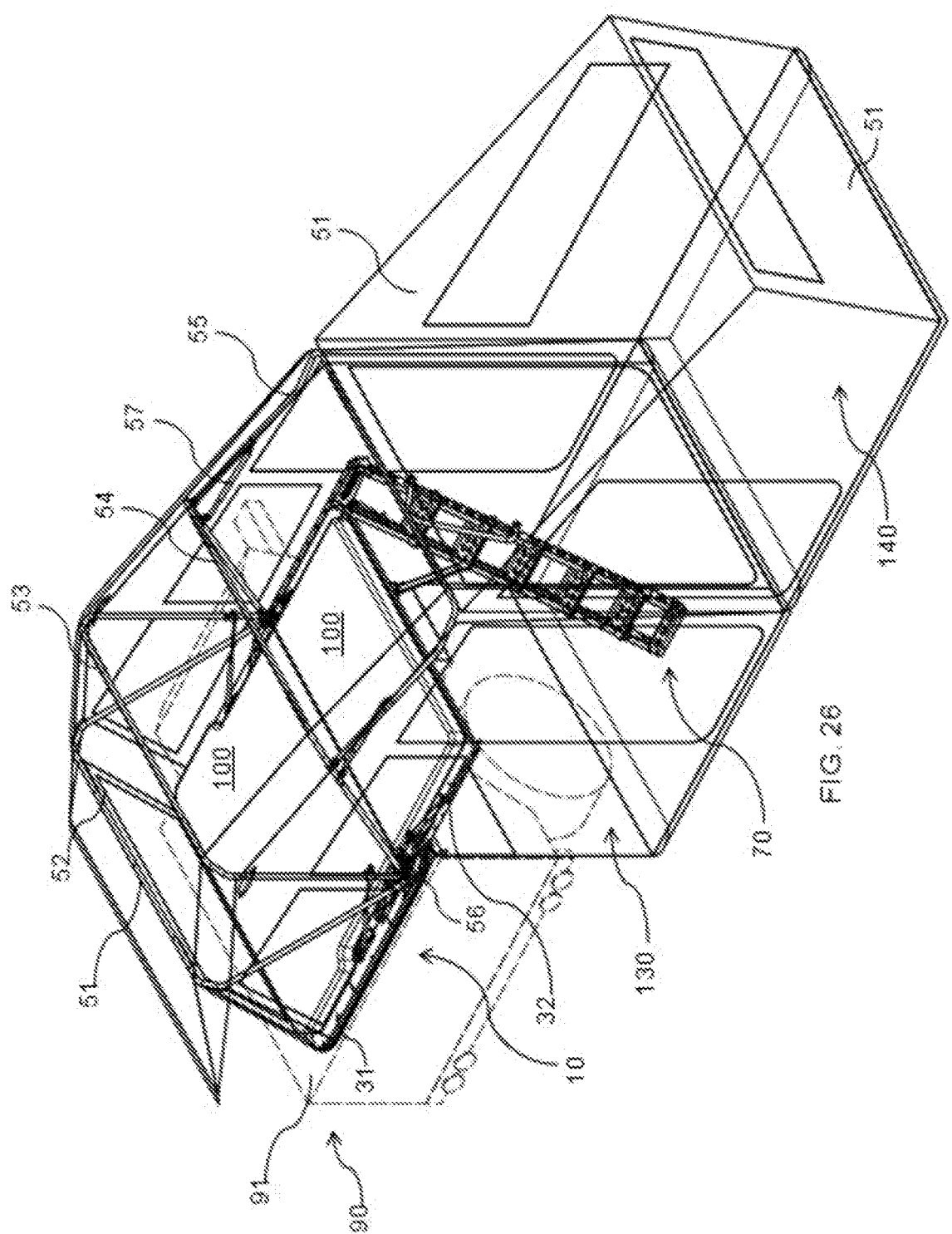
FIG. 26 illustrates a perspective rear first side view of the third stage of deployment with the tent support frame erected, the base platform unfolded and the stair assembly deployed and showing the cover and annexes as see-through for clarity in accordance with an embodiment of the present invention.
Figure 27:
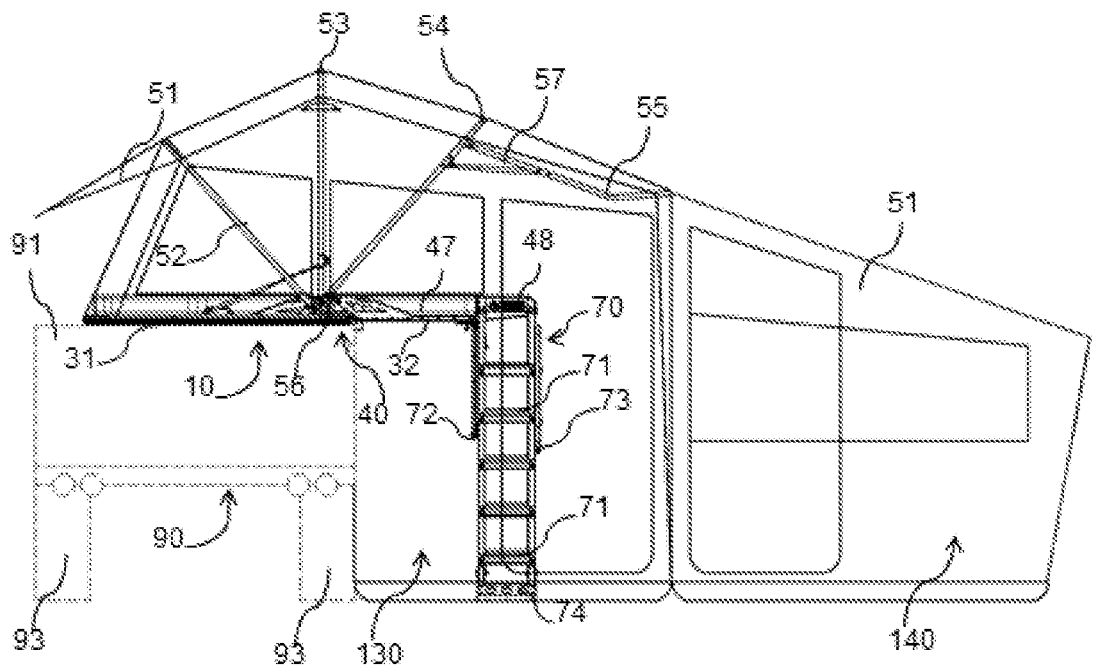
FIG. 27 shows a rear view of the third stage of deployment as shown in FIG. 26.
Figure 28:
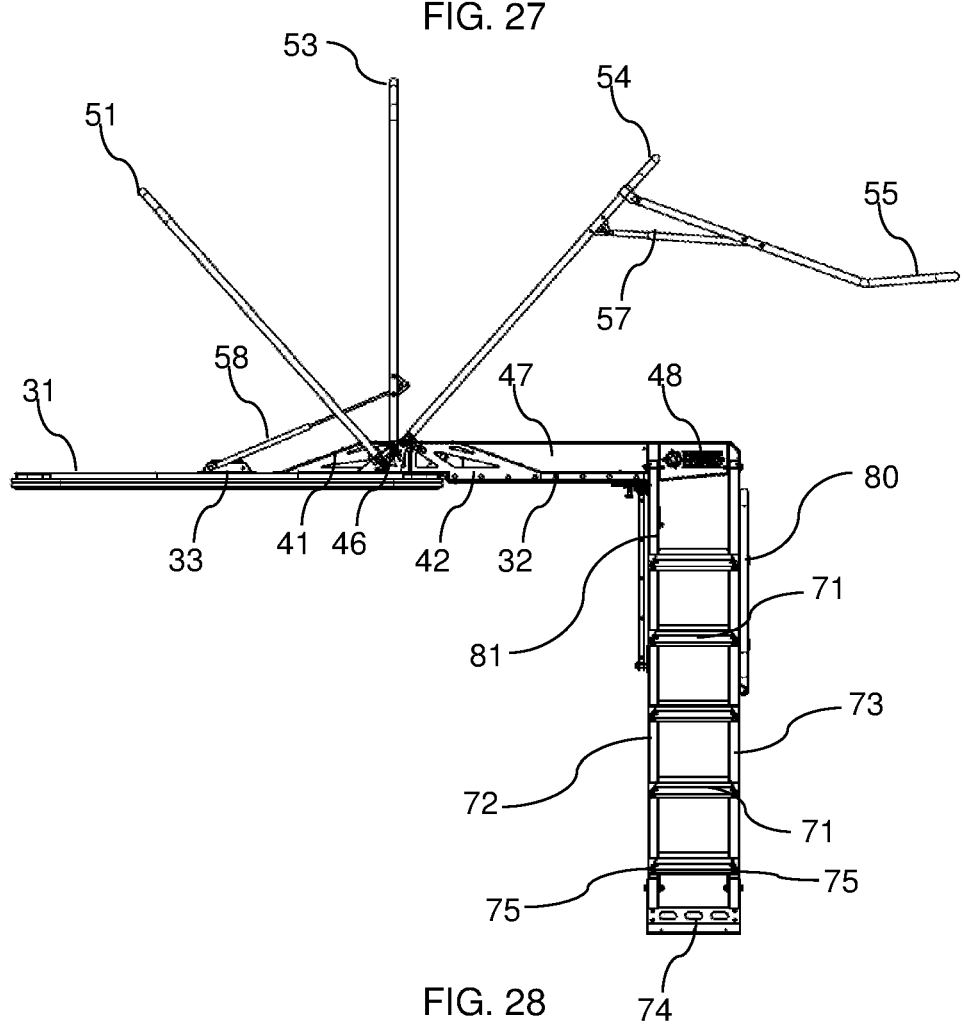
FIG. 28 shows a rear view of the deployable shelter structure in the third stage of deployment as shown in FIG. 26 with some components removed for further clarity.
Figure 29:
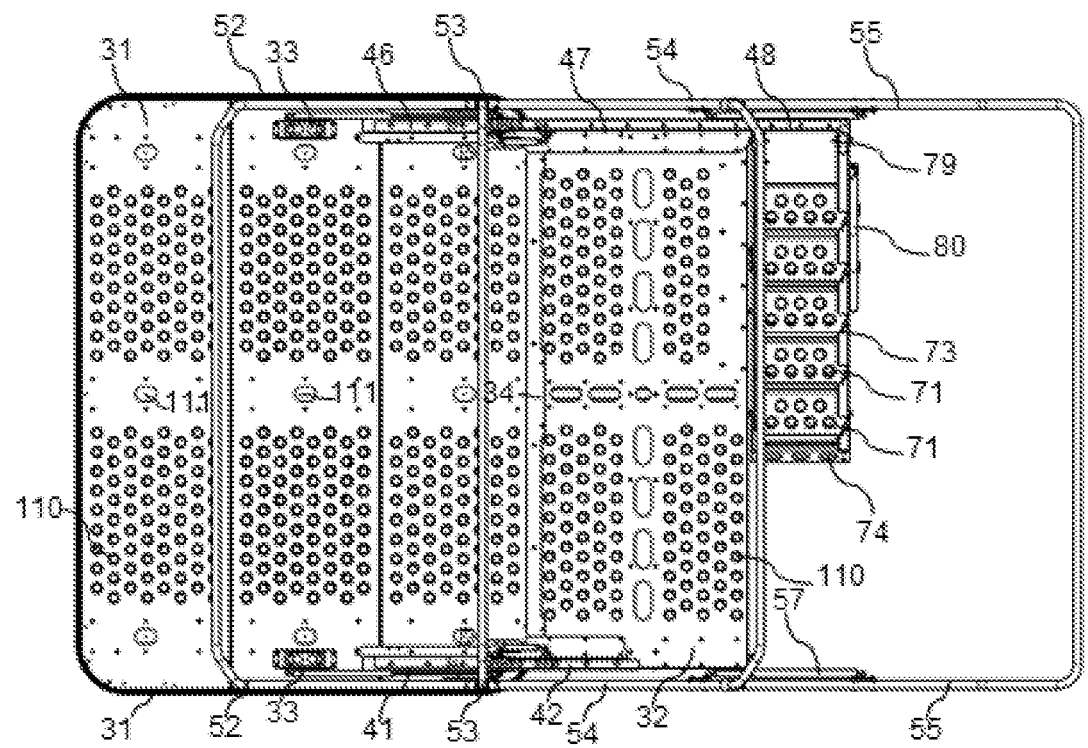
FIG. 29 shows a top view of the deployable shelter structure in the third stage of deployment as shown in FIG. 26.
Figure 30:
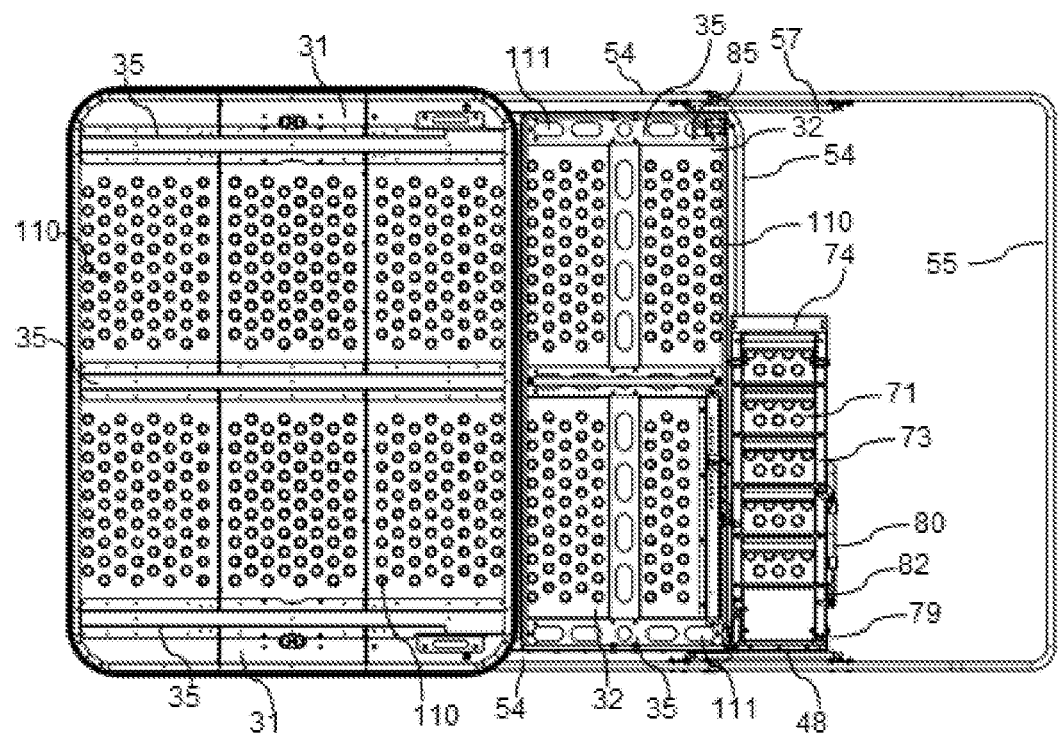
FIG. 30 shows a bottom view of the deployable shelter structure in the third stage of deployment as shown in FIG. 26.

FIG. 25 illustrates an enlarged sectional view of the first hinge means 45 and also shows the stair or step ladder assembly 70 aligned with the end of the moveable base board 32. Like the second hinge means 40 all of the components are exactly the same with the exception that the second hinge bracket 47 extends the full length of the moveable base board 32. Also illustrated in FIG. 25 is the base board gas spring 65 which assists in the opening and closing of the moveable base board 32 from the fixed base board 31. The gas spring or strut 65 is mounted at one end to an inside surface of the second hinge bracket 47, it then passes into a recess in the fixed base board 31 and is mounted within the recess. The base board gas spring 65 can be located on either side of the base 30 on either hinge means 40, 45 or can be located on both sides. Also shown are the stair hinges 79 which allow the stair or step ladder assembly 70 to pivot from the stored position aligned with the moveable base board 32 and the downward in-use position. The stair assembly consists of two stringers 72, 73 running parallel to each other and separated by the stair treads 71. A gas spring strut 76 is also used to assist with the pivoting of the stair assembly 70. The gas spring strut 76 is attached at one end to bracket 89 located on the inner stringer 72 of the stair or step ladder assembly 70 and at the other to the bracket 78 located on the bottom of the stair hinge 79. With the stair assembly still in the stowed position the handrail assembly 80 is still aligned with the underside of the stair or step ladder assembly 70.

FIGS. 26 to 31 show the final deployment of the deployable shelter assembly 10 in which the stair or step ladder assembly 70 is released and allowed to move downward into the in-use position. With the moveable base portion 32 unfolded or pivoted into a coplanar position with the fixed base portion 31, a user is able to access and release the stair latch 85 located adjacent the bottom end of the stair or step ladder assembly 70 and mounted on the underside of the moveable base board 32. Prior to or just after releasing the stair latch 85 the stair base 74 is unfolded to align with the end of the stair assembly stringers 72, 73. The stair latch 85 is a simple spring latch, however any retaining mechanism could be utilised. In this position the stair or step ladder assembly 70 and the moveable base board 32 are self-supported from the hinge means 40, 45 and the fixed base board 31. With the stair or step ladder assembly 70 in the down position with the stair base 74 resting on the ground the handrail 80 is rotated into position and safe access is available to the inside of the deployable shelter structure 10.

Figure 31:
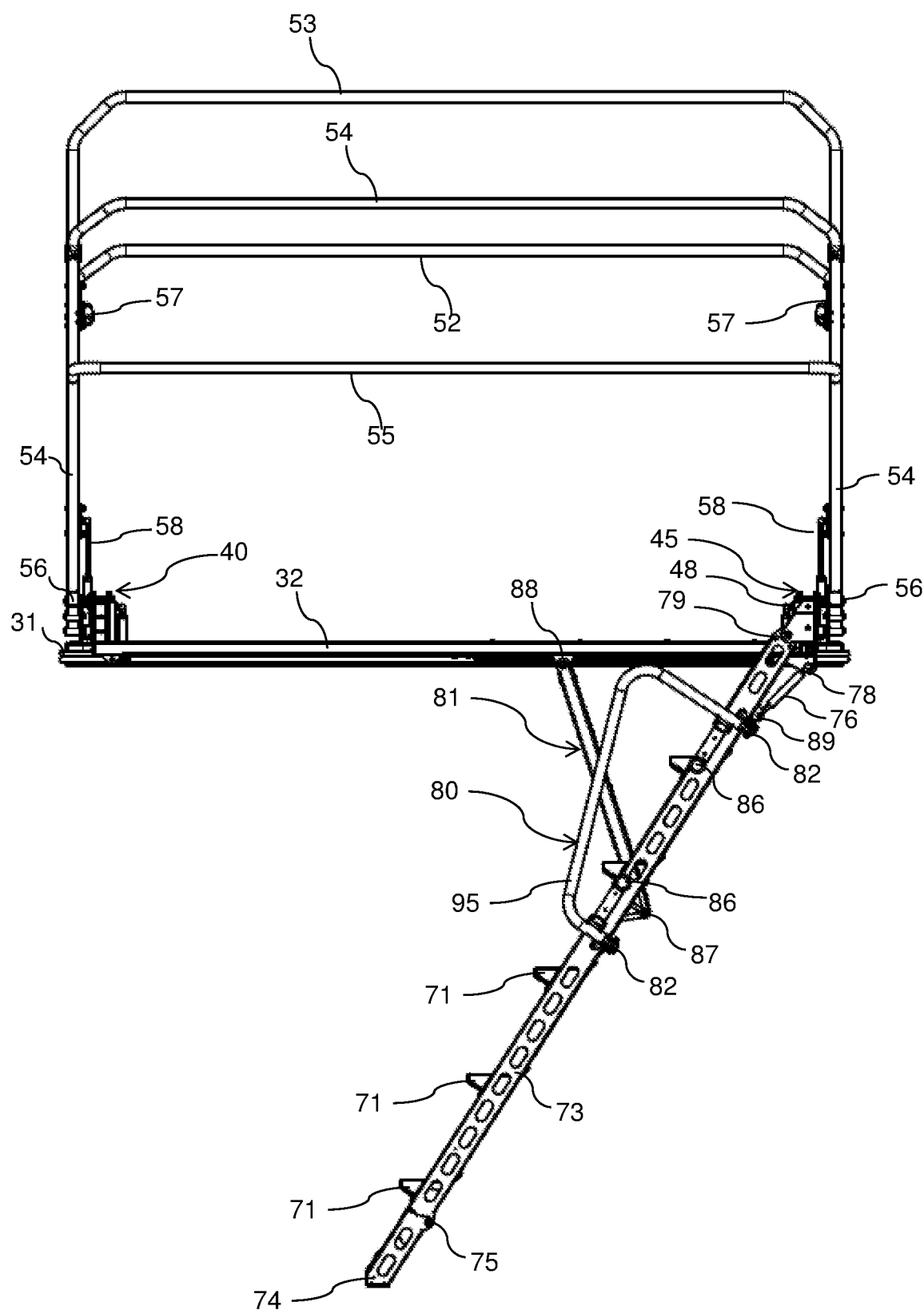
FIG. 31 shows a first side perspective view of the deployable shelter structure in the third stage of deployment as shown in FIG. 26.

FIG. 31 shows a view from the front of the deployable shelter structure 10 which shows the tubular handrail 95 which has been pivoted around pivot members 82 to the operational position. The handrail assembly 80 and the tubular handrail 95 is movable from a position in which the handrail 95 is located in the stored position at the rear of the stair or step ladder assembly 70, it is then rotated around the pivots members 82 through an angle of approximately 270 degrees to an in-use position located above the right hand stringer 73 of the stair or step ladder assembly 70. The handrail 95 is locked into positon by releasable latches 86 also located on the outer side of the right hand stringer 73. The latches 86 are simple push-pull spring loaded latches used to simply lock and release the hand rail 95. However any other type of latch could be used to lock and release the handrail 95.

Figure 32:
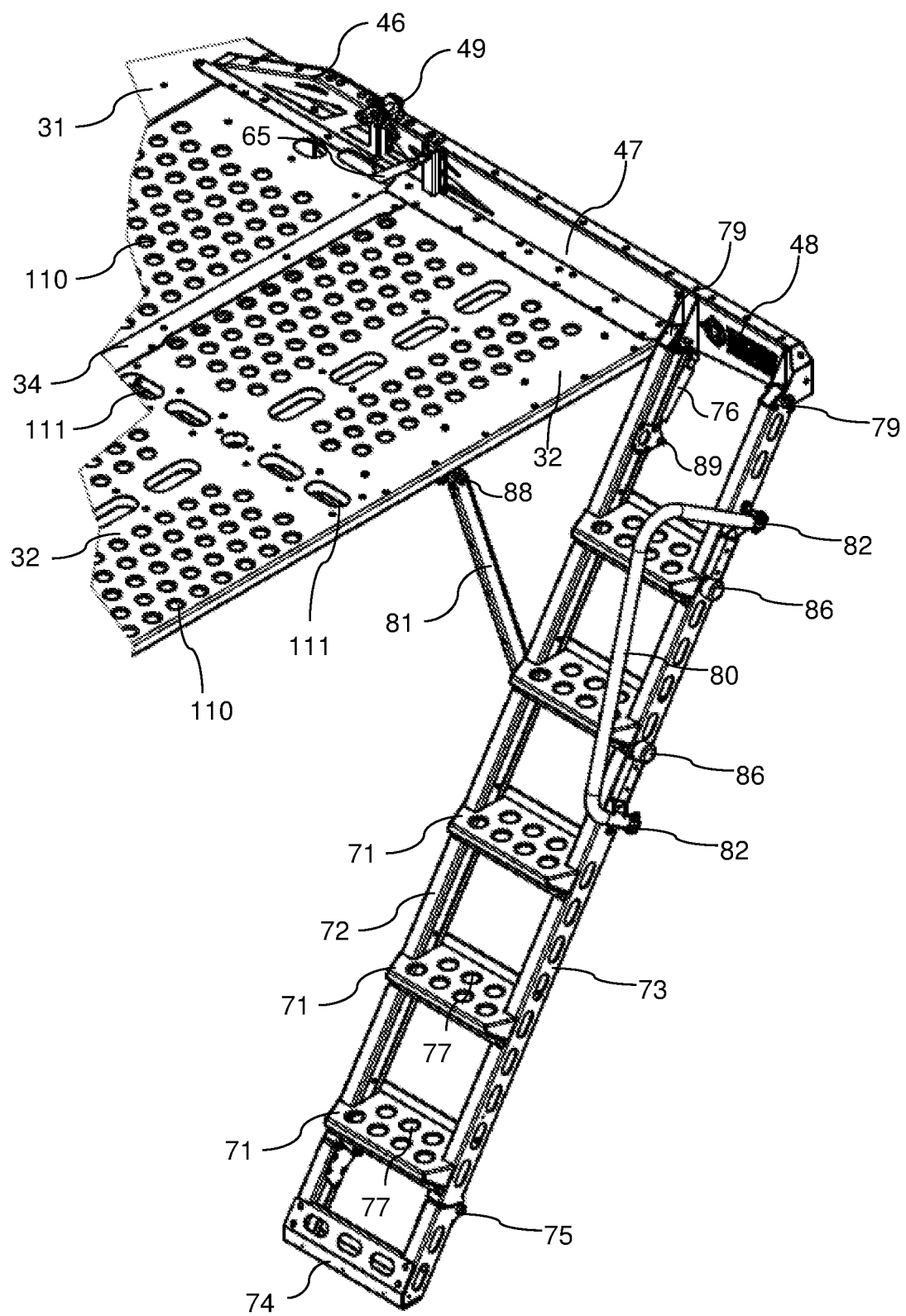
FIG. 32 shows a sectional perspective first side view of the stair assembly attached to the hinge of the deployable shelter structure in accordance with an embodiment of the present invention.
Figure 33:
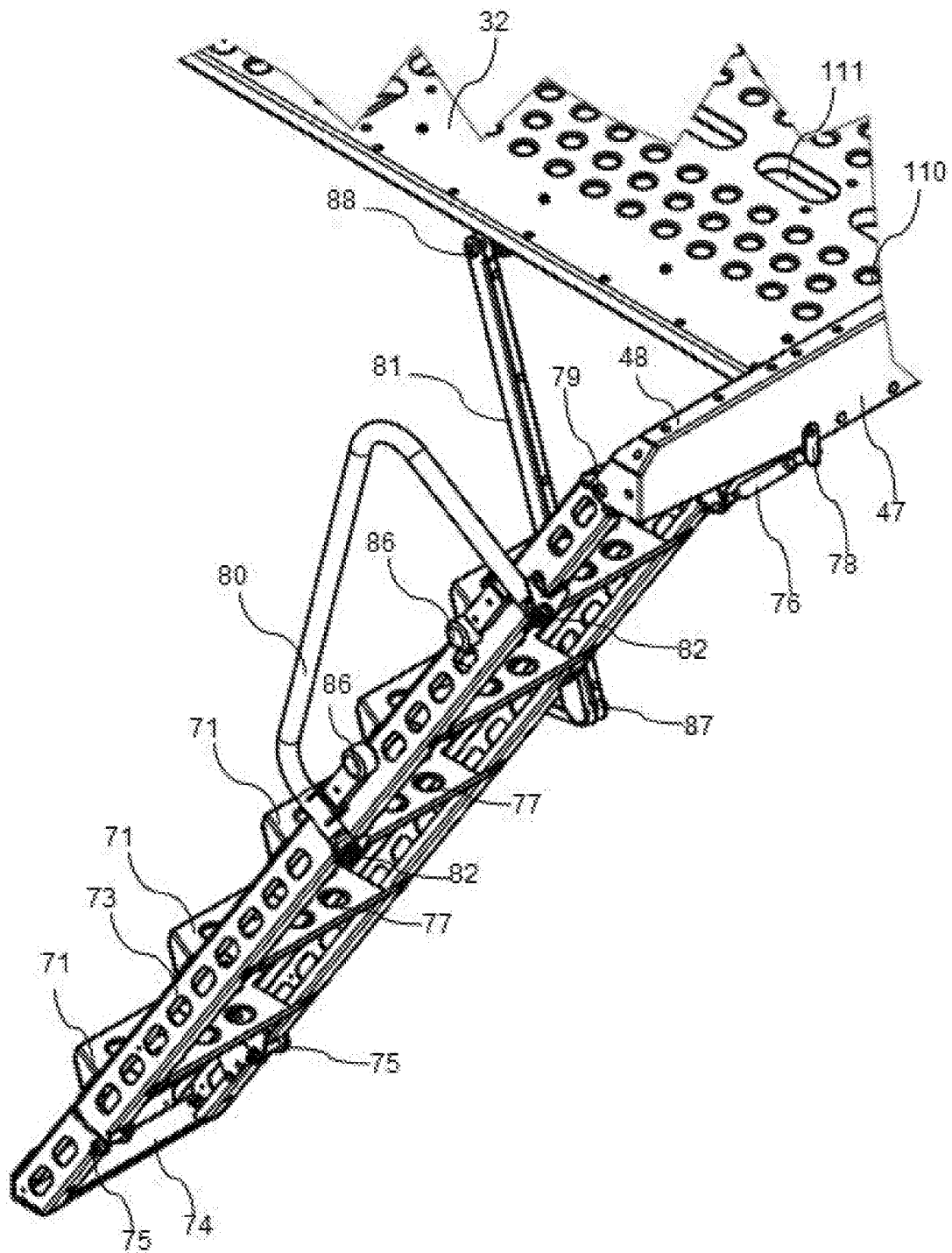
FIG. 33 shows another sectional front first side view of the stair assembly of FIG. 32.

FIGS. 32 to 36 show sectional detailed views of the stair or step ladder assembly 70 and associated components. In particular, FIG. 32 illustrates the stair support brace 81 in the extended positon. The stair support brace guide arm 84 is attached to mounting bracket 88 at one end to the underside and adjacent to the outside front edge of the moveable base board 32 and at the other end is pivotally mounted to pivot assembly 87 mounted to the inside edge of the left hand side stringer 72 of the stair or step ladder assembly 70. The stair support brace 81 is used to ensure that the stair or step ladder assembly 70 is supported to the moveable base board 32 and allows the stair or step ladder assembly 70 to move in an arc between the stored position in which the stair or step ladder assembly 70 is aligned with the outer side edge of the moveable base board 32 and in a downward in-use position. As described above the stair support brace 81 also provides minor adjustment to the extension of the stair or step ladder assembly 70 to account for uneven or un-level ground.

To assist with the movement of the stair assembly 70 from the stored to in-use positions a stair gas spring strut 76 is pivotally mounted at one end to a bracket 78 mounted off of the second hinge bracket 47 of the first hinge 45 and at the other end is pivotally mounted to a bracket 89 located on the left hand or inside stringer 72 of the stair or step ladder assembly 70.

FIGS. 34 and 35 also show the stair base 74 in the extended position which in use would lie upon the floor of the annex 130 or if there is no annex on the ground. When used on the floor the annex 130 in order to avoid damage to the floor, the bottom of the stair base 74 may have a piece of rubber, plastic or other material attached thereto. For example, a slip resistant thread tape may be applied to the base to protect the floor from the end of the stair base 74. The stair base 74 is pivotally mounted to the end of the stair or step ladder assembly 70. Pivot pins 75 are located on the ends of both stringers 72, 73 which allow the stair base 74 to pivot from the stored position in which the base 74 is located resting against the rear side of the bottom of the stair or step ladder assembly 70 and the extended position in which the base is aligned with the stringers 72, 73 of stair or step ladder assembly 70 and the bottom of the base 74 is located on the ground.

The stair treads 71 are the part of the stair or step ladder assembly 70 that is stepped on by the user. The tread depth is measured from the outer edge of the step to the rear edge of the step and the width of the tread 71 is measured from the left side stringer 72 to the right side stringer 73. The tread depth is sufficient to allow a user to easily climb and descend the stair or step ladder assembly 70 to allow access into the tent structure. Preferably the step tread depth is in the range of 100 mm to 200 mm. More preferably the step tread depth is approximately 135 mm. The stair treads 71 also include perforations 77 which allow any water to drain from the stair tread 71 to ensure that the stair or step ladder assembly 70 can be safely used in all types of conditions.

Figure 36:
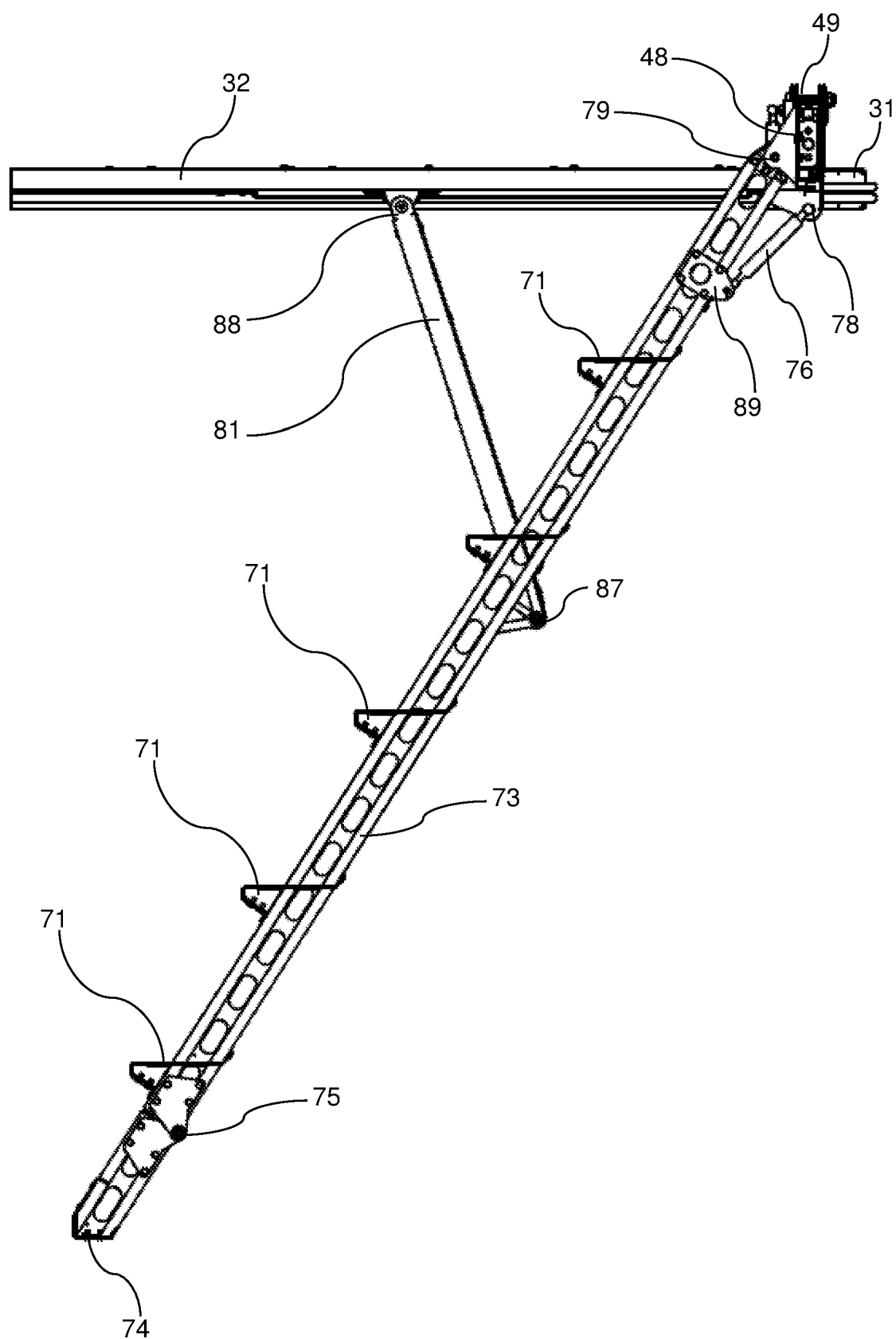
FIG. 36 illustrates a sectional first side view of the stair assembly in accordance with the present invention.

FIG. 36 shows a sectional view of the stair or step ladder assembly 70 which illustrates the inside stringer 72 and the attachment of the stringer 72 to the stair hinge 79, the stair support brace 81 and the stair gas assist strut 76.

Figure 37:
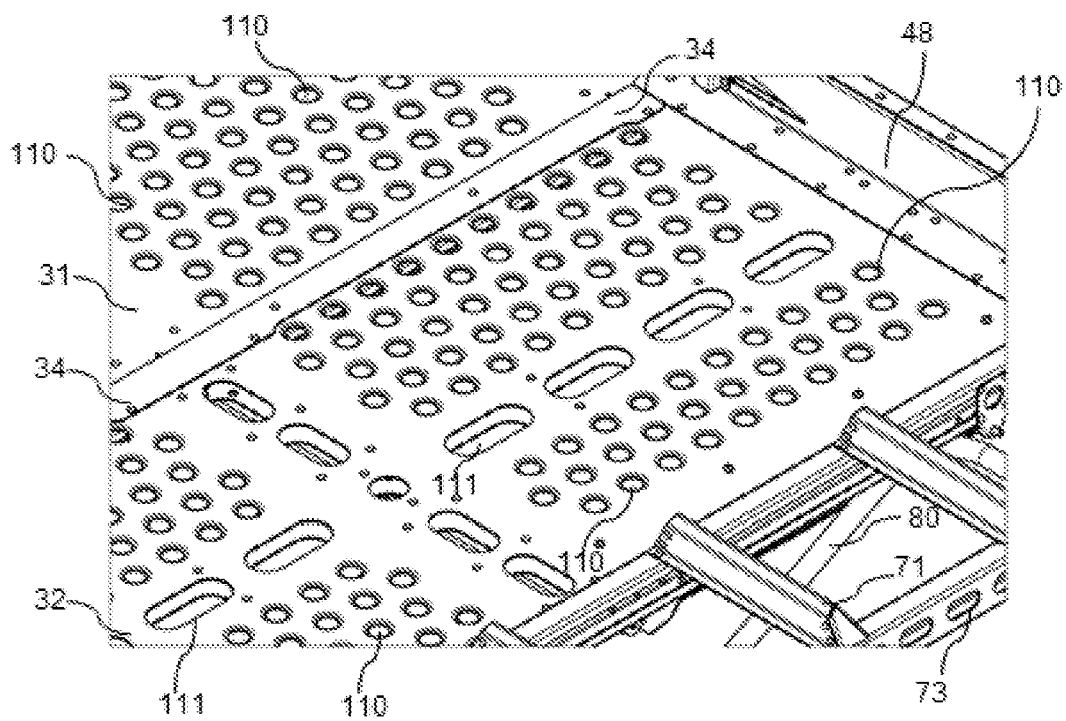
FIG. 37 a detailed section view of the perforations in the base boards of the deployable shelter structure in accordance with an embodiment of the present invention.
Figure 38:
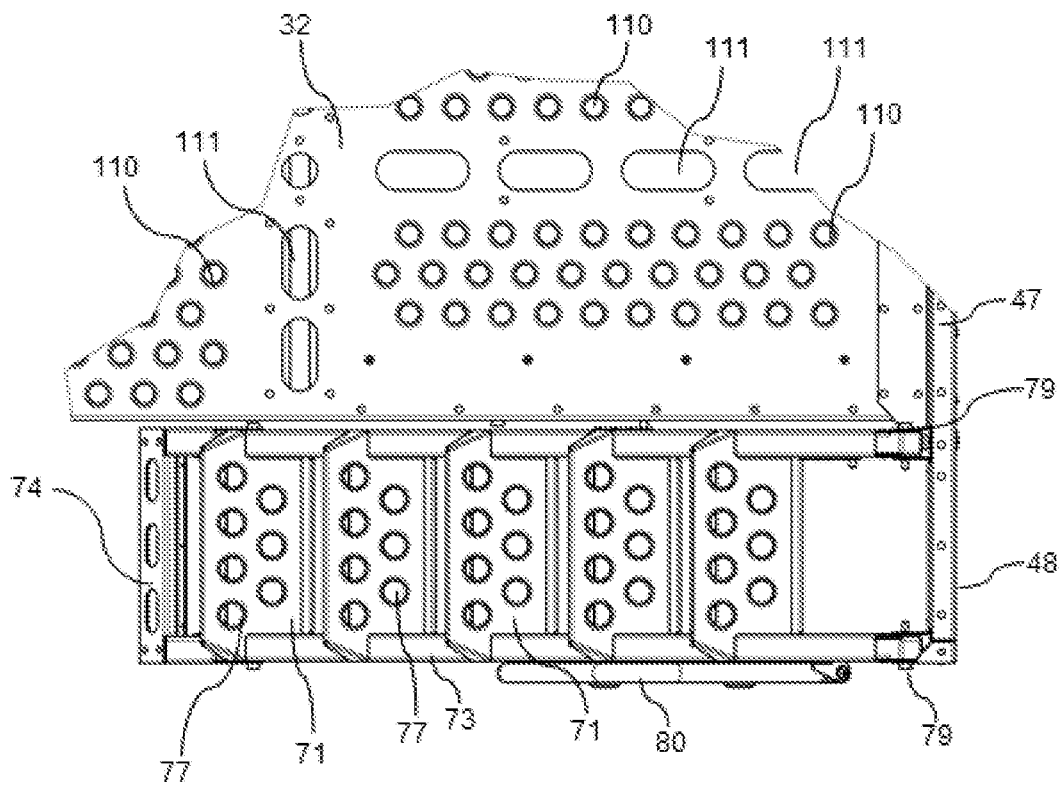
FIG. 38 shows a detailed sectional view of the perforations in the base board and stair assembly in accordance with an embodiment of the present invention.

FIGS. 37 and 38 illustrate the perforations 110, 111 and 77 in the base boards 31, 32 and the stair treads 71. The perforations 110 and 77 are typically fluted or flute shaped and the perforations 111 are slotted apertures. It should however be understood that the shape and size of the perforations is not only limited to those shapes and sizes. For example, the perforations could be any other shape or size provided they allowed circulation of air to pass in and around the surface areas.

Figure 39:
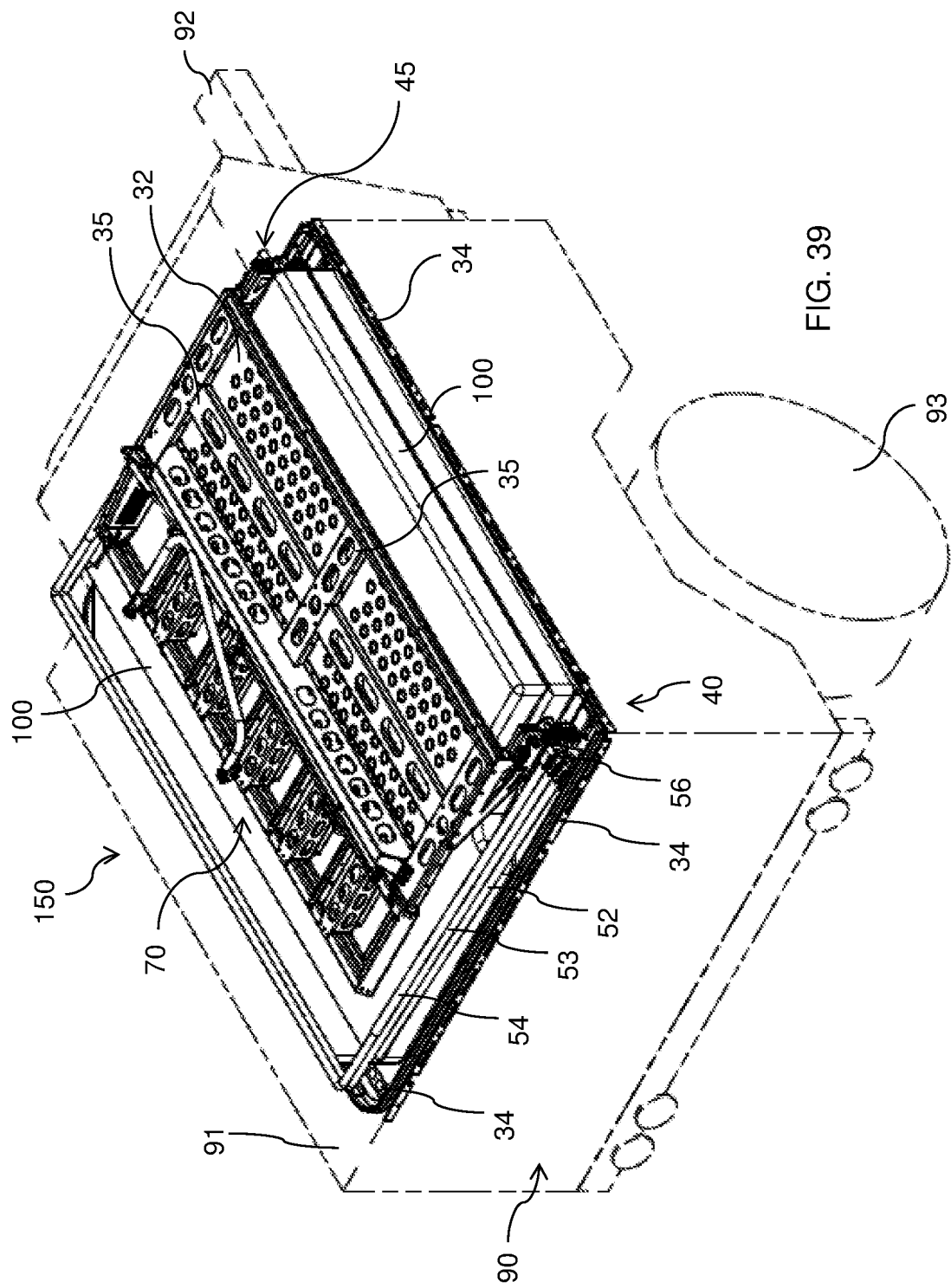
FIG. 39 shows a rear first side view of a stored deployable shelter structure for transport on a vehicle in accordance with a further embodiment of the present invention.
Figure 40:
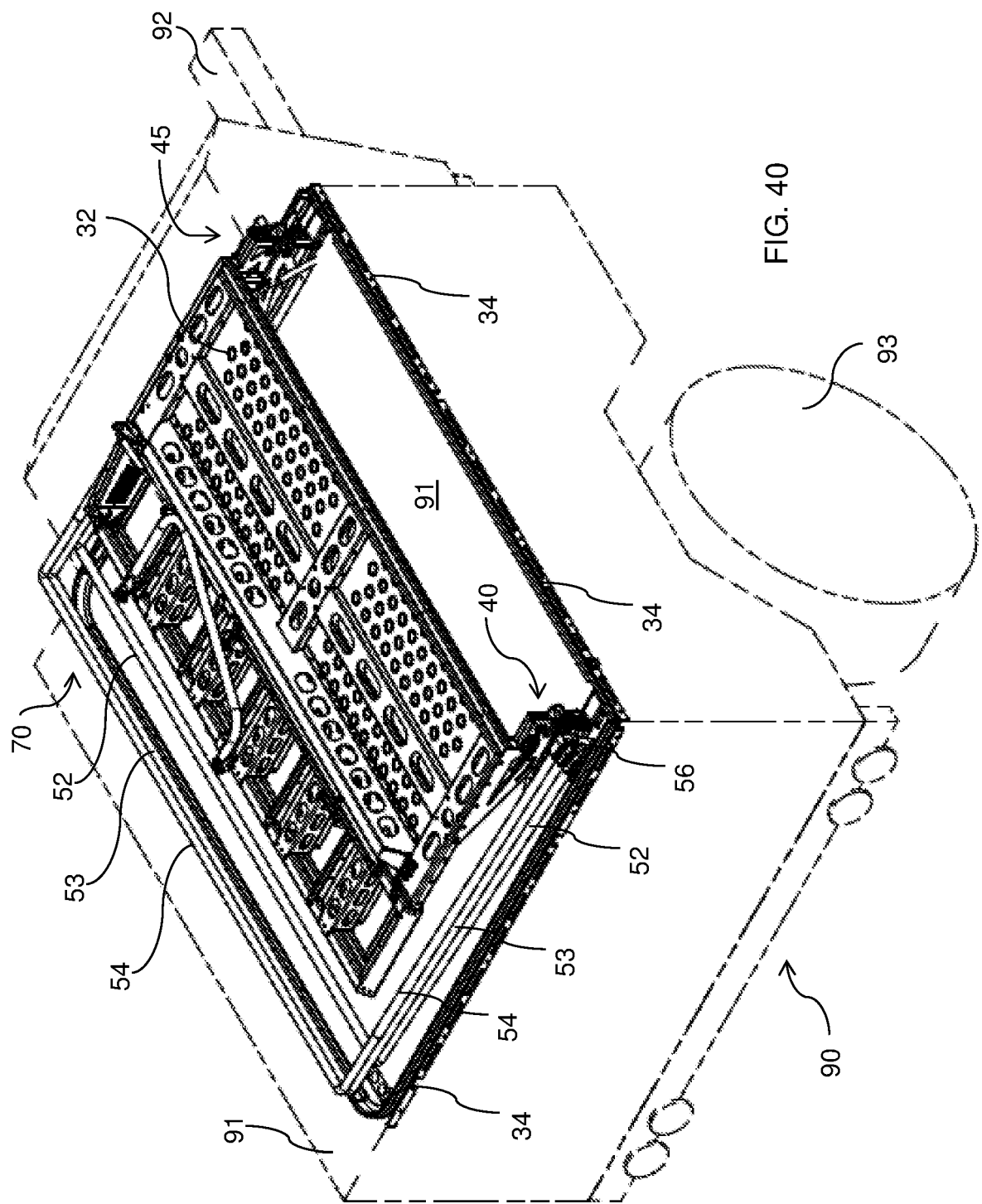
FIG. 40 shows a rear first side view of the deployable shelter structure of FIG. 39 with the mattress removed for clarity.
Figure 41:
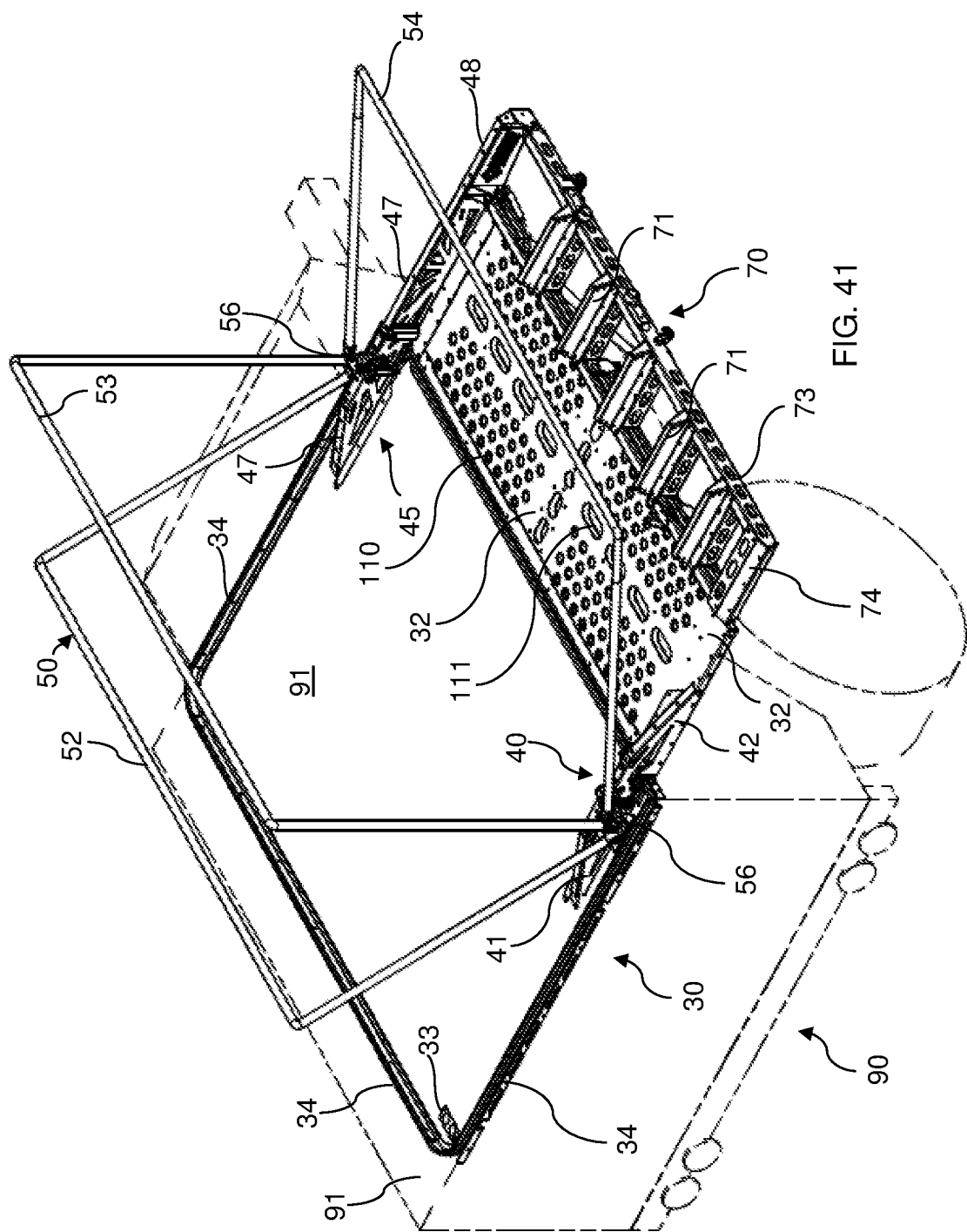
FIG. 41 shows a rear first side view of the deployable shelter structure of FIG. 39 in the second stage of deployment with the base platform unfolded and the steps in the stored position.
Figure 42:
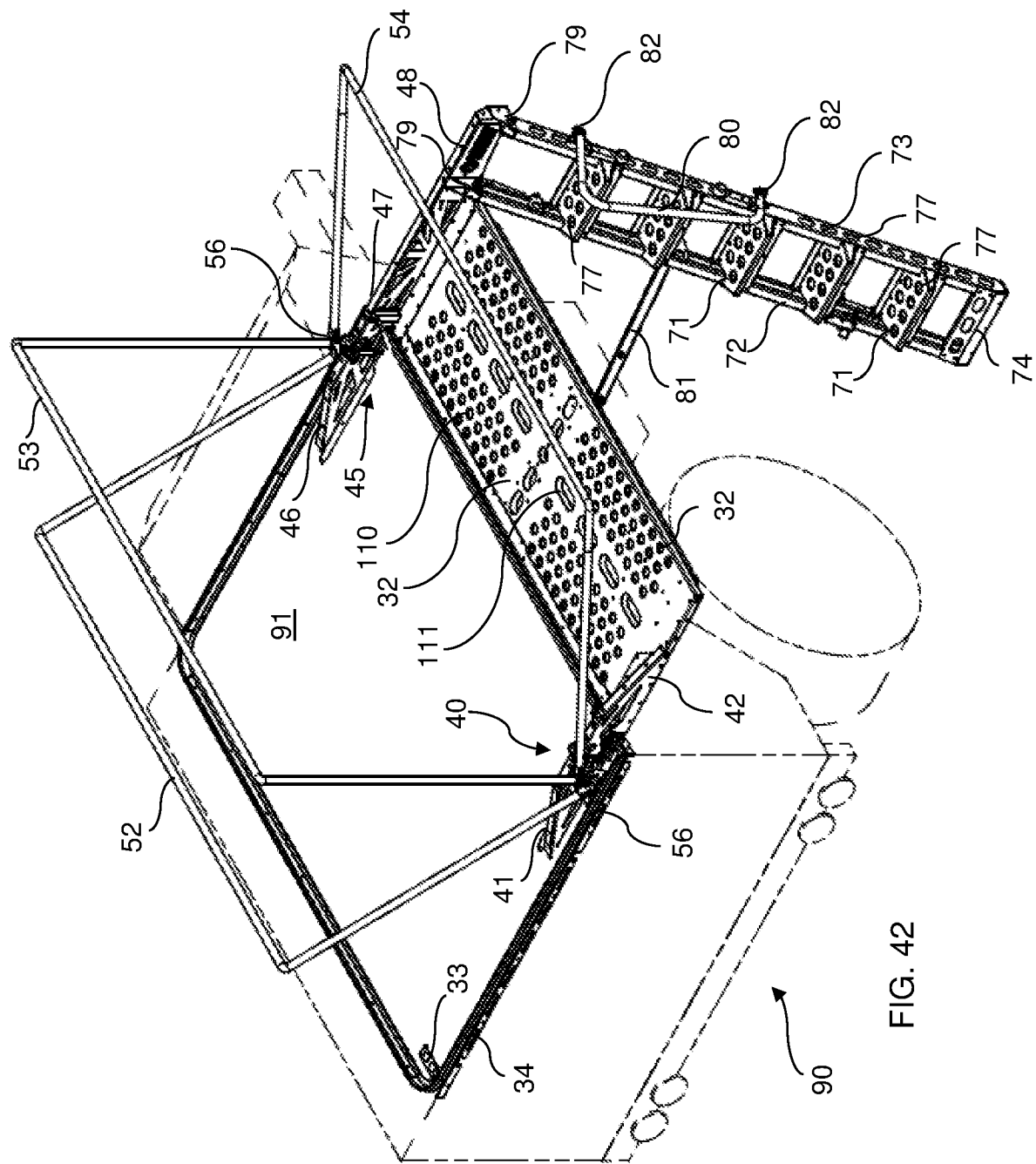
FIG. 42 shows a rear first side view of the deployable shelter structure of FIG. 39 in the third stage of deployment with the base platform unfolded and the steps in the deployed position.

FIGS. 39 to 43 illustrate a further embodiment of the present invention. In this embodiment the fixed base portion 31 is replaced by the surface 91 of the vehicle 90. That is the deployable shelter structure 150 uses the surface 91 as the fixed base portion 31. As best shown in FIG. 41, the deployable shelter structure 150 is fixed directly to the surface 91 of the vehicle 90. Likewise the components which had previously been mounted on the fixed base portion 31 are now fixedly mounted to the surface 91 of the vehicle 90. In FIGS. 39 to 43 the transit cover 120 and the tent or cover 51 have been removed to show the underlying structure of the invention.

The deployable tent structure 150 mounted or mountable on a support structure 91 of camper trailer 90. The deployable tent structure 150 comprising a collapsible hood assembly 50 and a stair or step ladder assembly 70 mounted on the moveable base portion 32. The collapsible hood assembly 50 has a number of pivotable support members 52, 53, 54 to which the waterproof cover or hood (not shown) is supported or attached. The base 30 consists of the surface 91 of the camping trailer 90 and the moveable base portion 32 which is pivotally attached to the surface 91 such that in use the base 30 folds out to form a support surface upon which the folded mattress 100 is housed. The stair or step ladder assembly 70 is pivotally attached to the moveable base portion 32 and consists of a handrail assembly 80, a number of stair or step treads 71, and a stair support brace 81. The stair or step ladder assembly 70 allows the user to easily enter and leave the deployable tent structure 150 which is mounted above the ground level. The dimensions of the deployable shelter structure 150 and the materials of construction may vary according to the shelter requirements, weight considerations and size and type of vehicle to which the structure 150 is to be mounted or mountable.

The deployable tent structure 150 is mounted on a camper trailer 90. FIGS. 39 and 40 show the deployable shelter structure 150 in the stored position, with the mattress 100 removed in FIG. 40 to further illustrate that the deployable shelter structure 150 is directly formed on the surface 91 of the camper trailer 90. In FIG. 41 the collapsible hood 50 is fully extended with the pivotal support arms 52, 53 and 54 located above and spaced around the base 30 of the camper trailer deployable shelter structure 150. The support frames 52, 53, 54 are pivotally mounted to brackets 56 which are located adjacent the first and second hinge means 40, 45. The brackets 56 in this embodiment are directly fixed to surface 91 and close to the base edge strip 34 which is also directly fixed to the surface 91. As the support arm 54 is extended this allows the cover 51 to extend to a position which completely encapsulates the base support surface 30 and the stair or step ladder assembly 70 to form the largely enclosed shelter. With the support arms 52, 53, 54 fully extended the cover 51 is held taut over the base structure 30 and the stair or step ladder assembly 70. This embodiment does not show the extension arm 55 of the first embodiment however, the collapsible hood 50 can be modified to suit and number of different shapes and sizes required for deployable shelter structure 10, 150 and can therefore consist of a variety of different configuration without departing from the present invention. The enclosed shelter provides a mattress 100 located on top of the unfolded base 30. The design of the first and second hinges 45, 40, spaces the moveable base portion 32 far enough away from the vehicle surface 91 to allow a folded mattress 100 to be enclosed by the vehicle surface 91 and moveable base board 32 and the first and second hinge means 40, 45. FIG. 41 shows the base 30 in the unfolded position with the moveable base board 32 extended to lie side by side with the vehicle surface 91 forming a generally coplanar support surface dimensioned to support at least one user and preferably two users.

The moveable base board 32 is pivotally connected to the vehicle surface 91 by hinges 40, 45. In a fashion the moveable base board 32 is cantilevered from the vehicle surface 91 by the hinges 40, 45. This means the vehicle surface 91 self supports the moveable base board 32 and the stairs or step ladder 70. The moveable base board 32 is perforated over a substantial surface area of the base board 32 to allow the flow of air through the base board 32. While the vehicle surface 91 is not shown perforated it is expected that it is may be perforated in a similar manner as the moveable base board 32 or alternatively an insert (not shown) may be placed on the vehicle surface 91 underneath the mattress 100. The insert may be a rubber mat which has a raised dimpled surface which allows the flow of air beneath and around the mattress 100. The perforations 110, 111 are largely formed in two sizes and are flute or a fluted shaped to allow air to pass through the support surface of the base board 32 and away from the mattress 100. The perforations 110, 111 also allow air to circulate through and around the base board 32.

The hinge means 40, 45 are fitted between the vehicle surface 91 and the moveable base board 32. Each hinge 40, 45 consist of a first hinge bracket 41, 46 attached or fixed to the vehicle surface 91 and a second hinge bracket 42, 47 attached or fixed to the moveable base board 32. Each first hinge bracket 41, 46 is attached to the vehicle surface 91 at a position spaced from the edge and on opposing sides of the vehicle surface 91, this space allows the collapsible hood bracket 56 to be mounted at a position adjacent the edge of the vehicle surface 91. Each second hinge bracket 42, 47 is mounted adjacent opposing edges of the moveable base board 32. The hinge brackets 41, 42 are pivoted to each other around the pivot pin 43 and in the open or unfolded position the backs 44 of each bracket 41, 42 form the hinge stops for the open position of the vehicle surface 91 and the moveable base board 32. Likewise, the hinge brackets 46, 47 are pivoted to each other around the pivot pin 49 and in the open or unfolded position the backs 60 of each bracket 46, 47 form the hinge stops for the open position of the vehicle surface 91 and the moveable base board 32.

As illustrated the collapsible hood 50 has three support frame members 52, 53, 54 which are pivotally connected to brackets 56 located on either side of the base 30. The three support frame members 52, 53, 54 are connected to the pair of brackets 56 on the vehicle surface 91, so that they pivot as the tent 150 is assembled or stowed. The pivot points for the three support frame members or poles 52, 53, 54 are spaced apart on the brackets 56, so that they do not interfere with one another as the support members 52, 53, 54 move between the stored and erected positions. In order to assist with the opening and closing of the collapsible hood 50 a gas spring or strut (not shown) is pivotally fitted between the centre support member 53 and the vehicle surface 91. A gas spring or strut may be fitted to only one side of the support member 53 or to both sides. Likewise the gas spring could also be attached to either of the other two support members 52 or 54. Also, while the present invention has been illustrated showing three support members 52, 53, 54, more or less support members may be fitted dependent upon the size and shape of the deployable shelter structure required.

As previously described in relation to the previous embodiment, the deployable shelter structure 150 operates in an identical manner to that of the deployable shelter structure 10 and like components and parts are used throughout for both embodiments. The only difference between the two embodiments is that the fixed base board 31 has been replaced by the vehicle surface 91. All of the remaining components operate is the same manner as previously described. The only exception to this is the placement of the power input terminal locating block 33. The power input block 33 is located on the opposite side of vehicle surface 91 from the hinges 40, 45 and include AC, DC and USB inputs. The power input block 33 provides the user with their power needs when the deployable structure 150 is in use.

Figure 43:
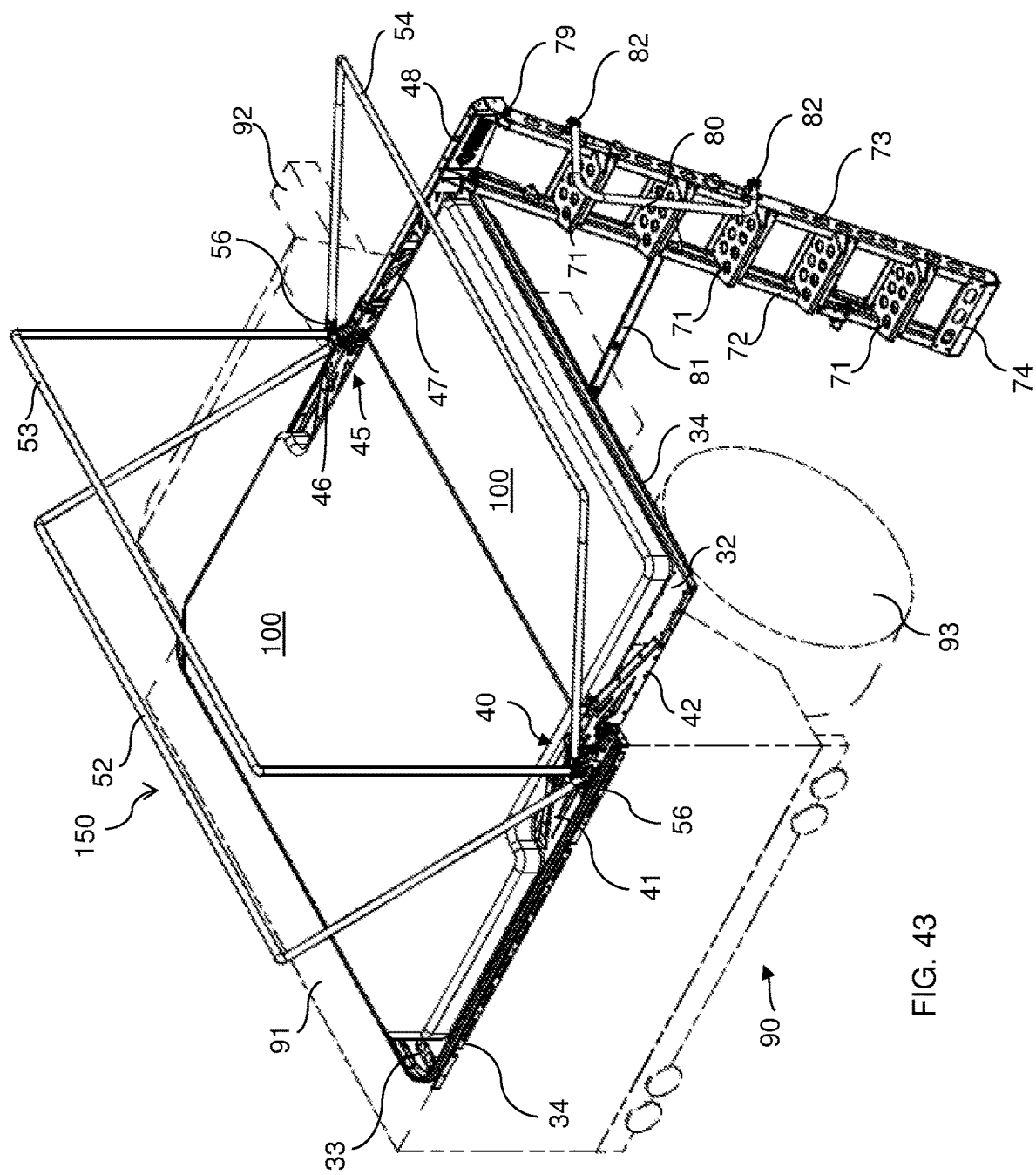
FIG. 43 shows the rear first side view of the deployable shelter structure of FIG. 42 with the base platform unfolded with the mattress in place upon the platform.

FIG. 43 shows the final deployment of the deployable shelter assembly 150 in which the stair or step ladder assembly 70 is released and allowed to move downward into the in-use position. With the moveable base portion 32 unfolded or pivoted into a coplanar position with the vehicle surface 91, a user is able to access and release the stair latch 85 located adjacent the bottom end of the stair or step ladder assembly 70 and mounted on the underside of the moveable base board 32. Prior to or just after releasing the stair latch 85 the stair base 74 is unfolded to align with the end of the stair assembly stringers 72, 73. In this position the stair or step ladder assembly 70 and the moveable base board 32 are self-supported from the hinge means 40, 45 and the vehicle surface 91. With the stair or step ladder assembly 70 in the down position with the stair base 74 resting on the ground the handrail 80 is rotated into position and safe access is available to the inside of the deployable shelter structure 150.

In an exemplary use, the deployable shelter structure 10, 150 is provided mounted to an off-road camper trailer 90. In the stowed position for transport the deployable structure 10, 150 is folded into the suitcase or clam-shell position and the removable transit case 120 completely encapsulates the deployable shelter structure 10, 150.

At a camping ground or other location the following steps are carried out to deploy the structure for use:

(a) The transit case 120 is removed;

(b) (i) For the deployable shelter structure 10 by pulling forward on the exposed extension arm 55 the collapsible hood assembly 50 is erected with the support arms 52, 53, 54 raised above the base 30 to support the cover 51. The extension arm 55 extends from the third support arm 54 to position the cover 51 over and above the eventual stair or step ladder assembly 70 deployed positions;

(b) (ii) For the deployable shelter structure 150 by pulling forward on the top support arm 54 the collapsible hood assembly 50 is erected with the support arms 52, 53, 54 raised above the base 30 to support the cover 51. The support arms 52, 53, 54 extend to position the cover 51 over and above the eventual stair or step ladder assembly 70 deployed position;

(c) The moveable base board 32 is pivoted away from the fixed base board 31 (for deployable shelter 10) and the vehicle surface 91 (for deployable shelter 150) to form the support surface for the user. At the same time the mattress 100 can be unfolded;

(d) The stair assembly latch 85 is released allowing the stairs to pivot in a downward direction. Rotate the stair base 74 to extend towards the bottom of the stair or step ladder assembly 70. Adjust the length of the stair support brace 81 to accommodate for any uneven ground. Rotate the handrail 80 into position above the stair or step ladder assembly 70; and (e) Annexes 130, 140 are erected to enclose the structure and the extremities of the enclosure are anchored using guy ropes tied to stakes or tent pegs.

Once camping is completed the following steps are completed in order to disassemble the structure for transport:

(a) Remove and guy ropes and take down the annexes;

(b) Release the handrail 80 and rotate back to stored position at the rear of stair or step ladder assembly 70;

(c) Raise the stair or step ladder assembly 70 by releasing the stair support brace 81 and when aligned with the side of the moveable base board 32 secure with the latch 85 and fold the base 74 to the stored position;

(d) Raise the moveable base board 32 and mattress 100 to place them in the folded position opposing the fixed base board 31 for deployable shelter structure 10 and the vehicle surface 91 for deployable shelter structure 150;

(e) (i) For deployable shelter structure 10 push back the extension bar 55 which also pushes the support arms 52, 53, 54 rearward to release the frictionally engaged cover 51 to allow the support bars to be collapsed back to the stored position;

(e) (ii) For deployable shelter structure 150 push back the support arm 54 which also pushes the support arms 52, 53 rearward to release the frictionally engaged cover 51 to allow the support bars to be collapsed back to the stored position; and (f) Replace the transit case 120.

In an alternative embodiment of the invention, the deployable structure 10 may be connected to a vehicle by flexible braces, such as tie down straps, in particular tie down straps that include a ratcheting mechanism to tighten the connection. Flexible braces are particularly useful for securing the deployable structure 10 of the camping assembly to a variety of vehicles, such as sport utility vehicle (SUV), van, minivan, station wagon, crossover, sedan or other automobile, capable of supporting the weight of the deployable shelter structure 10. For example, the flexible braces may be connected to a roof rack or luggage rack on a vehicle, at two, horizontally spaced apart locations.

In any of the above embodiments the deployable shelter structure 10 is supported at least one metre above the ground, preferably between 1.5 metres and 2.5 metres above the ground. The deployable structure 10 is supported on a vehicle 90. Preferably the vehicle 90 includes but is not limited to any one of a camper trailer, trailer, off-road camper trailer, and any variety of vehicles, such as sport utility vehicle (SUV), van, minivan, station wagon, crossover, sedan or other automobile, capable of supporting the weight of the deployable shelter structure 10. The present invention provides a deployable tent structure 10 which is supported off of the ground and provides a support surface which is designed to easily accommodate at least one user but preferably two users. Generally, for a tent to accommodate at least two adults, it is desirable to have at least 2.5 m² of floor space. Preferably, the floor space of the present invention provides between 2.5 to 5.0 m² of floor space.

The cover 51, the transit case 120 and the annexes 130, 140 are typically manufactured from a waterproof, resilient material such as cotton (canvas), nylon, felt or polyester. For example, the material may be a synthetic rubber such as neoprene. Alternatively the material may be polyester coated materials were the coating is a breathable coating that lets air but not moisture through. This fabric is generally durable, doesn't shrink or get baggy when wet and it is far less affected by sunlight. Preferably, the material may be a rip-stop nylon fabric. Rip-stop fabrics are woven fabrics, often made of nylon, using a special reinforcing technique that makes them resistant to tearing and ripping.

It will be apparent to persons skilled in the art that a number of variations and modifications can be made without departing from the scope of the invention as defined in the claims.

Advantages

It will be apparent that the present invention relates generally to a deployable shelter structure which is mounted or mountable above the ground on a suitable support surface. For example, tent camping trailers with an improved design requiring a minimum of effort and time to set up and take down.

The deployable shelter structure is compact, lightweight, aerodynamic, has a low center of gravity and does not interfere with operation of the vehicle. When used in conjunction with a truck, the bed of the truck remains open for other uses, such as for storing gear, four-wheelers, motorcycles, etc.

The present invention has numerous advantages, relative to the prior art, by combining one or more of the following features in a single, deployable camping structure. The camping assembly provides a collapsible, above-ground tent, which can be used when the camping assembly is mounted on a vehicle. The camping assembly can be mounted on the rear of a vehicle by any well-known means.

The foldable base allows a support surface to be positioned above ground and be completely self-supporting. No struts or ladder are required to prop up and support the base of the deployable structure. The base has one fixed portion and one moveable or folded portion which is cantilevered by two hinges from the fixed portion. This design places the load completely on the improved hinge design, this ensures that when the base is unfolded no further supports are required which could under load slip and cause damage to the structure.

One of the biggest problems with these vehicle top tents is the ingress of moisture which will inevitably make its way to the most absorbent material, in this case the mattress. The present invention provides a novel way of removing or at least limiting the amount of moisture which gathers around the bottom of the mattress. The perforations in the base boards allow air to pass in and around the base of the mattress. By creating an air pocket the perforations and air flow keep the mattress dry.

The present invention also provides the advantage over the prior art in that it does not use a ladder. The present invention utilises a stair assembly to enter and exit the tent supported above the ground. Ladders which are currently used for climbing in and out of the vehicle top tent are not suitable for people of all ages and require a certain level of agility on behalf of the user. The present invention provides a broad tread stair case which offers much more stability than the typical 20 mm rungs of a ladder. By also incorporating a handrail mounted above the stair assembly the position of a person's bodyweight is moved forward when ascending the stair assembly, making a backwards fall more unlikely.

The deployable shelter structure described above is fast and easy to set-up and pack away. The ability to fold a stair assembly into a compact clam-shell configuration provides a structure which has a small footprint when stored and expands to a sleeping accommodation for at least two adults. The structure is mounted or mountable above the ground therefore dirt and dust tends to stay at ground level and there is very little danger of the tent becoming flooded. The bedding stays in the roof top tent. This saves space in your vehicle and keeps your bedding clean and dry. The addition of perforations in the baseboards ensures the flow of air in around the mattress and bedding, keeping both dry and clean.

Variations

It will be realised that the foregoing has been given by way of illustrative example only and that all other modifications and variations as would be apparent to persons skilled in the art are deemed to fall within the broad scope and ambit of the invention as herein set forth.

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter.

Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The invention claimed is:

1. A deployable shelter structure comprising:
   a base defining a support surface and having a fixed portion supported on a structure and a moveable portion pivotally mounted to the fixed portion to pivot about a first axis, the moveable portion being displaceable from a folded position in which the fixed and moveable portions generally face each other and an unfolded position, in which the fixed and moveable portions are generally coplanar and define the support surface dimensioned to support at least one user, wherein the deployable shelter structure is supported off of the ground;
   a collapsible hood including a cover and a plurality of support members supporting the cover, the support members being pivotally connected to the base such that, by pivotal movement of the support members, the hood can be moved between a collapsed state and a deployed state in which the hood covers the support surface to form the shelter; and
   an elongate stair or step ladder assembly comprising a first support member and a second support member forming stringers of the stair or step ladder assembly, wherein the stair or step ladder assembly is pivotally mounted on the moveable portion to pivot about a second axis perpendicular to the first axis for movement between a stored position in which the first support member of the stair or step ladder assembly is aligned with an edge or side of the moveable portion and a downwardly extending in-use position, the first support member of the stair or step ladder assembly extending alongside an edge or side of the moveable portion which forms an outermost edge or side of the moveable portion when the moveable portion is displaced to be generally coplanar with the fixed portion, wherein the stair or step ladder assembly is pivotally mounted to a mounting bracket extending from a first hinge means.

2. A deployable shelter structure as claimed in claim 1, wherein the fixed and moveable base portions are manufactured from aluminium with at least one reinforcing u-channel located on an underside of each portion, and wherein the fixed and moveable base portions are laser cut from an aluminium sheet to provide rigidity to the base portions.

3. A deployable shelter structure as claimed in claim 1, wherein the fixed and moveable base portions are perforated to allow for air flow through the fixed and/or moveable base portions, wherein the perforations are flute shaped in order to direct the flow of air through the support surface, wherein the perforations extend substantially over a length of each base section, and wherein the perforations extend over approximately 50% of the support surface formed by the fixed and moveable base portions.

4. A deployable shelter structure as claimed in claim 1, further comprising a mattress located on the support surface, the mattress is foldable when the moveable base portion is displaced towards the fixed base portion such that the mattress resides within the confines of an enclosure formed by the fixed and moveable base portions and is extendable upon the moveable base portion being extended to be generally coplanar with the fixed base portion.

5. A deployable shelter structure as claimed in claim 1, wherein the structure to which the fixed base portion is supported on is any one of:
   (a) a vehicle roof;
   (b) a trailer; or
   (c) a camping trailer;
   wherein when the structure is the vehicle roof, the structure can be the vehicle roof itself or some other means which is attached to the vehicle roof, and where the structure is supported off of the ground at a height, the height being variable and being dependent upon the type of structure.

6. A deployable shelter structure as claimed in claim 1, further comprising a first hinge means attached adjacent one end of the fixed and moveable base portions and a second hinge means attached adjacent another end of the fixed and moveable base portions, the first and second hinge means allowing the moveable base portion to be displaceable from the fixed base portion such that when the moveable base portion is unfolded from the fixed base portion they form the generally coplanar support surface, wherein the first and second hinge means self-supporting the moveable base portion, wherein the first and second hinge means are in a folded position space apart the fixed and moveable base portions to provide a height to allow the folded mattress to be confined within an enclosure formed by the fixed and moveable base portions and the first and second hinge means, wherein the first and second hinge means have a first hinge bracket attached to the fixed base portion and a second hinge bracket attached to the moveable base portion, wherein the second hinge bracket of the first hinge means extends along the length of one side of the moveable base portion, and wherein the deployable shelter structure further comprises at least one gas strut for assisting the folding and unfolding of the moveable base portion from the fixed base portion, where the at least one gas strut is located adjacent the first hinge means or the second hinge means or both hinge means.

7. A deployable shelter structure as claimed in claim 6, wherein the stair or step ladder assembly is pivotally mounted to the mounting bracket, the mounting bracket extending from the second hinge bracket of the first hinge means, and wherein the stair or step ladder assembly further comprises:
- a plurality of step treads separating the first and second support members;
- a handrail pivotally fitted to the second support member; and
- a stair support brace attached to the underside of the moveable base portion and the first support member, the stair support brace guides the stair or step ladder assembly from the stored position to the extended in-use position.

8. A deployable shelter structure as claimed in claim 7, wherein the stair or step ladder assembly is retained in the stored position aligned with an edge or side of the moveable base portion by a retaining device, such that when the retaining device is released the stair or step ladder assembly will lower to the extended in-use position, wherein the retaining device is either mounted on the stair or step ladder assembly towards an end of the first support member and secures the stair or step ladder assembly in the stored position to the moveable base portion or is mounted on the moveable base portion and secures the moveable base portion to the stair or step ladder assembly in the stored position, wherein the handrail is moveable from a stowed position in which the handrail is positioned on a back side of the stair or step ladder assembly to an erected position, wherein length of the stair or step ladder assembly is dependent upon the height which the structure is supported off of the ground, wherein the length of the stair or step ladder assembly is extendable by a folded step section extending from the end of the stair or step ladder assembly, wherein the stair or step ladder assembly is assisted for movement by at least one gas strut attached between the underside of one or both support members and the mounting bracket extending from the second hinge bracket of the first hinge means, and wherein the stair support brace is extendable and lockable at different lengths to accommodate for un-level ground below the end of the stair or step ladder assembly.

9. A deployable shelter structure as claimed in claim 8, wherein the plurality of step treads are perforated across their length to allow air flow through the step tread, wherein the plurality of step treads are of sufficient depth to accommodate a substantial part of a foot of a user such that the user can easily climb or descend the stair or step ladder assembly with the assistance of the handrail, wherein the collapsible hood is foldable into a clam-shell configuration in the stowed position for transport, and wherein the plurality of support members comprises three arcuate poles spaced apart and pivotally connected to the fixed base portion by way of a pair of brackets mounted adjacent each hinge means.

10. A deployable shelter structure as claimed in claim 1, wherein the support surface is dimensioned to support two users.

11. A deployable tent structure for mounting on a vehicle comprising:
- a base defining a support surface and having a fixed base portion supported on a structure of the vehicle and a moveable base portion connected to the fixed base portion and arranged to pivot away from the vehicle about a first axis, the moveable base portion being displaceable from a folded position in which the fixed and moveable base portions generally face each other and an unfolded position, in which the fixed and moveable base portions are generally coplanar and define the support surface dimensioned to support at least one user;
- a collapsible hood including a cover and a plurality of support members supporting the cover, the support members being pivotally connected to the base such that, by pivotal movement of the support members, the hood can be moved between a collapsed state and a deployed state in which the hood covers the support surface to form the shelter; and
- an elongate stair or step ladder assembly comprising a first support member and a second support member forming stringers of the stair or step ladder assembly, wherein the stair or step ladder assembly is pivotally mounted on the moveable base portion to pivot about a second axis perpendicular to the first axis for movement between a stored position in which the first support member of the stair or step ladder assembly is aligned with an edge or side of the moveable base portion and a downwardly extending in-use position, the first support member of the stair or step ladder assembly extending alongside an edge or side of the moveable base portion which forms an outermost edge or side of the moveable base portion when the moveable base portion is displaced to be generally coplanar with the fixed base portion,
wherein the stair or step ladder assembly is pivotally mounted to a mounting bracket extending from a first hinge means.

12. A deployable shelter structure for mounting on a surface of a vehicle, the deployable shelter structure comprising:
- a support surface formed from the surface of the vehicle and a moveable portion pivotally mounted to the surface of the vehicle to pivot about a first axis, the moveable portion being displaceable from a folded position in which the moveable portion and the surface of the vehicle generally face each other and an unfolded position, in which the surface of the vehicle and the moveable portion are generally coplanar and define the support surface dimensioned to support at least one user, wherein the deployable shelter structure is supported off of the ground;
- a collapsible hood including a cover and a plurality of support members supporting the cover, the support members being pivotally connected to the surface of the vehicle such that, by pivotal movement of the support members, the hood can be moved between a collapsed state and a deployed state in which the hood covers the support surface to form the shelter;
- an elongate stair or step ladder assembly comprising a first support member and a second support member forming stringers of the stair or step ladder assembly, wherein the stair or step ladder assembly is pivotally mounted on the moveable portion to pivot about a second axis perpendicular to the first axis for movement between a stored position in which the first support member of the stair or step ladder assembly is aligned with an edge or side of the moveable portion and a downwardly extending in-use position, the first support member of the stair or step ladder assembly extending alongside an edge or side of the moveable portion which forms an outermost edge or side of the moveable portion when the moveable portion is displaced to be generally coplanar with the surface; and
- a mattress positioned upon the support surface, the mattress is foldable when the moveable portion is displaced towards the surface of the vehicle such that the mattress resides within the confines of an enclosure formed by the surface of the vehicle and the moveable portion and is extendable upon the moveable portion being extended to be generally coplanar with the surface of the vehicle.

13. A deployable shelter structure as claimed in claim 12, wherein the moveable portion is perforated to allow for air flow through the moveable portion, and wherein a dimpled mat or sheet is placed on the surface of the vehicle to provide a path for air flow between an underside of the mattress and the surface of the vehicle.

14. A deployable shelter structure as claimed in claim 13, wherein the surface of the vehicle is perforated to provide a path for air flow through the surface of the vehicle, wherein the perforations are flute shaped in order to direct the flow of air through the surface of the vehicle or the moveable portion, wherein the surface of the vehicle is any one of a trailer or a camping trailer, and wherein the deployable shelter structure is supported off of the ground at a height, the height being variable and dependent upon the type of structure.

15. A deployable shelter structure as claimed in claim 12, further comprising a first hinge means attached adjacent one end of the surface of the vehicle and the moveable portion and a second hinge means attached adjacent another end of the surface of the vehicle and the moveable portion, the first and second hinge means allowing the moveable portion to be displaceable from the surface of the vehicle such that when the moveable portion is unfolded from the surface of the vehicle they form the generally coplanar support surface, wherein the first and second hinge means self-support the moveable portion, wherein the first and second hinge means are in a folded position space apart the moveable portion from the surface of the vehicle to provide a height to allow the folded mattress to be confined within an enclosure formed by the surface of the vehicle and the moveable portion and the first and second hinge means, and wherein the first and second hinge means have a first hinge bracket attached to the surface of the vehicle and a second hinge bracket attached to the moveable portion.

16. A deployable shelter structure as claimed in claim 15, wherein the second hinge bracket of the first hinge means extends along the length of one side of the moveable portion, wherein the deployable shelter structure further comprises at least one gas strut for assisting the folding and unfolding of the moveable portion from the surface of the vehicle, and wherein the gas strut is located adjacent the first hinge means or the second hinge means or both hinge means.

17. A deployable shelter structure as claimed in claim 12, wherein the stair or step ladder assembly is pivotally mounted to a mounting bracket extending from the first hinge means, wherein the stair or step ladder assembly is pivotally mounted to the mounting bracket extending from the second hinge bracket of the first hinge means.

18. A deployable shelter structure as claimed in claim 12, wherein the collapsible hood is foldable into a clam-shell configuration in the stowed position for transport, wherein the plurality of support members comprises three arcuate poles spaced apart and pivotally connected to the surface of the vehicle by way of a pair of brackets mounted adjacent each hinge means, wherein at least a portion of the support members is attached to a portion of the cover so that the extension of the support members from the collapsed position automatically effects the erection of said cover to define an enclosed space above said support surface and the stair or step ladder assembly, and wherein the collapsible hood further comprises at least one gas assisted strut attached to at least one of the support member and the surface of the vehicle to assist in moving the hood between a collapsed state and a deployed state in which said hood covers the support surface and stair or step ladder assembly to form the shelter.

19. A deployable shelter structure as claimed in claim 12, further comprising a transit cover for enclosing the stored shelter structure including the collapsible hood, the folded base and mattress, and the stair or step ladder assembly, wherein the transit cover is releasably attached to a sail track mounted on an edge strip located around the periphery of the support surface of the surface of the vehicle, and the collapsible hood cover is attached to a further sail track mounted on the edge strip located around the periphery of the support surface of the surface of the vehicle.

20. A deployable shelter structure as claimed in claim 12, wherein the support surface is dimensioned to support two users.

* * * * *